(12) United States Patent
Balakrishnan et al.

(10) Patent No.: US 11,544,331 B2
(45) Date of Patent: Jan. 3, 2023

(54) ARTIFICIAL INTELLIGENCE FOR PRODUCT DATA EXTRACTION

(71) Applicant: Hearst Magazine Media, Inc., New York, NY (US)

(72) Inventors: Ramanan Balakrishnan, Bengaluru (IN); Abishekaa Kulamarva Yajnakumara, Bengaluru (IN); Govind Chandrasekhar, Bengaluru (IN); Raj Bhandari, Mountain View, CA (US); Asmit Kumar, Bengaluru (IN); Dinesh Kumar Nalluri, Bengaluru (IN); Srinivasan Kidambi Sridharan, Bengaluru (IN); Vinoth Gopinathan, San Francisco, CA (US); Varun Sivamani, San Francisco, CA (US)

(73) Assignee: Hearst Magazine Media, Inc., New York, NY (US)

( * ) Notice: Subject to any disclaimer, the term of this patent is extended or adjusted under 35 U.S.C. 154(b) by 0 days.

(21) Appl. No.: 17/492,138

(22) Filed: Oct. 1, 2021

(65) Prior Publication Data
US 2022/0058227 A1 Feb. 24, 2022

Related U.S. Application Data

(63) Continuation-in-part of application No. 17/304,170, filed on Jun. 15, 2021, which is a continuation of
(Continued)

(51) Int. Cl.
*G06F 17/00* (2019.01)
*G06F 7/00* (2006.01)
*G06F 16/951* (2019.01)
*G06Q 30/06* (2012.01)
*G06F 16/955* (2019.01)
*G06N 20/00* (2019.01)

(52) U.S. Cl.
CPC .......... *G06F 16/951* (2019.01); *G06F 16/955* (2019.01); *G06N 20/00* (2019.01); *G06Q 30/0627* (2013.01)

(58) Field of Classification Search
CPC .......... G06Q 10/0838; G06Q 10/0831; G06N 20/00; G06F 16/258; G06F 16/254; G06F 7/14
USPC ...................................................... 705/341
See application file for complete search history.

(56) References Cited

U.S. PATENT DOCUMENTS

| | | | |
|---|---|---|---|
| 1,110,055 A | 9/1914 | Hatch | |
| 6,523,019 B1* | 2/2003 | Borthwick | G06N 20/00 706/45 |

(Continued)

OTHER PUBLICATIONS

Zonos Classify "Automate HS Code Classification", 14 pages, May 13, 2020.

*Primary Examiner* — Pavan Mamillapalli
(74) *Attorney, Agent, or Firm* — Knobbe, Martens, Olson & Bear LLP

(57) ABSTRACT

A computer system and method may be used to generate a product catalog from one or more websites. One or more product pages on the websites may be identified and parsed. Attribute information may be identified in each page. A learning engine may be utilized to predict at least one attribute value. The attribute information and the predicted attribute value may be stored in a database.

27 Claims, 41 Drawing Sheets

Related U.S. Application Data application No. 16/288,059, filed on Feb. 27, 2019, now Pat. No. 11,042,594, application No. 17/492,138, which is a continuation-in-part of application No. 16/740,301, filed on Jan. 10, 2020, now Pat. No. 11,443,273.

(60) Provisional application No. 62/807,445, filed on Feb. 19, 2019.

(56) References Cited

U.S. PATENT DOCUMENTS

| | | | |
|---|---|---|---|
| 7,558,778 B2 * | 7/2009 | Carus | G06N 20/00 |
| 7,689,527 B2 * | 3/2010 | Pavlov | G06F 16/90344 |
| | | | 706/45 |
| 8,122,026 B1 * | 2/2012 | Laroco, Jr. | G06N 5/04 |
| | | | 707/730 |
| 9,049,117 B1 | 6/2015 | Nucci | |
| 9,870,629 B2 | 1/2018 | Cardno | |
| 10,320,633 B1 | 6/2019 | Wong | |
| 10,534,851 B1 | 1/2020 | Chan | |
| 10,929,896 B1 | 2/2021 | Nath | |
| 11,017,426 B1 | 5/2021 | Garg | |
| 11,062,365 B2 | 7/2021 | Siddiqui | |
| 2003/0088458 A1 * | 5/2003 | Afeyan | G06N 3/126 |
| | | | 706/13 |
| 2003/0217052 A1 * | 11/2003 | Rubenczyk | G06F 16/951 |
| 2004/0225624 A1 * | 11/2004 | Reynolds | G06Q 20/204 |
| | | | 705/401 |
| 2007/0282900 A1 * | 12/2007 | Owens | G06F 16/2465 |
| 2008/0243905 A1 * | 10/2008 | Pavlov | G06F 16/90344 |
| | | | 707/999.102 |
| 2009/0012842 A1 | 1/2009 | Srinivasan | |
| 2009/0119268 A1 | 5/2009 | Bandaru | |
| 2010/0138712 A1 * | 6/2010 | Lee | G06F 11/0763 |
| | | | 714/E11.023 |
| 2011/0320414 A1 | 12/2011 | Sim | |
| 2012/0203708 A1 * | 8/2012 | Psota | G06Q 30/06 |
| | | | 705/347 |
| 2012/0272160 A1 | 10/2012 | Spivack | |
| 2013/0110594 A1 | 5/2013 | Sinyagin | |
| 2014/0114758 A1 | 4/2014 | Bentley | |
| 2014/0149105 A1 | 5/2014 | Lamba | |
| 2014/0358828 A1 * | 12/2014 | Phillipps | G06N 20/00 |
| | | | 706/12 |
| 2015/0088598 A1 | 3/2015 | Acharyya | |
| 2015/0170055 A1 * | 6/2015 | Beymer | G06N 20/00 |
| | | | 706/12 |
| 2015/0332369 A1 | 11/2015 | Nakane | |
| 2016/0055499 A1 | 2/2016 | Hawkins | |
| 2016/0224938 A1 * | 8/2016 | Shah | G06Q 10/083 |
| 2016/0357408 A1 | 12/2016 | Zavar | |
| 2017/0046763 A1 | 2/2017 | Pan | |
| 2017/0148056 A1 | 5/2017 | Hata | |
| 2017/0186032 A1 | 6/2017 | Rangasamy Kannadasan | |
| 2017/0302627 A1 | 10/2017 | Lai | |
| 2018/0013720 A1 * | 1/2018 | Sachdev | G06Q 30/00 |
| 2018/0137560 A1 | 5/2018 | Chopra | |
| 2019/0043095 A1 | 2/2019 | Grimaud | |
| 2019/0095973 A1 | 3/2019 | Byron | |
| 2019/0197063 A1 * | 6/2019 | Sekar | G06N 20/00 |
| 2019/0220694 A1 | 7/2019 | Biswas | |
| 2020/0097597 A1 | 3/2020 | Lourentzou | |
| 2020/0151201 A1 * | 5/2020 | Chandrasekhar | G06F 16/2246 |
| 2020/0250729 A1 | 8/2020 | Soohoo | |

\* cited by examiner

Train machine learning model to identify product attributes based on features
621
Select HTML elements from web page, including properties and coordinates
622
Apply machine learning model to the features of the HTML elements to predict whether they correspond to product attributes
623
620
FIG. 6C

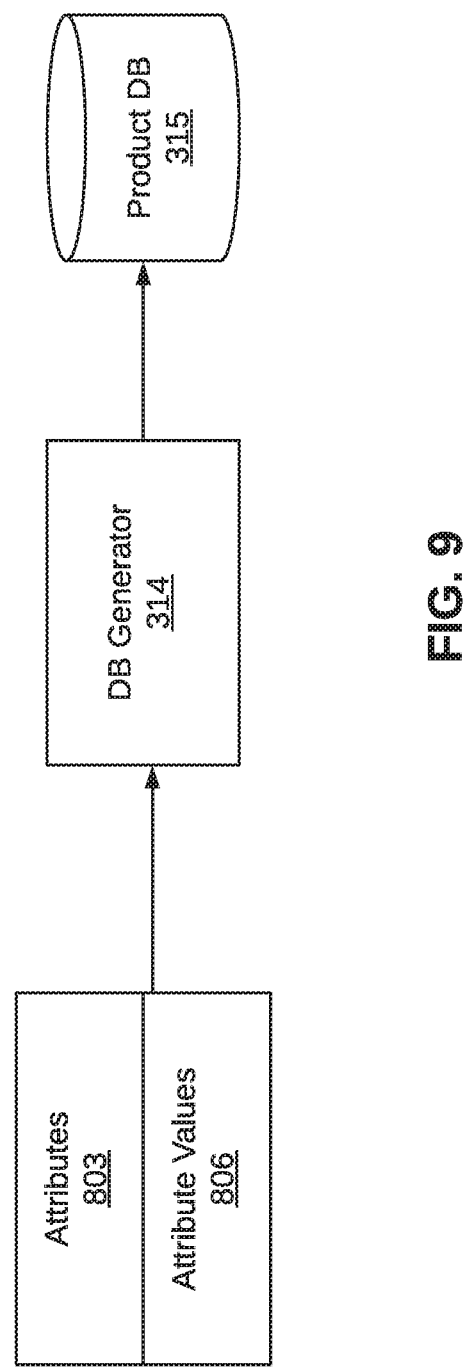

ARTIFICIAL INTELLIGENCE FOR PRODUCT DATA EXTRACTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

E-commerce websites host a large variety of products that can be purchased. Some of the products have multiple attributes that may apply to a single product, such as size and color. It would be desirable to be able to collect information about products and their attributes on the web in an automated fashion to develop an advantageous dataset containing information about the many products in the world.

BRIEF DESCRIPTION OF THE DRAWINGS

The present disclosure will become better understood from the detailed description and the drawings, a brief summary of which is provided below.

FIG. 6C illustrates an exemplary method for using a machine learning model to identify product attributes on a product page.

FIG. 9 illustrates an exemplary method of creating structured product data.

DETAILED DESCRIPTION OF THE PREFERRED EMBODIMENT

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

Disclosed embodiments relate to a method and system for crawling a website on a network to identify product pages. The product pages may be scraped by the crawler to obtain product data. Moreover, one or more interactive elements on the product pages may be automatically activated to be able to identify the various attribute variations available for the product, such as size and color. The products, attributes, and attribute values may be extracted and normalized and stored in a structured database for use in applications.

Figure 1:
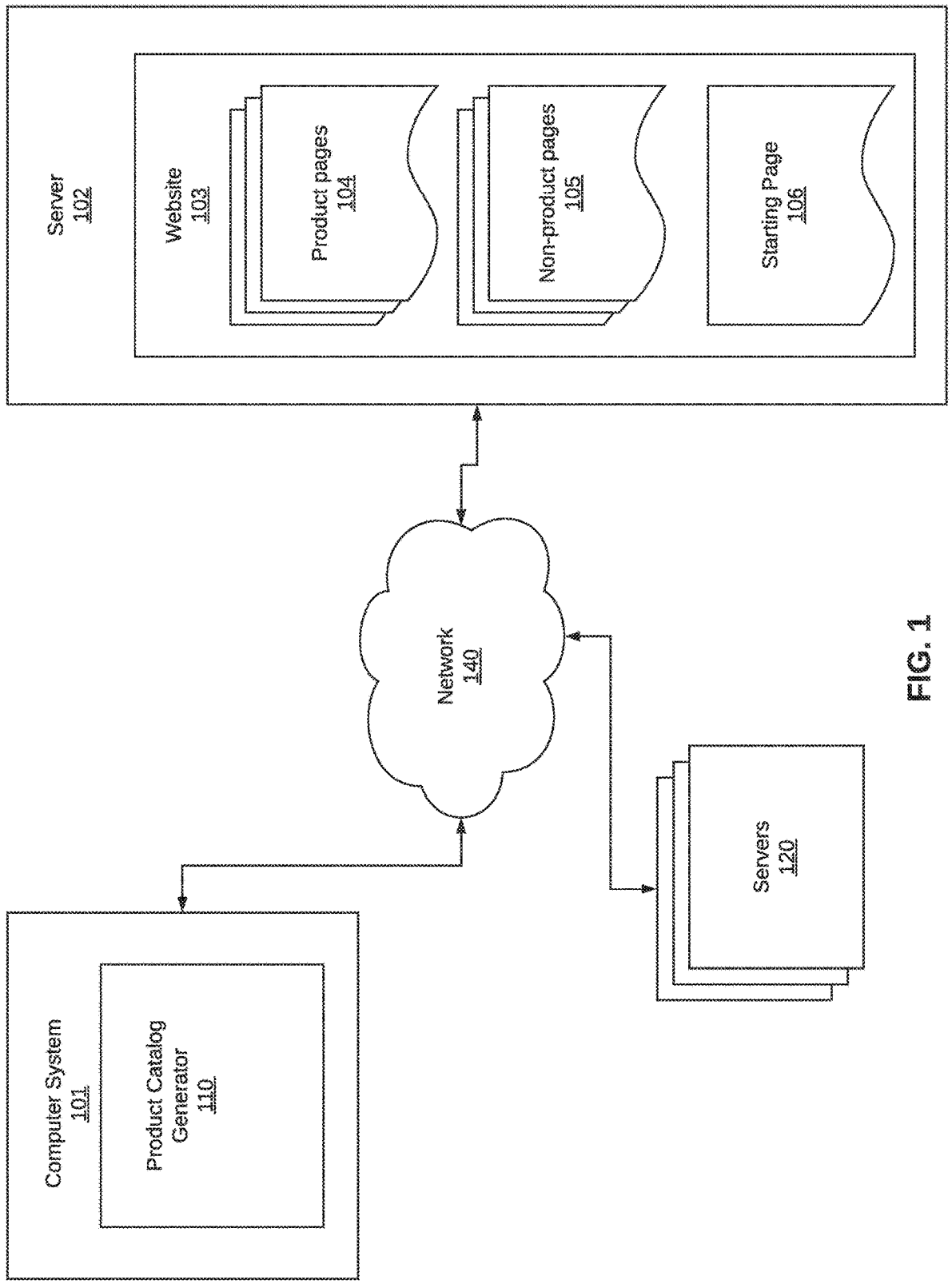
FIG. 1 illustrates an exemplary network environment in which embodiments of the invention may operate.

FIG. 1 illustrates an exemplary network environment in which embodiments of the invention may operate. Network 140 connects a plurality of computer systems. Network 140 may comprise, for example, an intranet, local area network, wide area network, the Internet, public switched telephone network (PSTN), network of networks, or other network. Computer systems on the network 140 may transmit and receive data with other computer systems.

Server 102 may be connected to the network 140 and may serve access to website 103, which may comprise a plurality of web pages including product pages 104, non-product pages 105, and a starting page 106. Each web page may include a location identifier to identify its location on the network 140 and allow retrieval, such as a uniform resource locator (URL). The product pages 104 may provide information about a product. In some embodiments, the product pages 104 allow purchasing the product. In other embodiments, the product pages 104 are informational without including the ability to purchase. Non-product pages 105 do not include information about a product, such as an About page, Careers page, Company History page, Support page, and so on. The starting page 106 serves as a starting point for access to the website 103. In some embodiments, the starting page 106 may be a home page. In other embodiments, the starting page 106 may be an arbitrary web page on the website 103 because it is often the case that any page on a website 103 may be accessed, through a series of links, from any starting webpage.

Computer system 101 may also be connected to the network 140. Computer system 101 may comprise any computing device such as a desktop, server computer, laptop, tablet, mobile device, mobile phone, digital signal processor (DSP), microcontroller, microcomputer, multiprocessor, smart device, voice assistant, smart watch, or any other computer. Computer system 101 may comprise product catalog generator 110, which may be a software program stored as instructions on computer-readable media and executable by a processor of the computer system 101. Product catalog generator 110 may comprise software to analyze one or more websites and extract the product data therein to generate a structured database of product data.

Other servers 120 may also reside on network 140 and be accessible over the network. Although the computer system 101, server 102, and other servers 120 are illustrated as single devices, it should be understood that they may comprise a plurality of networked devices, such as networked computer systems or networked servers. For example, the networked computer systems may operate as a load balanced array or pool of computer systems.

Figure 2A:
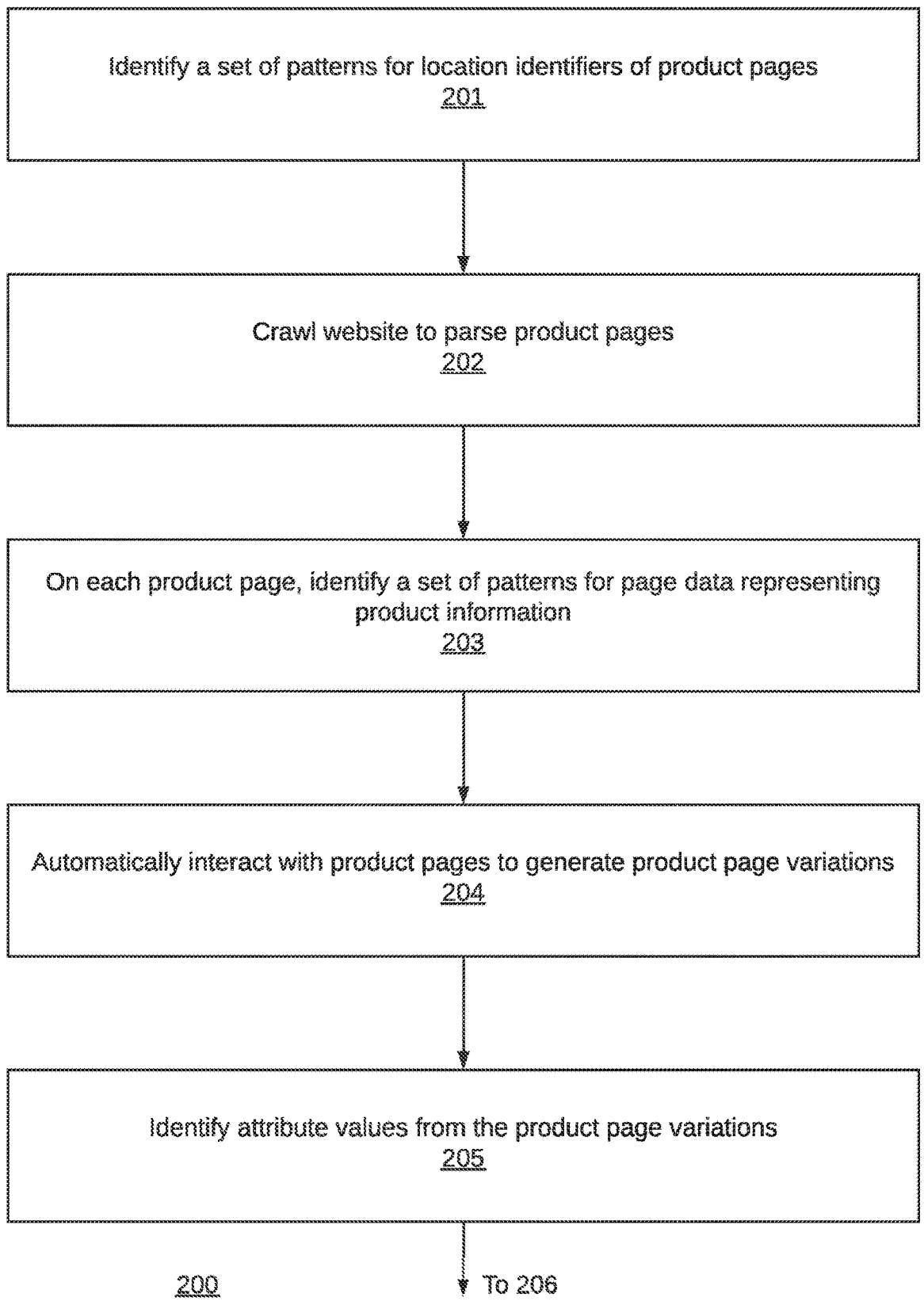
FIGS. 2A-B illustrate an exemplary method for generating a product catalog.
Figure 2B:
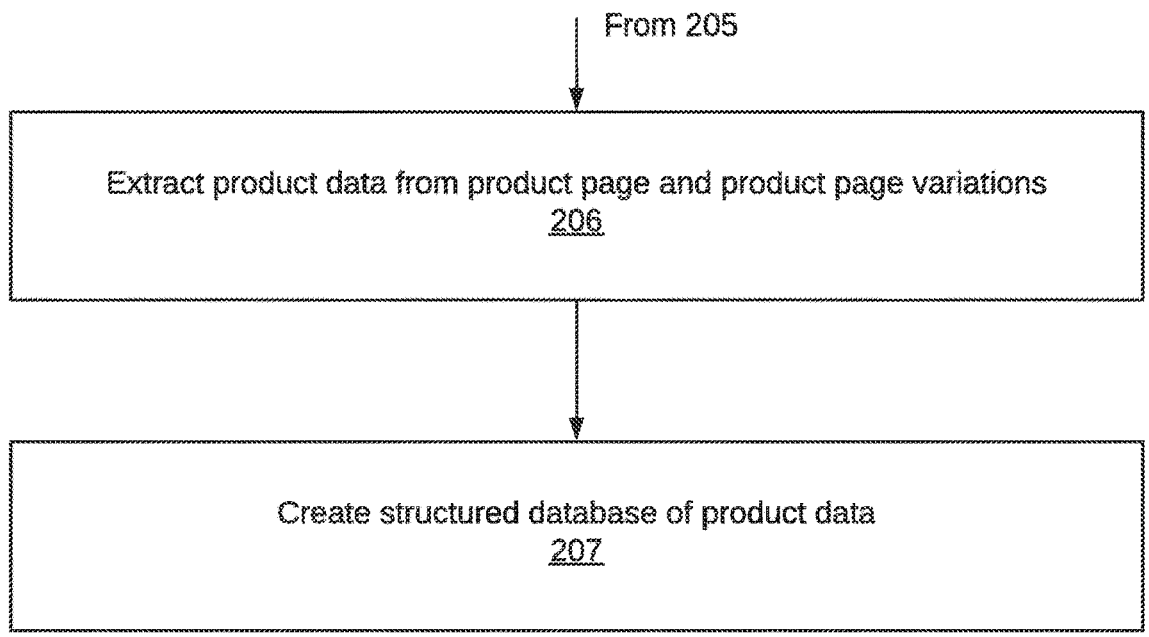

FIGS. 2A-B illustrates an exemplary method 200 for generating a product catalog that may be performed by product catalog generator 110.

In step 201, product catalog generator 110 may identify a set of patterns for location identifiers of product pages 104 on the website 103. These patterns may be used to identified product pages and distinguish them from non-product pages. Patterns may be specified using, for example, regular expressions, computer programming languages, computer grammars, and so on. The patterns may be used to identify certain segments of text and may be referred to as text patterns.

In step 202, the product catalog generator 110 may crawl website 103 to parse the product pages 104.

In step 203, on each product page, the product catalog generator 110 may identify a set of patterns for identifying page data representing product information 203. The patterns may identify product information and distinguish it from non-product information 203. Non-product information may include information that is not about the product, such as, footers, side bars, site menus, disclaimers, and so on. Patterns may be specified using, for example, regular expressions, computer programming languages, computer grammars, and so on. The patterns may be used to identify certain segments of text and may be referred to as text patterns.

In step 204, the product catalog generator 110 may automatically interact with the product pages 104 to generate product page variations. In some websites 103, interactive elements on the page may allow selecting product attributes for different variations, and which may lead to loading a product page variation. The product page variation may comprise a separate web page based on the selection of the variation in the product attribute. The interactive elements may include, for example, menus, drop-down menus, buttons, and other interactive elements.

In step 205, the product catalog generator 110 may identify attribute values from the product page variations. In an embodiment, the attribute values may be identified by computing a set of differences between the product pages and the product page variations. The differences may identify changes in the page content between the product page and a product page variation. These differences may correspond to attribute values that changed in response to interaction with the product page 104.

In step 206, the product catalog generator 110 may extract product data from the product page and product page variations. In some embodiments, the product catalog generator 110 identifies attributes, such as size and color, and attribute values that correspond to values that the attributes may take on, such as size 9.5, 10, 10.5, and colors such as blue, white, and gray. Attributes may be extracted by being matched to master list of attributes that is consistent across multiple websites 103 and attribute values may be normalized to a master list of attributes, similarly to create consistency across multiple websites 103.

In step 207, the product catalog generator 110 may create a structured database of product data. The structured database may take many forms as will be described in more detail herein.

Figure 3:
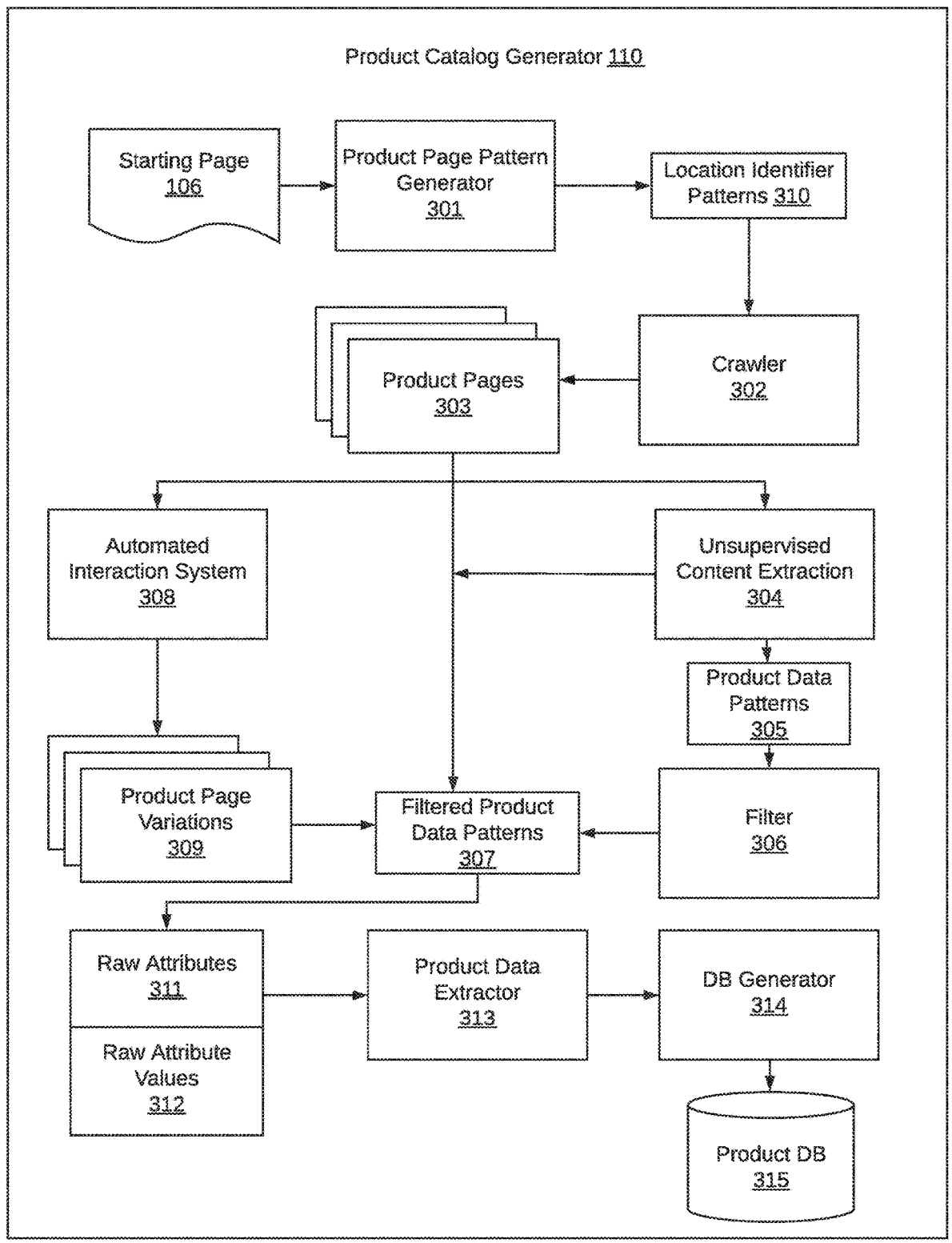
FIG. 3 illustrates exemplary components of product catalog generator in one embodiment.

FIG. 3 illustrates exemplary components of product catalog generator 110 in one embodiment. Components of product catalog generator 110 may include software programs, comprising one or more computer instructions, and data. In an embodiment, the product catalog generator 110 may include starting page 106 of the website 103. For example, starting page 106 may be downloaded from server 102. The starting page 106 may be input to a Product Page Pattern Generator 301 to perform step 201 and generate a set of location identifier patterns 310. The location identifier patterns 310 may identify product pages and non-product pages based on their location identifiers. The location identifier patterns 310 may be input to a web crawler 302. The crawler 302 may perform step 202 and crawl the website 103 to download a set of product pages 303. An Unsupervised Content Extraction (UCE) system 304 may operate on the product pages 303 to perform step 203 and identify a set of product data patterns 305. The product data patterns 305 may comprise patterns for identifying information about a product on a product page. The product data patterns 305 may be input to filter 306, which may filter the product data patterns 305 to narrow down the set of product data patterns 305 through a manual or automated review process to patterns that are the most effective. The filtering process generates filter product data patterns 307. In some embodiments, filtering is not performed and the product data patterns generated by the UCE system 304 are applied directly.

Automated Interaction System 308 may accept as input the product pages 303 and automatically interact with them (step 204) to generate product page variations 309. The product page variations 309 may comprise product pages generated through interaction with interface elements on the product pages 303. Differences may be computed between the product page variations 309 and the product pages 303 to identify attribute values (step 205).

The filtered product data patterns 307 are applied to the product pages 303 and product page variations 309 to extract raw attribute 311 and raw attribute values 312 (step 206). These are input to the product data extractor 313. The product data extractor 313 applies extraction to the raw attributes 311 and normalization to the attribute values 312 to obtain attributes and attribute values. The attributes and attribute values are input to DB Generator 314 to perform step 207 and generate product database 315. A database is any kind of structured data and may comprise any kind of database, including SQL databases, no-SQL databases, relational databases, non-relational databases, flat files, data structures in memory, and other structured collections of data.

Figure 4A:
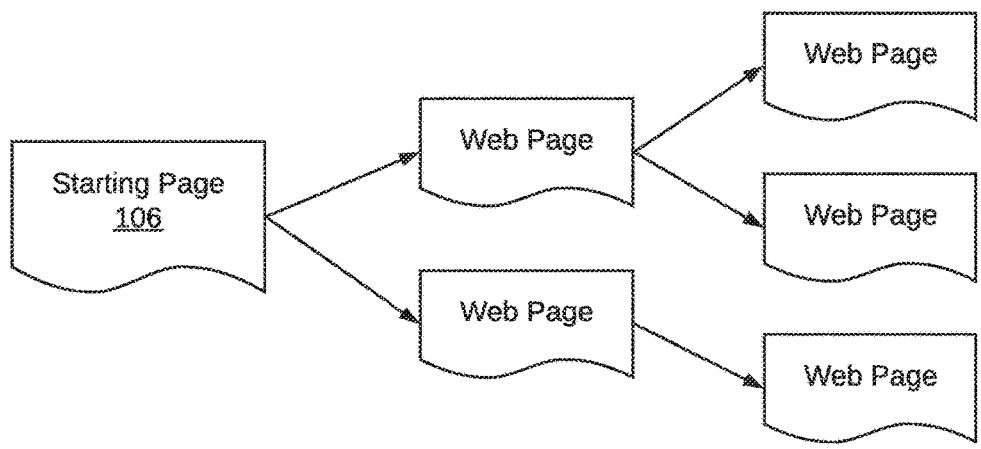
FIG. 4A illustrates an exemplary method for crawling a website.
Figure 4B:
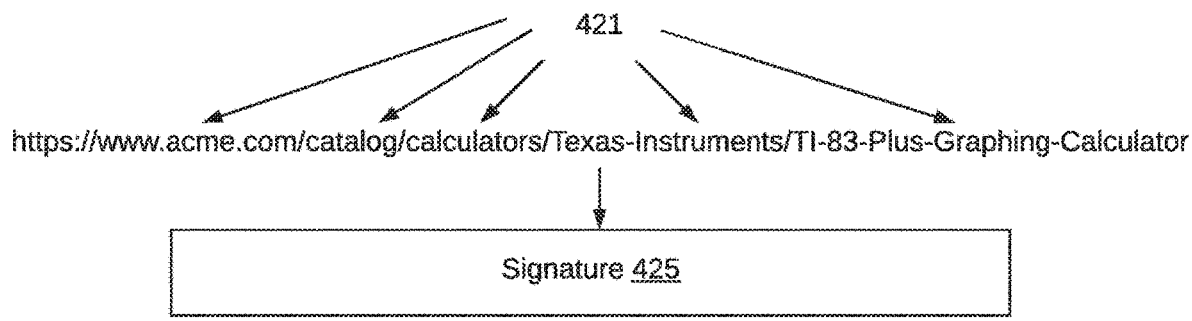
FIG. 4B illustrates an exemplary approach to dividing URLs into constituent parts.
Figure 4C:
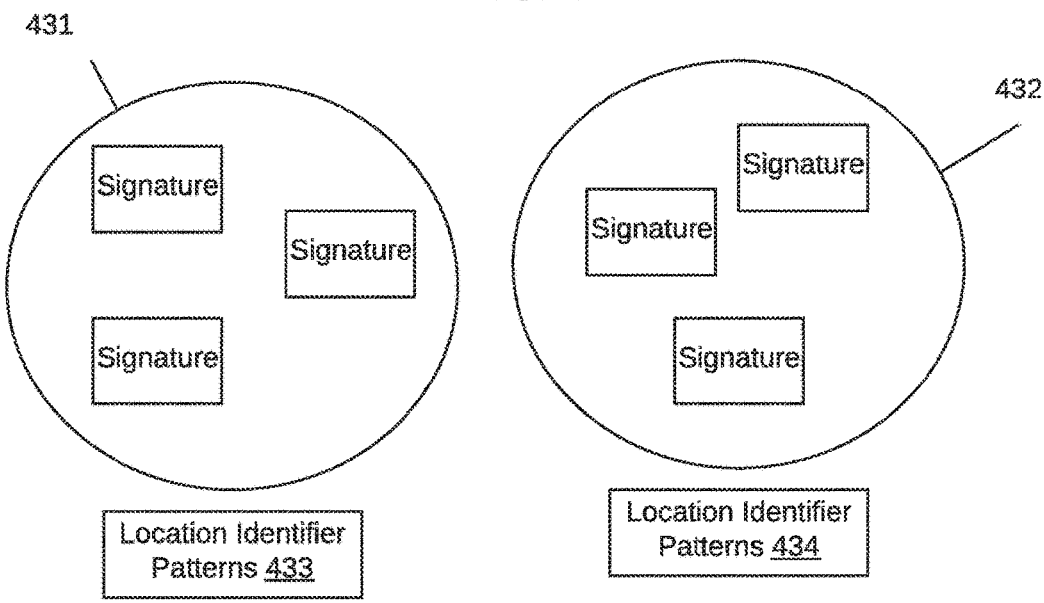
FIG. 4C illustrates clustering that may be performed to group URLs with similar signatures in some embodiments.

FIGS. 4A-C illustrate an exemplary implementation of step 201. As shown in FIG. 4A, in an embodiment, crawling is initiated from the starting page 106. The starting page 106 of website 103 may be chosen arbitrarily. From the starting page 106, crawling may be performed recursively by visiting each web page, extracting the URLs on the web page, and following all or a subset of the URLs on the web page. The process may continue until a stopping condition is reached, which may comprise extracting a threshold number of URLs.

FIG. 4B illustrates an exemplary approach to dividing each of the URLs into constituent parts 421. The division may occur at common delimiters such as forward or backward slashes, question marks, hash signs, and other punctuation marks or characters. Additional information may also be extracted from the URLs such as the domain, subdomain, and host information of the website 103. A signature 425 may be computed for the URL based on the number of constituent elements, the names and order of these elements, and the aforementioned additional information. The signature may be a numerical representation.

As illustrated in FIG. 4C, clustering may be performed to group URLs with similar signatures into clusters 431, 432. Any clustering algorithm may be used to group together numerically similar elements. The clustered elements may then be analyzed to determine common string elements or paths 421. In each cluster 431, 432, the constituents elements 421 of the URLs are analyzed to determine which elements are constant and which are variable. One or more location identifier patterns 433, 434 are generated for each cluster, which match the URLs in the cluster. The location identifier patterns 310 may include wildcards or text patterns for parts of the URLs that are variable, while having constant elements for the parts of the URL that do not change.

Figure 5:
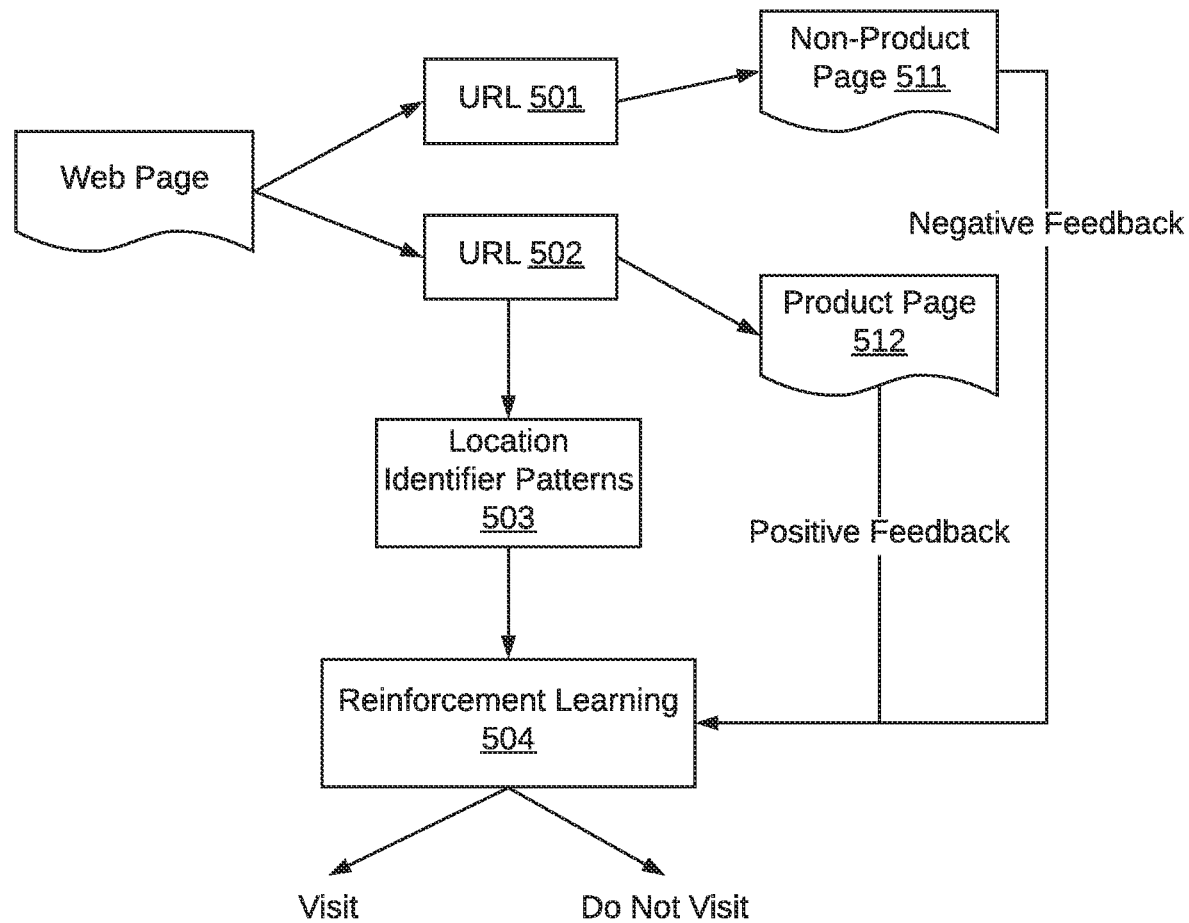
FIG. 5 illustrates an exemplary method of crawling a website to parse product pages.

FIG. 5 illustrates an exemplary implementation of step 202. In an embodiment, web pages of the website 103 are crawled starting from the starting web page 106. The same starting web page or a different starting web page may be used in steps 201 and 202. On each web page, the URLs 501, 502 are extracted from the content of the web page. The location identifier patterns 503 are applied to the URLs to determine if there is match to any of the clusters 431, 432. A reinforcement learning algorithm 504 may be used to determine if a given page URL is followed or not. The reinforcement learning algorithm 504 may learn to associate some of the clusters with product pages and other of the clusters with non-product pages. Reinforcement learning algorithm 504 may comprise an AI or machine learning system. If the URL matches a cluster that is associated with product pages, then the reinforcement learning system 504 causes the crawler 202 to visit the page. When a web page is visited, filtered product data patterns 307 are run on the page to determine that the web page is a product page and to extract data from it. If the page is not a product data page (i.e., a non-product data page 511), then negative feedback is input to the reinforcement learning system 504 to make it less likely to visit URLs matching the associated location identifier pattern in the future. The reinforcement learning system 504 may learn to associate certain location identifier patterns with non-product pages based on the feedback. When a product page 512 is visited, then positive feedback may be input to the reinforcement learning system to cause it to visit web pages matching the associated location identifier pattern more often. In some embodiments, the product pages are stored and tracked, and when a product page is visited again then negative feedback is provided instead of positive feedback to reduce duplication. The positive and negative feedback may be provided in the form of positive and negative scores in a reward system.

FIGS. 6A-G illustrate an exemplary implementation of step 203. Processes may be performed by UCE system 304 to identify product data patterns 305 that identify product data in the content of the web page.

Figure 6A:
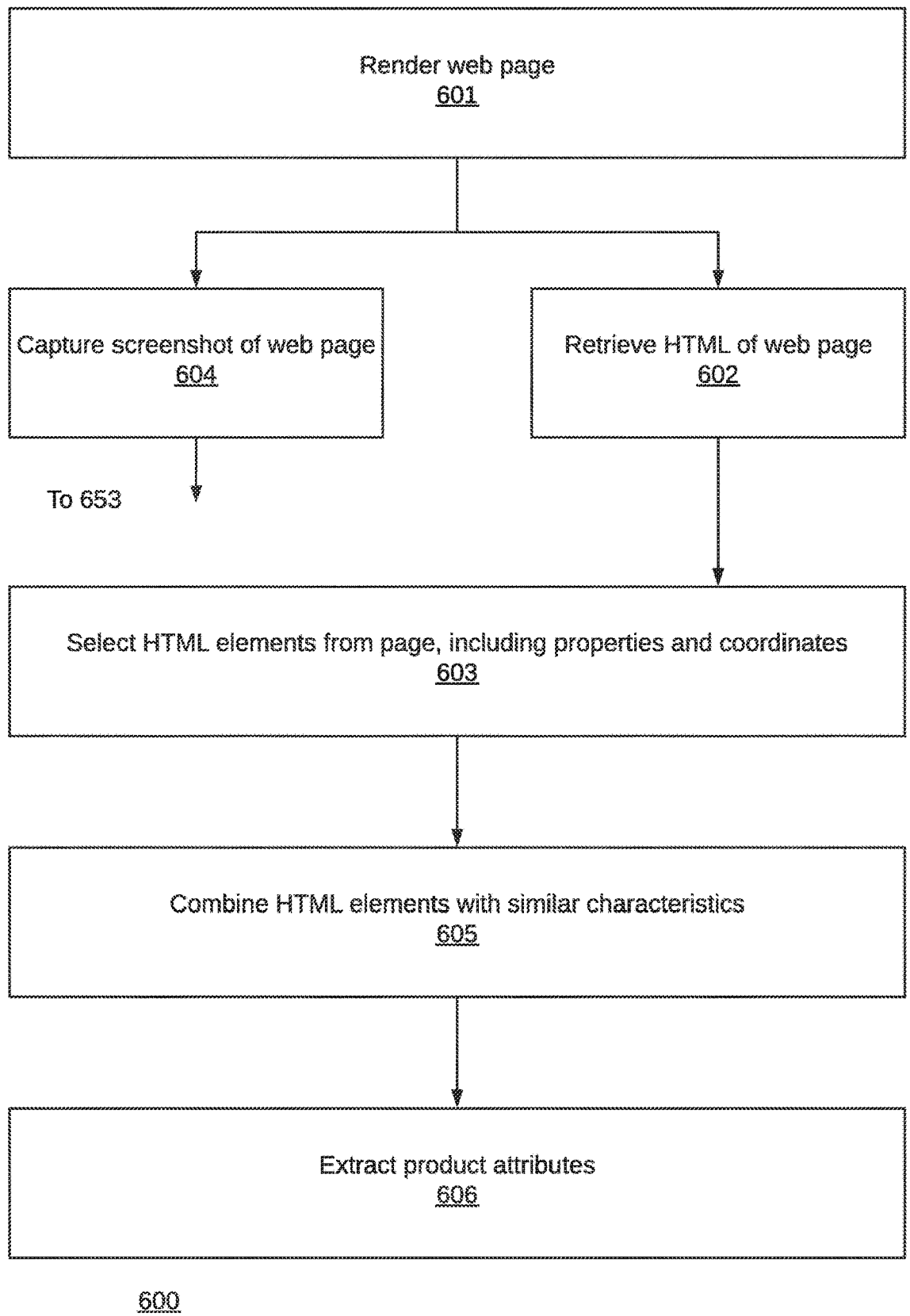
FIG. 6A illustrates an exemplary method that may be performed on a product page.

FIG. 6A illustrates an exemplary method 600 that may be performed on a product page, after the web page has been determined to be a product page. In step 601, the UCE system 304 may render the web page. For example, the web page may be rendered in a headless web browser. In step 602, the HTML code on the web page may be retrieved, such as in text form. In step 603, hypertext markup language (HTML) elements are selected from the web page, including a plurality of properties of the HTML elements and their coordinates on the web page. In step 604, a screenshot of the web page may be taken. In some embodiments, step 604 may occur in parallel to step 602. Additional processing of the screenshot is described in FIG. 6F. In step 605, HTML elements with similar characteristics may be combined. For example, portions of a product description may appear in multiple HTML elements and may be combined by the system into a single product description field. In step 606, product attributes may be extracted from the web page. In some embodiments, the product attributes are extracted as product data patterns 305 that may be applied to the product page to identify product information on the web page.

Figure 6B:
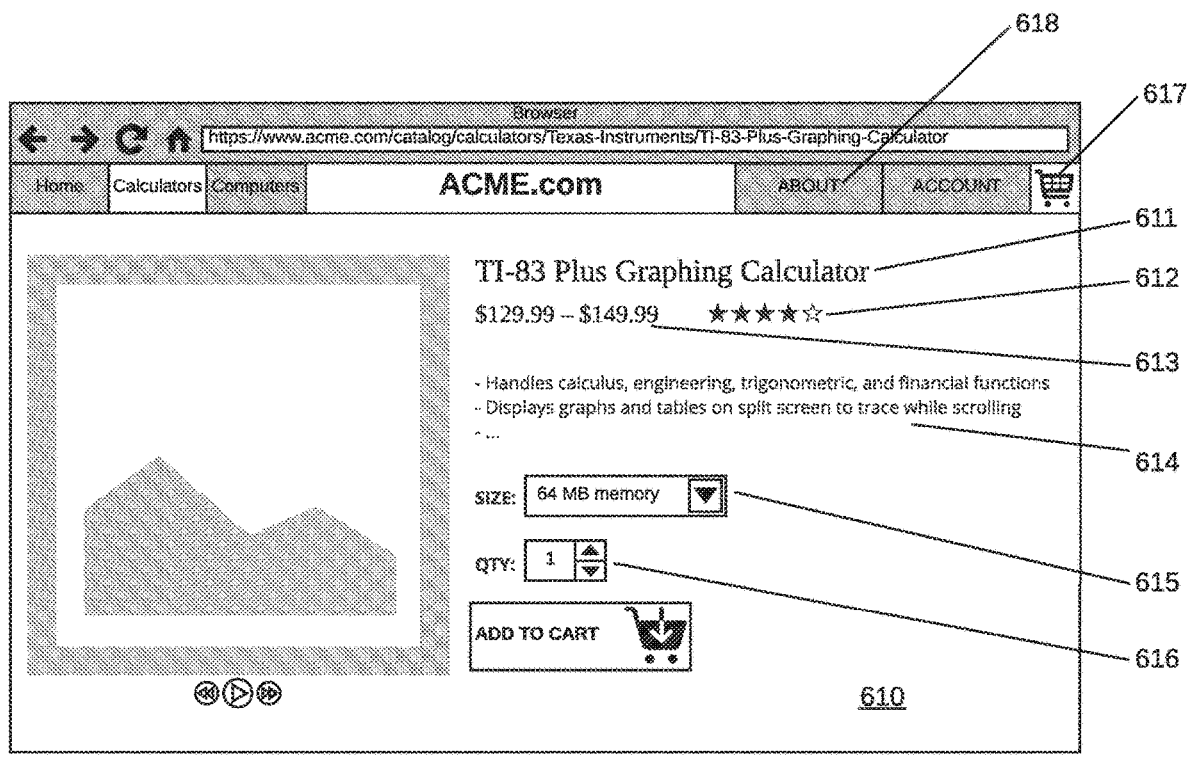
FIG. 6B illustrates exemplary HTML elements selected from a web page.

FIG. 6B illustrates HTML elements selected from a web page 610. The HTML elements may include a product title 611, product rating 612, price 613, product description 614, size 615, quantity 616, shopping cart button 617, and about button 618. The HTML elements may be identified automatically by analyzing text patterns, though the identity of what the HTML elements correspond to may not be known until after method 600 is performed. For each element, CSS properties may be identified based on the web page 610 source code. CSS properties may include font-size, font-weight, position, relative size, and so on. Other properties may also be computed, such as the number of words, number of sentences, and so on. Some features may be computed relative to other elements on the page, such as distance from other elements.

Method 600 for identifying product attributes in a page may be implemented in a plurality of ways. Four embodiments will be described herein, including machine learning, identification of meta tags, applying known patterns in a Document Object Model (DOM) structure, and image segmentation.

FIG. 6C illustrates an exemplary method 620 for using a machine learning model to identify product attributes on a product page. In step 621, a machine learning model is trained to identify product attribute based on features of HTML elements. The features of the HTML elements may comprise any of the properties and aspects described herein, such as CSS properties, computed properties, and coordinates. The machine learning model may be trained with training examples comprising feature sets of HTML elements and their corresponding output labels identifying what product attribute they correspond to, or whether they do not correspond to a product attribute. By training on the training examples, the internal parameters of the machine learning model may be adjusted to learn a model for classifying HTML elements to product attributes based on their features.

In step 622, HTML elements may be selected from the web page, including their various properties and coordinates. In step 623, the machine learning model may be applied to the HTML elements to predict whether they correspond to a product attribute, and which product attribute they correspond to, if so.

In some embodiments, a single machine learning model may be used to classify each of the HTML elements to product attributes. In other embodiments, separate machine learning models may be used for individual product attributes. For example, one machine learning model may be used for detecting the size attribute and another may be used for detecting the color attribute.

Figure 6D:
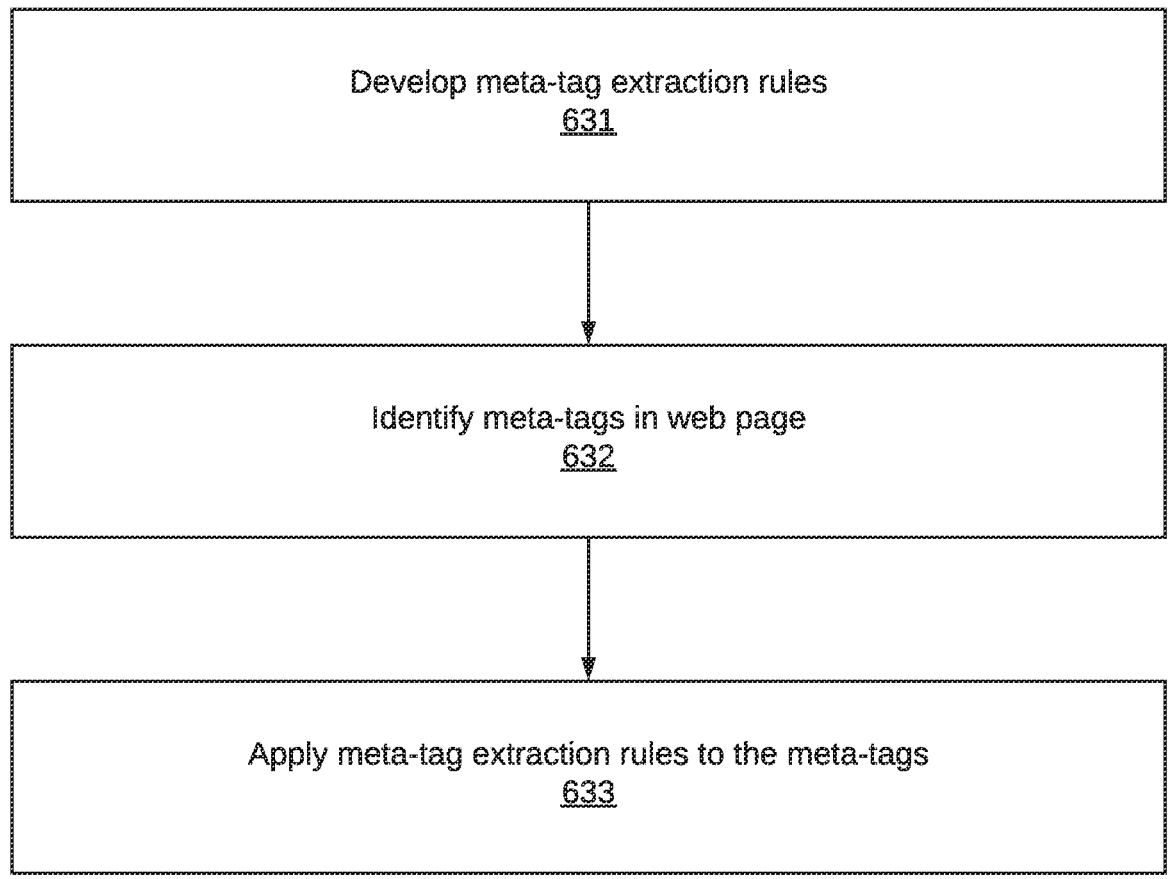
FIG. 6D illustrates an exemplary method for extracting product attributes using meta-tags.

FIG. 6D illustrates method 630 for extracting product attributes using meta-tags. HTML web pages may include meta-tags, which specifically identify certain attributes. Various meta-tag conventions exist. For example, in the Open Graph Protocol, meta-tags are identified with og:attribute. Thus, the product title may be extracted from <meta property="og:title" content="iPhone 8 64 GB"/>. Similarly, Schema Markup Tags use the form itemprop="attribute" to identify attributes, such as itemprop="price" for the product price. In other embodiments, in JSON LD, product attributes may be encoded in JSON and may be parsed using a JSON parser.

In step 631, meta-tag extraction rules are developed. In step 632, meta-tags are identified in a web page by parsing the web page. In step 633, the meta-tag extraction rules are applied to the meta-tags to extract the associated values.

Figure 6E:
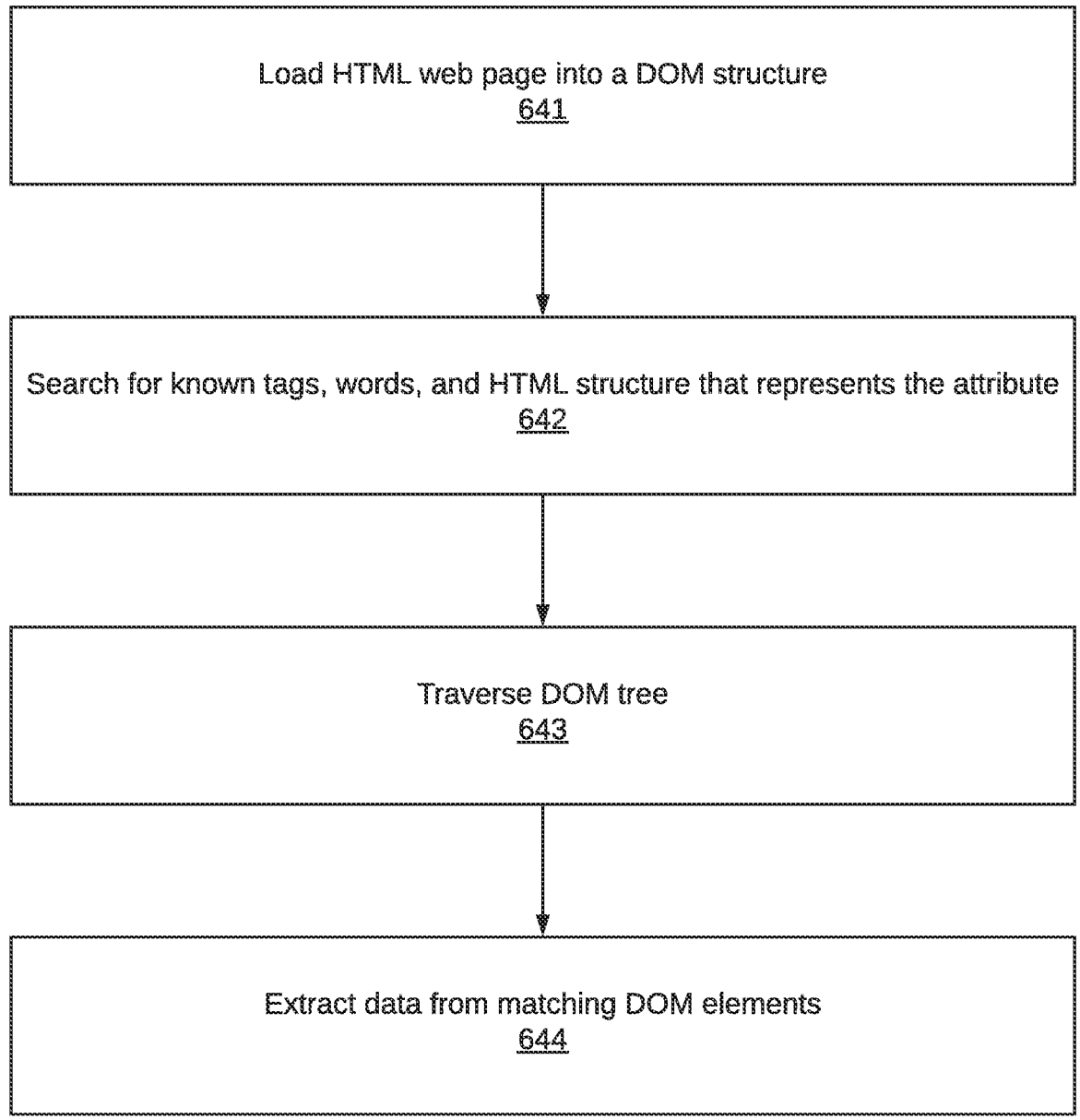
FIG. 6E illustrates an exemplary method for extracting product attributes using a DOM structure.

FIG. 6E illustrates an exemplary method 640 for extracting product attributes using a DOM structure. A DOM structure is a structured tree representation of a web page. In step 641, a product page may be loaded from its HTML into a DOM structure. In step 642, each DOM element may be searched for known tags, words, and HTML structures that represent a product attribute. The search may be heuristic and based on known tags, words, and HTML structures that are typically associated with a particular attribute. In step 643, the DOM tree may be traversed and the processed applied to each DOM element. In step 644, data may be extracted from matching DOM elements.

Figure 6F:
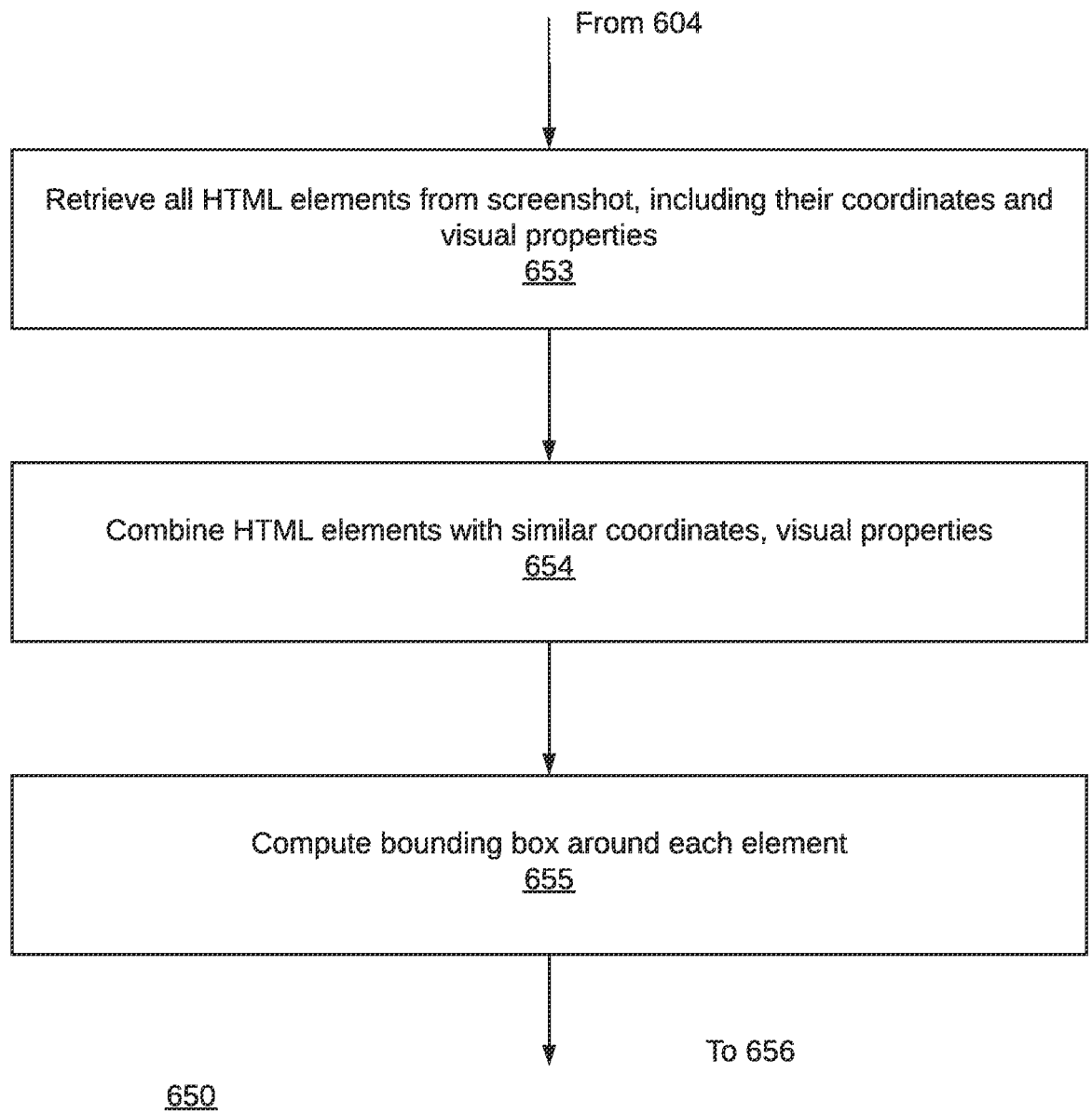
FIGS. 6F-G illustrate an exemplary method for extracting product attributes using computer vision.
Figure 6G:
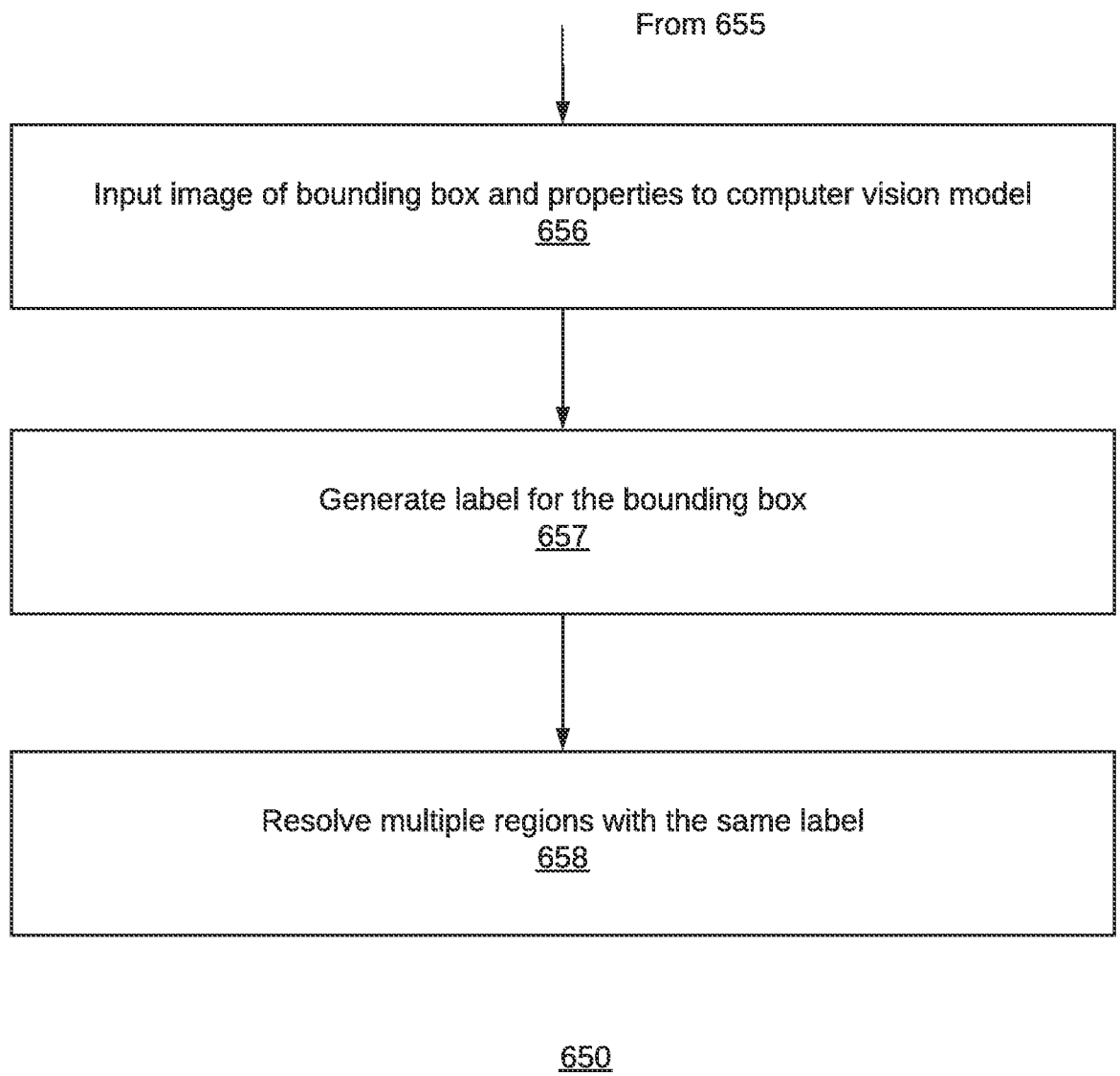

FIGS. 6F-G illustrate an exemplary method 650 for extracting product attributes using computer vision, and which may comprise a continuation of method 600 for extracting product attributes. As described above, in step 604, a screenshot is captured of the website. In step 653, all the HTML elements of the web page are retrieved from the screenshot. The HTML elements may include the visual representation of the HTML elements, such as an image of the HTML elements extracted from the screenshot. Moreover, the HTML elements, may include their visual properties, such as color and height, and coordinates on the web page. In step 654, HTML elements with similar characteristics may be combined. For example, HTML elements with adjacent or overlapping coordinates may be combined. In step 655, a bounding box is computed around each of the HTML elements. The bounding boxes may comprise coordinates, such as a left and right X value and top and bottom Y value. The bounding boxes may be derived based on the HTML code of the HTML elements. In step 656, an image may be captured of the contents of each bounding box and these images may be input to a computer vision model. In step 657, the computer vision may predict a label for each image to identify each as a product attribute or not. If the image corresponds to a product attribute, the computer vision model may predict which product attribute it corresponds to. In step 658, if multiple images correspond to the same product attribute, then these conflicts may be resolved. For example, the computer vision model may output associated confidence values, and the label with the highest confidence value may be applied.

After UCE system 304 has generated the product data patterns 305, additional filtering 306 may be applied to further refine the automatically generated product data patterns 305. The filtering process may generate filtered product data patterns 307.

FIGS. 7A-E illustrate an exemplary implementation of steps 204-205. Product catalog generator 110 may perform automated interactions with product pages 303 to generate product page variations. The initially generated product pages 303 may be referred to as base product pages to distinguish them from the product page variations 309.

Figure 7A:
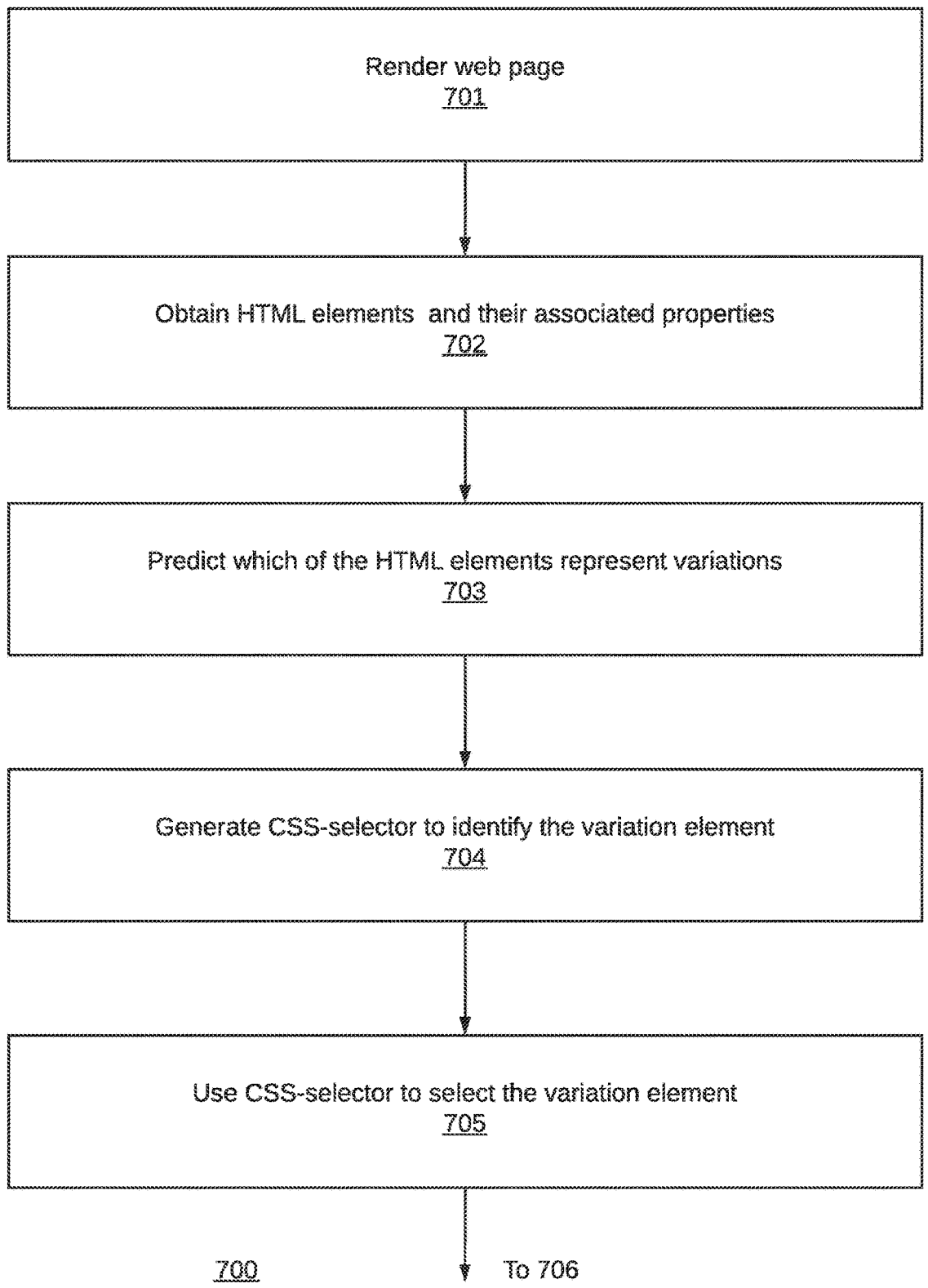
FIGS. 7A-B illustrate an exemplary method that may be used to perform interactions on a product page and generate product page variations.
Figure 7B:
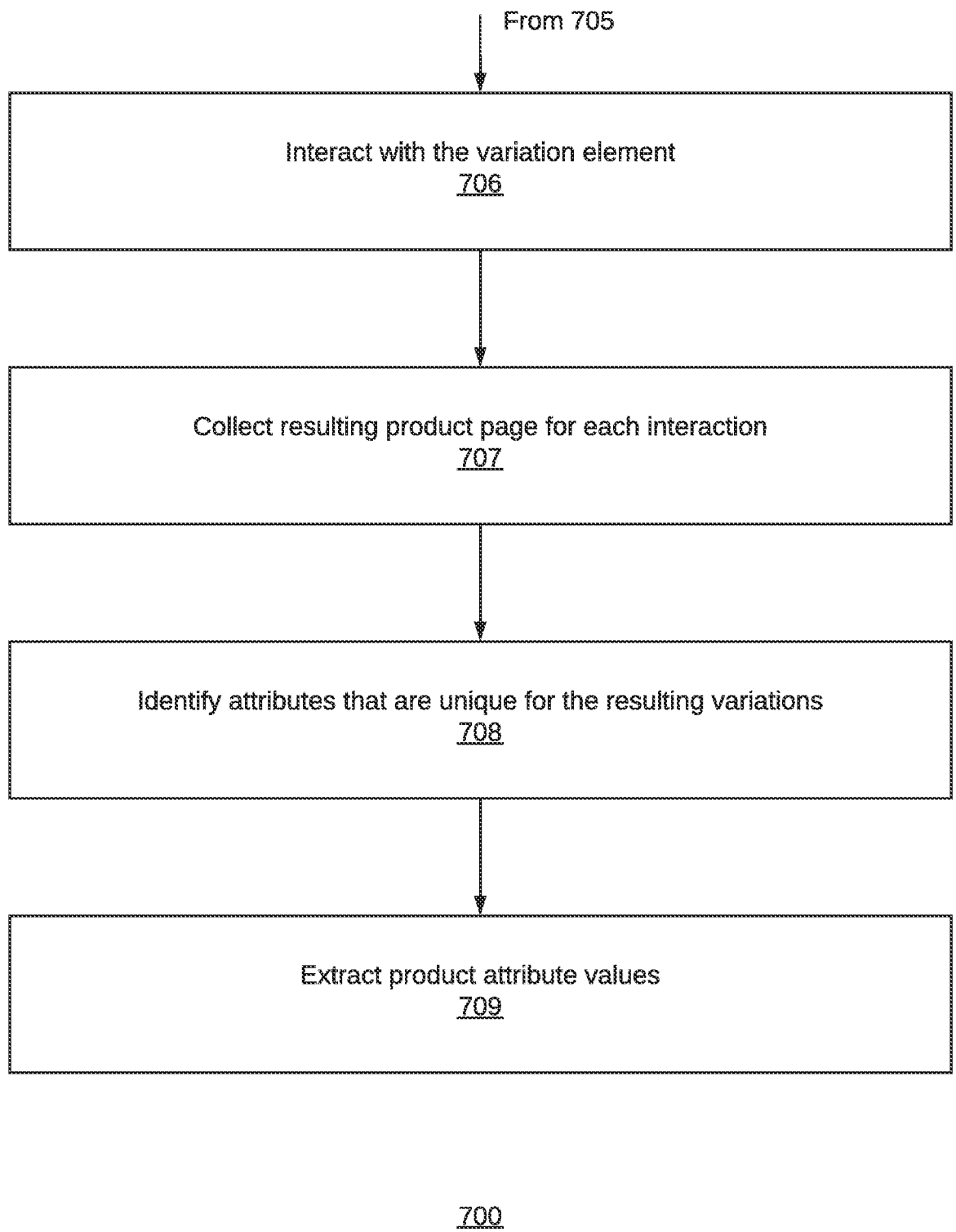

FIGS. 7A-B illustrate an exemplary method 700 that may be used to perform interactions on a product page and generate product page variations 309.

In step 701, a web page may be rendered in a headless browser. In step 702, the HTML elements of the web page and their associated properties may be obtained. The properties may include, for example, CSS properties, computed properties, and coordinates. In step 703, the program may predict which of the HTML elements represent interface elements corresponding to a variation (variation elements). In step 704, a CSS-selector may be generated to identify the aforementioned variation elements. In step 705, the CSS-selector may be used to select the variation element. In step 706, the variation element may be interacted with automatically from a headless browser emulating human interaction with the element. The automatic interaction may be performed systematically to iterate through each option available for the variation element. Moreover, each variation element may be systematically activated so that all variations of all variation elements are tried. In step 707, the resulting product pages for each of the interactions may be collected. In step 708, the automated interaction system 308 may identify attributes that are unique for the product page variations. The unique attributes may be identified by computing differences between the base product pages and the product page variations. This may be referred to as computing a diff. The differences identify the unique data that exists only on the product page variation. The unique attributes identified in this way may correspond to attribute values. For example, by activating a size button on a product page for size 9.5, a new product page variation may be generated that may be identical to the base product page except that it identifies the size is 9.5. By computing differences, the value 9.5 may be identified as a difference in the page. In step 709, the product attribute values may be extracted by obtaining the differences between the pages.

Figure 7C:
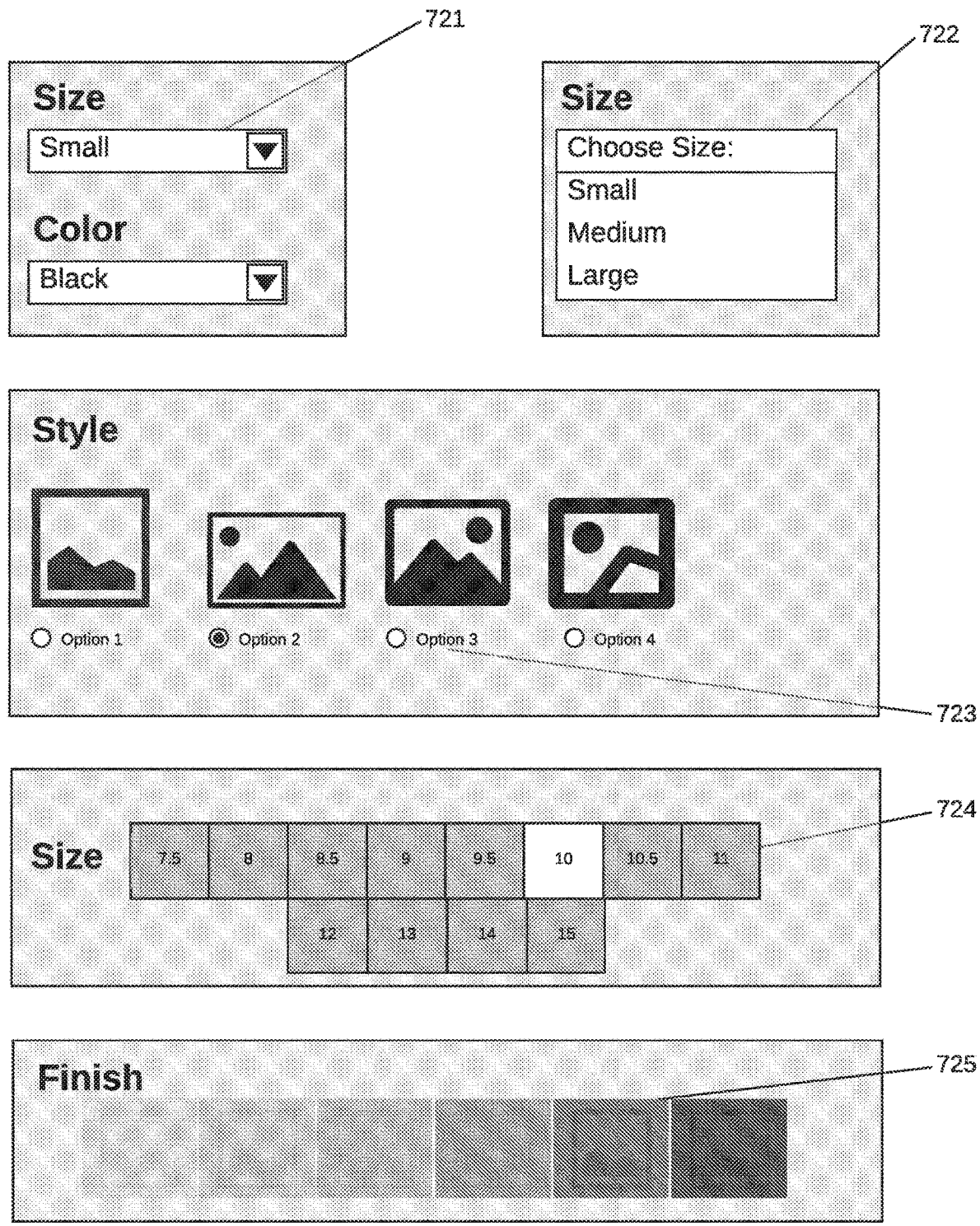
FIG. 7C illustrates a variety of exemplary interaction elements that may be used in an automated interaction system.

FIG. 7C illustrates a variety of interaction elements that may be used in the automated interaction system 308. A wide variety of button, menu elements, and other interface elements may be interacted with by the automated interaction system 308. For example, drop-down menus 721 and 722 may be interacted with. Menu 721 is created with an HTML drop-down menu element and menu 722 is styled to act like a drop-down menus using other HTML components. Radio buttons 723, buttons 724, and image buttons 725 may all be interacted with.

Figure 7D:
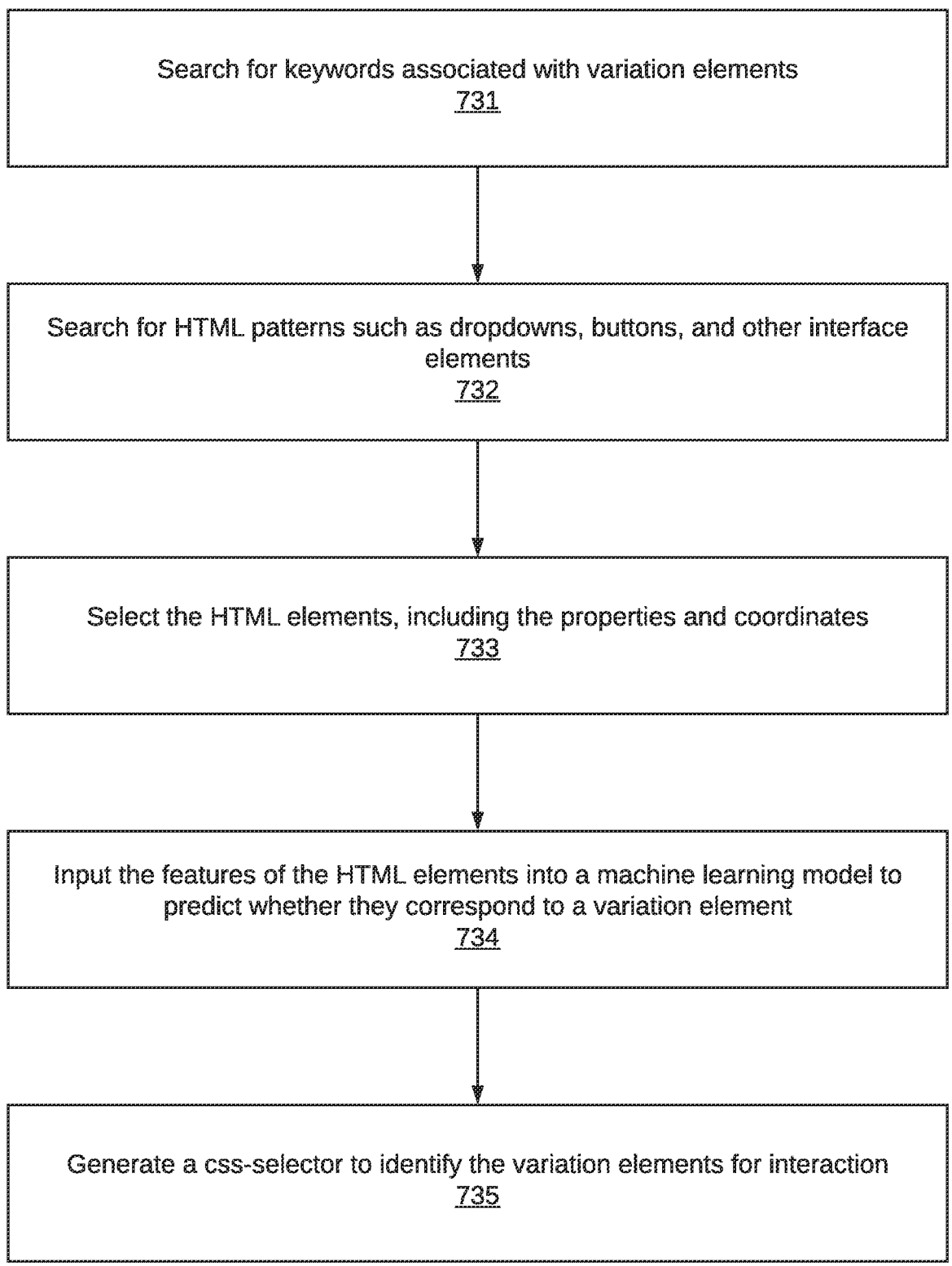
FIG. 7D illustrates one exemplary method for identifying variation elements on a web page.

FIG. 7D illustrates one exemplary method 730 for identifying variation elements on a web page. In step 731, the automated interaction system 308 searches for keywords associated with variation elements. For example, keywords signifying a product attribute, such as size or color, may be associated with variation elements as a label. HTML elements associated with the keywords are identified. In step 732, the automated interaction system 308 searches for HTML patterns such as dropdowns, buttons, and other interface elements that are associated with variation elements. In step 733, the HTML elements identified via keywords in step 731 or HTML patterns in step 732 are selected along with their properties and coordinates. These properties are, for example, CSS properties, computed properties, or coordinates as described in FIG. 6B, for example. In step 734, the features of the HTML elements are input into a machine learning model to predict if the HTML element corresponds to a variation element, and, if so, what kind of variation element. The machine learning model may be trained based on training examples of HTML features and corresponding output labels identifying whether the HTML element is a variation element and the type of variation element. In step 735, once the HTML elements corresponding to the variation elements are identified, a CSS-selector is generated to identify the variation elements for interaction. The CSS-selector may be used to select all of the variation elements so that they may be interacted with by the automated interaction system 308.

Figure 7E:
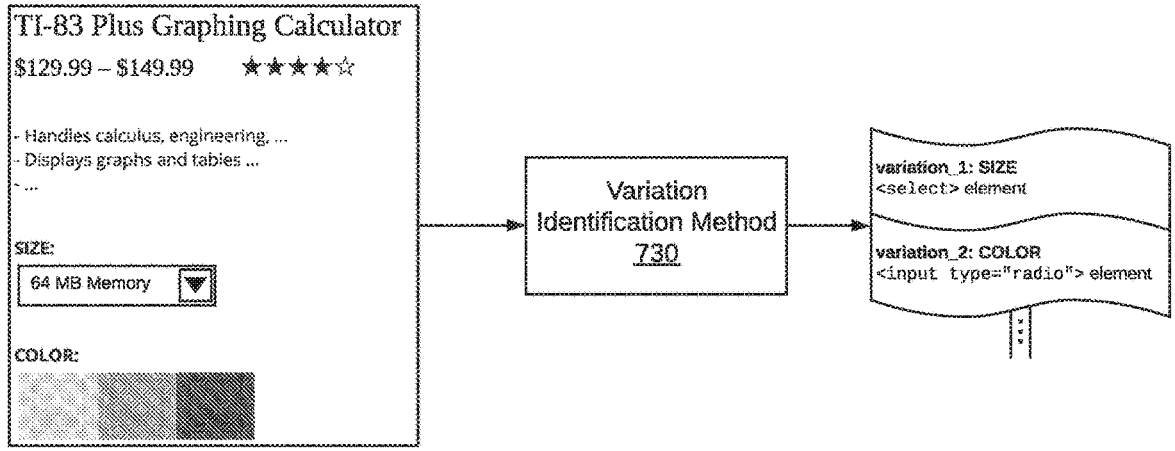
FIG. 7E illustrates the use of a selector to select variation elements for generating product page variations in some embodiments.

FIG. 7E illustrates the use of a selector to select variation elements for generating product page variations 309. As shown, a raw HTML web page and variation text is illustrated. This is passed into variation identification method 730, which identifies the variation elements in the page. The variation identification method may find a common patterns for identifying HTML elements using a selector and generate the appropriate selector for the variation elements. The selector is generic enough to capture all forms of the variation element on the page, without capturing non-variation elements. By applying the selectors, variation elements are identified, such as a variation element for selecting size and another variation element for selecting color.

Figure 7F:
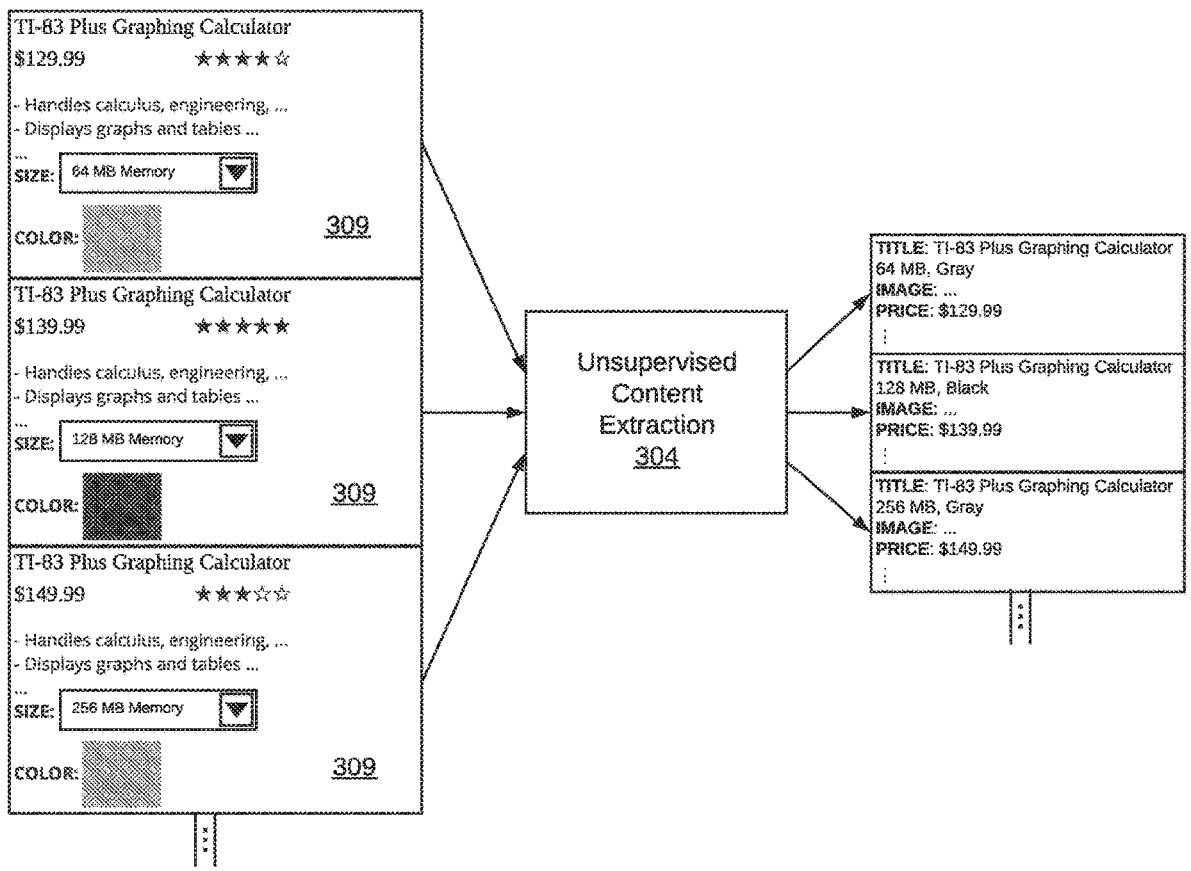
FIG. 7F illustrates an exemplary process by which a UCE system is applied to a plurality of the product page variations to automatically extract the attributes and attribute values from product page variations.

FIG. 7F illustrates a process by which the UCE system 304 is applied to each of the product page variations 309 to automatically extract the attributes and attribute values from the product page variations 309. As illustrated, the UCE system 304 extracts attributes such as title, image, and price and the correct values of each value from a plurality of product page variations.

Figure 8A:
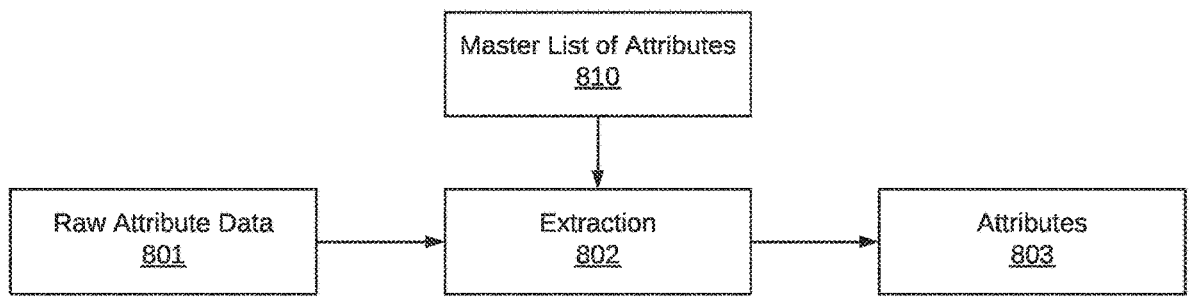
FIG. 8A illustrates a process by which raw attribute data from product pages may be standardized.
Figure 8B:
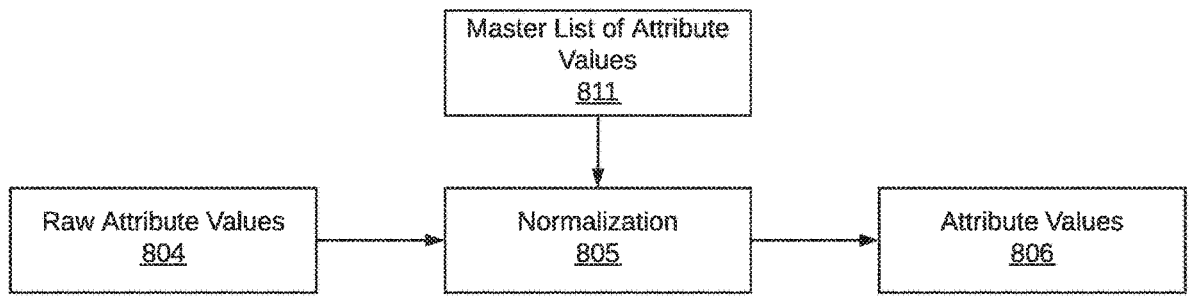
FIG. 8B illustrates a process by which raw attribute values from product page variations may be standardized.

FIGS. 8A-B illustrate an exemplary implementation of step 206. The product catalog generator 110 may be used to generate a product catalog of information across multiple web sites. Websites in different domains may refer to product attributes and product values using different names and, for the product catalog to be useful, it may be desirable to standardize them. For example, product attributes such as price and cost or weight and product weight may be standardized to the same value. Similarly, product attribute values such as gray and grey may be standardized to the same value. Product attribute values may also be standardized across different measurement systems such as translating between the metric system and the U.S. measurement system.

FIG. 8A illustrates a process by which raw attribute data from product pages 303 may be standardized. A master list of attributes 810 may be stored and accessed. The master list of attributes 810 may comprise all the attributes in the product catalog. In some embodiments, the master list of attributes 810 may also comprise a mapping from non-standardized attributes (e.g., product weight) to the standardized attributes (e.g., weight). The raw attribute data 801 may undergo an extraction process 802 where the master list of attributes 810 is accessed to identify the corresponding standardized attribute. The resulting attributes 803 may be output.

FIG. 8B illustrates a process by which raw attribute values 804 from product page variations 309 may be standardized. A master list of attribute values 811 may be stored and accessed. The master list of attribute values 811 may comprise all the valid attribute values. For fields with numerical ranges, like weights, the master of list of attribute values 811 might not enumerate all the possible values but instead identify the standardized units for the value so that product page variations listing other units may be standardized. In some embodiments, the master list of attribute values 811 may comprise a mapping from non-standardized attributes (e.g., grey) to the standard attribute values (e.g., gray). The raw attribute values 804 may undergo a normalization process 805 where the master list of attribute values 811 is accessed to identify the corresponding standardized attributed values. The resulting attribute values 806 may be output.

FIG. 9 illustrates an exemplary implementation of step 207. Attributes 803 and attribute values 806 may be input to a database generator 314 to generate product database 315.

In one embodiment, product database 315 comprises a graph database where the nodes correspond to products and the edges correspond to attributes and values. For example, all nodes where the brand attribute is equal to Apple may be connected by an edge. The use of edges corresponding attributes and values allows easy filtering of products based on attribute values.

In one embodiment, product database 315 comprises a full-document store or free-text database. The product database 315 may store the full text identifying the products, attributes, and available attribute values. For example, a database entry for a product may include information about all the attributes and all the potential values of those attributes. This enables a user to quickly review all the possible variations of a product. The product database 315 may include one or more indices allowing for quick search and retrieval.

In one embodiment, product database 315 includes with one or more of the product entries a product embedding. The product embedding may comprise a vector representing the product. The vectors may be generated with a machine learning model that accepts product features, such as attributes and attribute values, as input and output the product embedding. The machine learning model may be trained to generate product embeddings that are close together in vector space for products that are similar and that are farther away for products that are dissimilar. The dimension of similarity may be configured to a specific problem and different machine learning models may be trained to generate product embeddings for different purposes. For example, one machine learning model may produce product embeddings based on the brand of the product, so that products from the same or a similar brand are close in vector space, while a different machine learning model may instead be configured to produce product embeddings based on the size of the product.

Once the product embeddings are generated, they may be used to find similar products. Similarity between products may be evaluated using vector distance metrics such as dot product, cosine similarity, and other metrics. Therefore, fast evaluation may be performed to compute the similarity between any product any one or more other products.

The product database 315 may be used for a variety of purposes, such as search and retrieval or hosting of a product website. In some embodiments, portions of the product database 315 may be displayed to a user.

Further described herein are methods, systems, and apparatus, including computer programs encoded on computer storage media, for artificial intelligence for compliance simplification in cross-border logistics An aspect of the present disclosure relates to methods, systems, and apparatus, including computer programs encoded on computer storage media, for artificial intelligence for compliance simplification in cross-border logistics. A computer system and method may be used to infer product information. A computer system may feed a product data record into a machine learning (ML) models to identify a predictive attribute(s) that corresponds with identifying accurate product information. The computer system may feed the product data record and the predictive attribute into a ML model(s) to estimate additional data for the product data record. The computer system may update the product data record with the estimated additional data. The computer system may predict product code data by feeding the updated product data record into an ensemble of ML models, the product code data based on one or more commerce classification code taxonomies.

In general, one innovative aspect of disclosed embodiments includes a computer system, computer-implemented method, and non-transitory computer-readable medium having instructions for inferring information about a product. A computer system feeds a product data record into one or more machine learning (ML) models to identify at least one predictive attribute that corresponds with identifying accurate product information. The computer system feeds the product data record and the predictive attribute into the one or more machine learning models to estimate additional data for one or more null fields in the product data record. The product data records are updated with the estimated additional data. The computer system predicts product code data by feeding the updated product data record into an ensemble of one or more ML models, where the product code data based on one or more commerce classification code taxonomies.

In general, another innovative aspect of disclosed embodiments includes a computer system, computer-implemented method, and non-transitory computer-readable medium having instructions for inferring information about a product. A computer system retrieves at least one product data attribute based on a formatting convention of input data. The computer system augments the input data with the retrieved product data attribute for a product data record. The computer system ranks historical product data records in historical shipment information that satisfy a similarity threshold with the product data record. The product data is fed into one or more machine learning (ML) models to identify at least one predictive attribute that corresponds with identifying accurate product information. The product data record, the ranked historical product data records and the predictive attribute are merged to generate predictor data. The predictor data is fed into one or more ML models to estimate additional data for one or more null fields in the product data record. The product data record is updated with the predicted additional data to generate an enriched product data record. The enriched product data record is fed into an ensemble of one or more ML models to predict product code data based on one or more commerce classification code taxonomies. And the computer system adds the predicted product code data to the enriched product data record.

Disclosed embodiments relate to a method and system for a Predictor that infers product information. Product input data may be incomplete with respect to all the types of information required for a compliant transaction. For example, shipping the same product to different international destinations may require a different set of product data per different destination, such as multiple, but different, compliant bills of lading. The Predictor utilizes machine learning techniques to predict and estimate product information that is absent from the product input data.

In one embodiment, the Predictor may feed a product data record into a machine learning (ML) models to identify a predictive attribute(s) that corresponds with identifying accurate product information. The Predictor may feed the product data record and the predictive attribute into a ML model(s) to estimate additional data for the product data record. The Predictor may update the product data record with the estimated additional data. The Predictor may predict product code data by feeding the updated product data record into an ensemble of ML models, the product code data based on one or more commerce classification code taxonomies.

In one embodiment, initial input product data may be received by the Predictor that may be incomplete with respect to information that may be required to ship the product to various destination. For example, shipment of a product to multiple cross-border destinations may require a different set of product information per destination while the initial input product data may be minimal. The Predictor performs various operations to retrieve, estimate and predict additional information for a product data record that corresponds with the initial input product data. Various data sources may be accessed by the Predictor to search for and identify product attributes. Various machine learning models may be implemented by the Predictor to identify, estimate and predict additional product data. The identified product attributes and the estimated and predicted additional product data may be incorporated by the Predictor into the product data record.

Figure 10A:
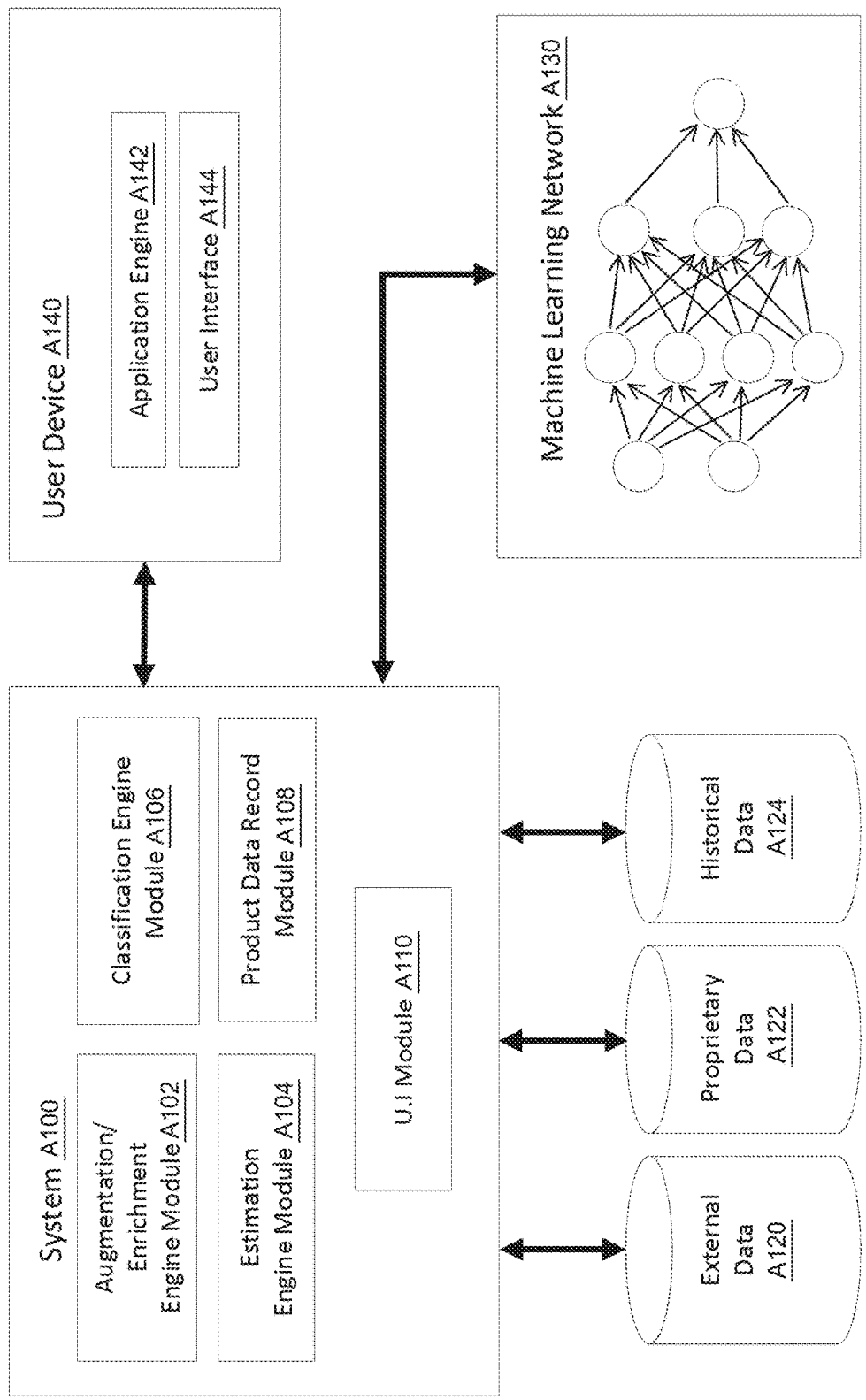
FIG. 10A illustrates an example environment in which embodiments of the invention may operate.

As shown in FIG. 10A, an example system A100 of the Predictor may include an augmentation/enrichment engine module A102, and estimation engine module A104, a classification engine module A106, a product data record module A108 and a user interface (U.I.) module A110. The system A100 may communicate with a user device A140 to display output, via a user interface A144 generated by an application engine A142. A machine learning network A130 and one or more databases A120, A122, A124 may further be components of the system A100 as well.

Figure 10B:
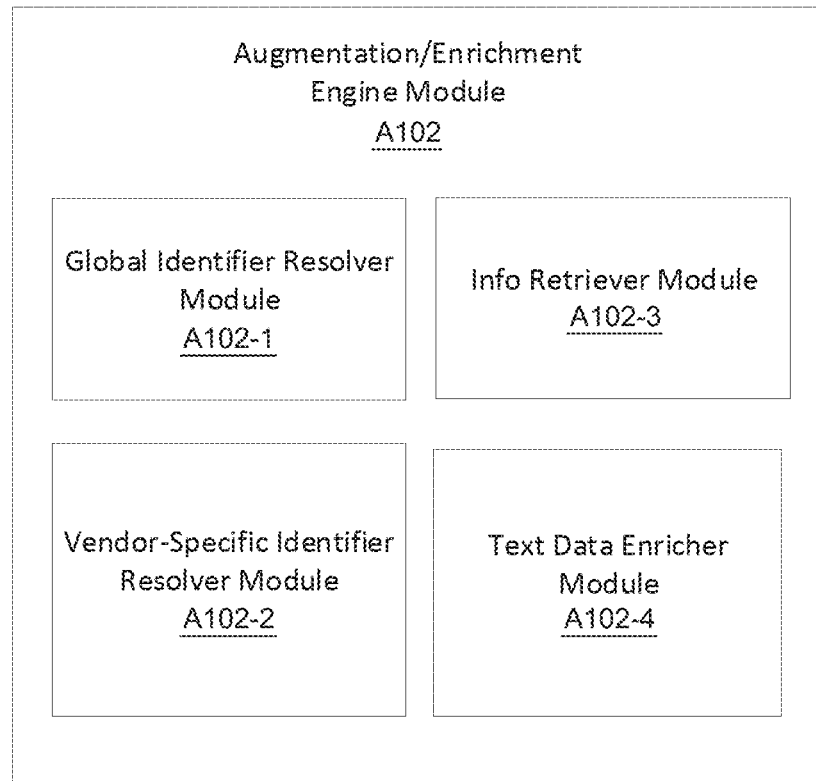
FIGS. 10B-10C illustrate diagrams of example components of one or embodiments.

The augmentation/enrichment engine module A102 of the system A100 may perform functionality as illustrated in FIG. S10D, FIGS. 11A-11C, FIG. 12, FIGS. 16A-16B and FIGS. 17-19. As shown in FIG. 10B, the augmentation/enrichment engine module A102 includes a global identifier resolver module A102-1, a vendor-specific identifier resolver module A102-2, and information retriever module A102-3 and a text data enricher module A102-4.

Figure 10C:
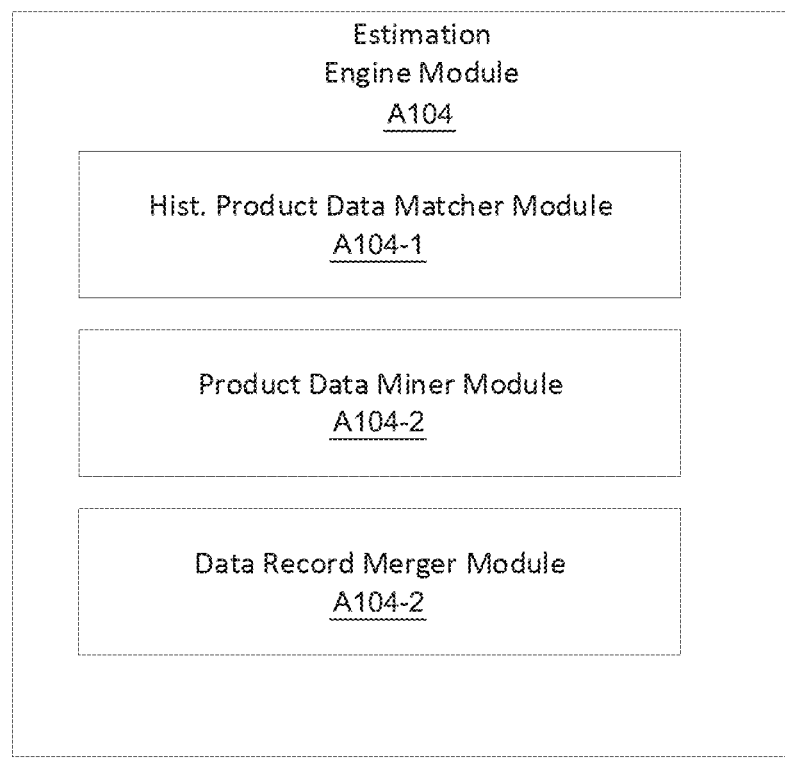

The estimation engine module A104 of the system A100 may perform functionality as illustrated in FIG. 10D, FIGS. 11A-11B, FIGS. 11D-11E, FIG. 13 and FIGS. 20-22. As shown in FIG. 10C, the estimate engine module A104 may include an historical product data matcher module A104-1, a product data miner module A104-2 and a data record merger module A104-3.

The classification module A106 of the system A100 may perform functionality as illustrated in FIG. 10D, FIGS. 11A-11B and FIG. 14.

The product data record module A108 of the system A100 may perform functionality as illustrated in FIG. 10D, FIGS. 11A-11B, FIG. 11D-2E and FIGS. 12-14.

The user interface (U.I.) module A110 of the system A100 may perform any functionality with respect to causing display of any output, data and information of the system A100 to the user interface A144.

While the databases A120, A122 and A124 are displayed separately, the databases and information maintained in a database may be combined together or further separated in a manner the promotes retrieval and storage efficiency and/or data security.

Figure 10D:
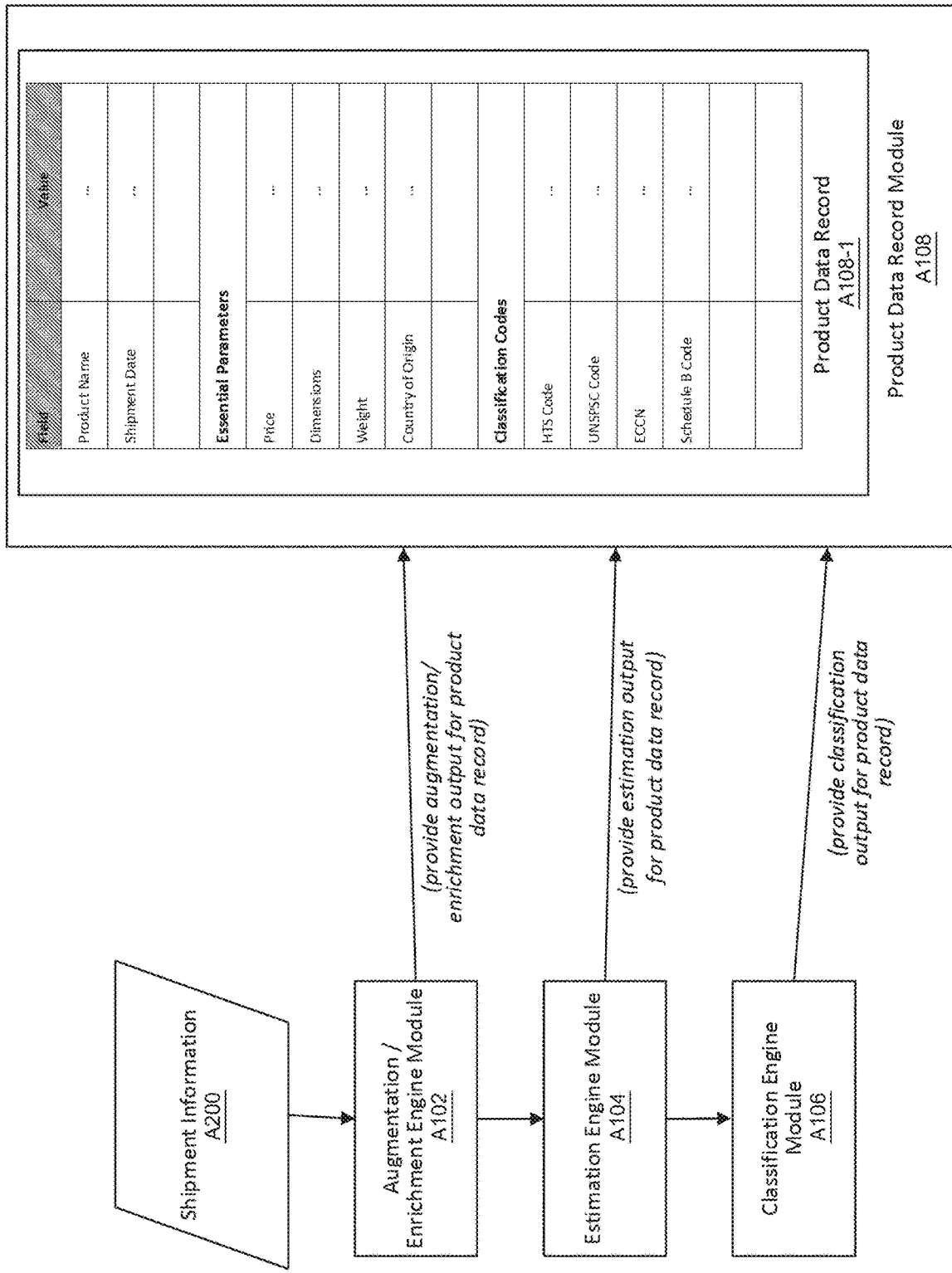
FIG. 10D illustrates an example dataflow for one or more embodiments.

As shown in FIG. 10D, input product data may be shipment information A200 that includes information for shipping a product to one or more destinations. The shipment information may be received by the augmentation/enrichment module A102 and output of the module A102 will be made available for a product data record A108-1 in the product data record module A108 as well as the estimation engine module A104 and the classification engine module A106. Output of the estimation engine module A104 will also be made available for the product data record A108-1 and the classification engine module A106. The product data record A108-1 may also be populated with output from the classification engine module A106. In one embodiment, the output of the modules A102, A104, A106 may be merged and resolved by the product data record module A108 in order to eliminate data redundancies by selecting output data for the product data record A108-1 with a highest confidence score.

Figure 11A:
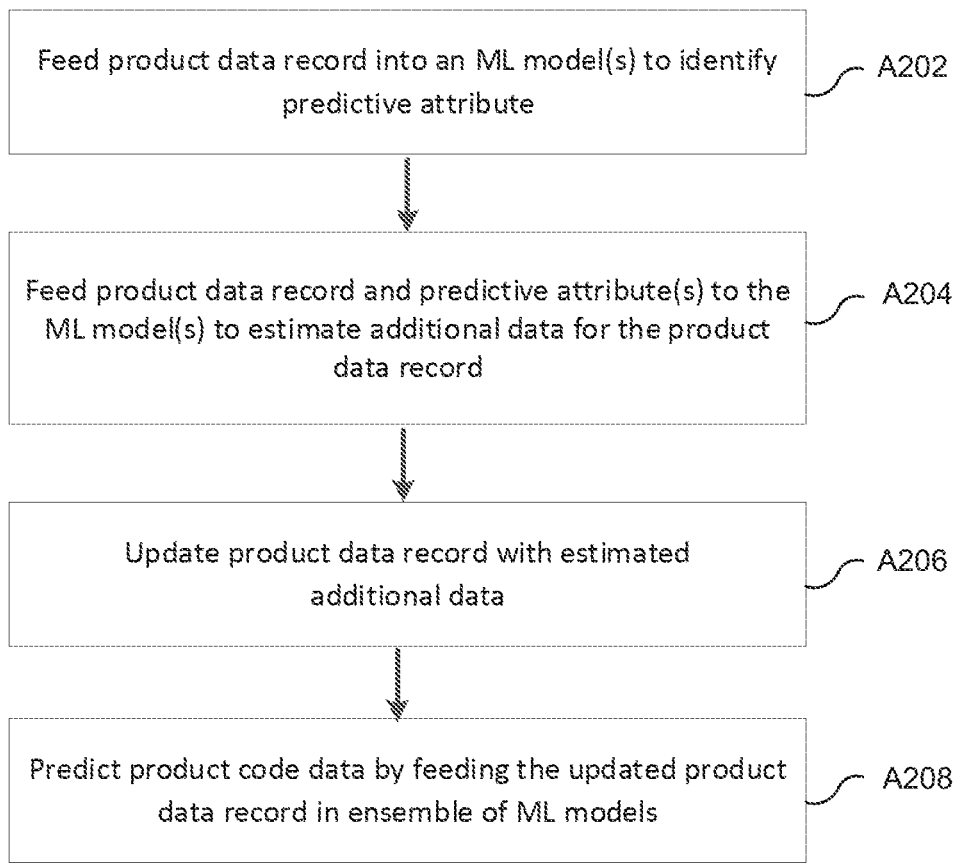
FIGS. 11A-11E illustrate example methods of one or embodiments.

As shown in the example method A200 of FIG. 11A, the Predictor feeds a product data record into one or more ML models to identify at least one predictive attribute that corresponds with identifying accurate product information (Act A202). For example, the augmentation/enrichment module A102 generates an augmented product data record that includes additional product data attributes collected by the module A102 based on input product data, such as incomplete product shipment information. For example, product data attributes may include price, dimensions, shipping weight, product code, product identifier, brand, country of origin, shipping destination, technical feature description, etc. The attributes may also be specific given a category of products, such as gender, material, composition, size, wash instructions, fit, style, or theme for the product category of jeans. The estimation engine module A104 identifies historical shipping information similar to the augmented product data record to sends both to one or more ML models that return the predictive attribute(s).

The Predictor feeds the product data record and the predictive attribute into the one or more ML models to estimate additional data for one or more null fields in the product data record (Act A204). The estimation engine module A104 combines historical shipping information, the augmented product data record the predictive attribute(s) into a merged record. The estimation engine module A104 feeds the merged record to the one or more ML models to identify ML parameters that represent data fields in the augmented product data record that must be filled in order to generate compliant shipping information. The one or more ML models further provide estimated data values for the output ML parameters. The Predictor updates the product data record with the estimated additional data (Act A206). For example, the estimation engine module A104 generates an enriched product data record by inserting the estimated data values for the ML parameter into the augmented product data record.

The Predictor predicts product code data by feeding the updated product data record into an ensemble of one or more ML models (Act A208). For example, the classification engine module A106 receives the enriched product data record as input and feeds the enriched product data record into an ensemble of ML models. The ensemble of ML model generates a predicted product code that is formatted according to an established classification code taxonomy.

Figure 11B:
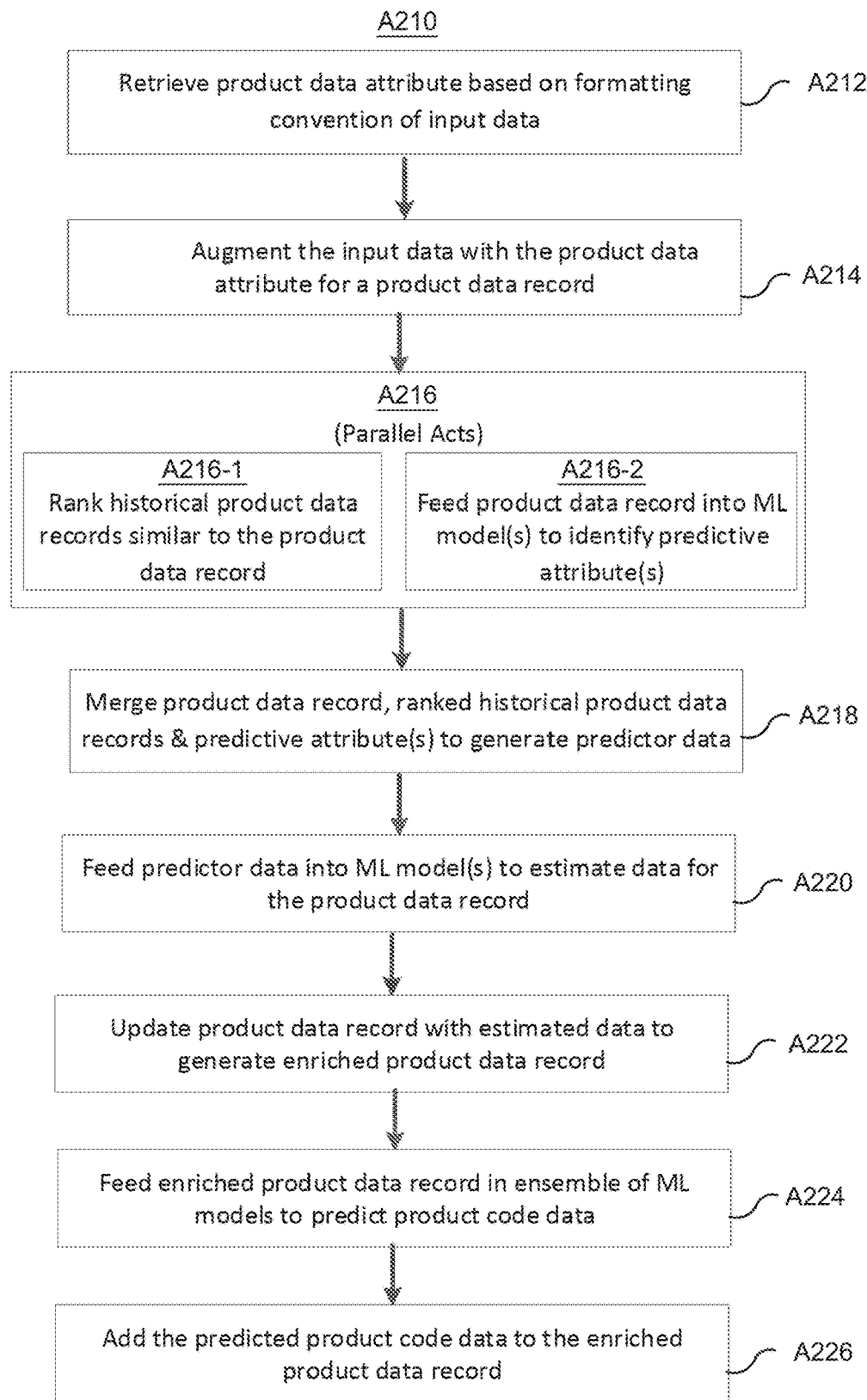

As shown in the example method A210 of FIG. 11B, the Predictor retrieves a product data attribute(s) based on a formatting convention of the input data (Act A212). For example, various formatting conventions for product identifications are pre-defined and well known, such as Universal Product Codes (UPC), European Article Numbers (EAN) and Amazon Standard Identification Number (ASIN). By identifying a portion of the input data that is structured according to a formatting convention, the Predictor may determine which data sources to search for more product data attributes or may perform a search based on the portion of the input data that is structured according to a formatting convention. The Predictor augments the input data with the retrieved product data attributes for a product data record that corresponds with a product described by the input data (Act A214).

Act A216 includes parallel acts A216-1 and A216-2. However, the acts A216-1, A216-2 may be performed sequentially. The Predictor ranks historical product data records in historical shipment information that satisfy a similarity threshold with the product data record (Act A216-1). For example, the historical product data records may have details about previously shipped products, such as price, dimensions, shipping weight, country of origin and destination, etc. The Predictor selects historical product data records that meet a threshold for an amount of product data that matches the augmented product data record, thereby increasing a likelihood that a historical product data record may include product information that was required for a compliant shipping of the same product. Similarity scores are calculated for the historical product data records that satisfy the threshold and the historical product data records are ranked accordingly. Similarity scores between two products can be calculated using a variety of techniques. One approach is to count the number of attributes identical between the two (or more) products. For each identical attribute, the total of number possible values is summed up to represent the similarity score for that attribute. For example, the attribute "material" can have A100 different possible values. Two products having an identical value of "material: Cotton", will contribute a value of A100 towards the similarity score, to indicate a strong signal of similarity. By this method, an attribute with lower number of possible values, will contribute lesser towards the similarity. The attribute-level similarity scores can be summed and normalized across products by weighting them against a curated importance list of each attribute to that product. Another approach to calculate the similarity score between two products is to use a machine learning model(s) to convert each product to a vectorized representation of weights. By representing each product as a vector, the dot product between the products can be used as a similarity score between them—also referred to as the cosine similarity score between two products. A number of vectorization techniques can be used for this approach, including popular deep learning vectorization methods such as Word2Vec, GloVe or fastText.

The Predictor feeds the product data record into one or more machine learning (ML) models to identify at least one predictive attribute that corresponds with identifying accurate product information (Act A216-2). For example, the Predictor may feed the augmented product data record into a machine learning model trained for named entity recognition ("NER") to isolate important attributes. That is, if the product data record has the name of the product, the NER model may isolate (or select) a machine learning variable that maps to product names as a variable that is highly likely to facilitate one or more ML models in predicting accurate product information. In contrast, if the product data record has no product name, but does have product weight, the NER model may not isolate a machine learning variable that maps to product weights as a variable, unless the product has an exceptionally unique weight and that weight value is present in multiple historical product data records.

The Predictor merges the product data record, the ranked historical product data records and the predictive attribute to generate predictor data (Act A218). The Predictor creates a merged record that is formatted such that the data in the merged record's field aligns with one or more ML parameters. During the merging process, the original product data record is designed as the primary value for each attribute of the product. The attributes from the ranked historical product data records are appended as a respective secondary value for each attribute. Each product ends up with multiple values against each of its attributes, as per the attribute availability in the historical product data records. Such formatting requires the Predictor add metadata in the merged record. For example, metadata may describe the origin (e.g., input data, augmented data, historical data) of a value in a data field. A confidence score(s) for data in the merged record may be included as well. One embodiment may assign confidence scores is to calculate a similarity score between the product data record and the historical product data record and use the calculated similarity score as the confidence score for each secondary attribute value. Another embodiment may use to the number of times a historical product data record has been seen as a measure of confidence.

The Predictor feeds the predictor data into the one or more ML models to estimate additional data for one or more null fields in the product data record (Act A220). For example, the Predictor feeds a merged record into one or more ML models to estimate data about the product that should be in the product data record given all the various types of data in the merged record. For example, if the merged record has formatted data based on the product's brand and weight, the one or more ML models may estimate additional product specifications (e.g., height, dimensions). A classification model may estimate categorial parameters of the product, such as country of origin, if the product data record lacks such information. A logistic regression model may also estimate continuous parameters, such as weight, if the product data record lacks such information. The Predictor updates the product data record with the predicted additional data to generate an enriched product data record (Act A222).

The Predictor feeds the enriched product data record into an ensemble of the one or more ML models to predict a product code data for the product (Act A224). A product code may be based on one or more commerce classification code taxonomies developed by governments and international agencies per regulatory requirements, such as Harmonized System (HS) code, Harmonized Tariff System (HTS) code, Export Control Classification Number (ECCN) code, Schedule B code, or United Nations Standard Products and Services Code (UNSPSC). The ensemble of ML models for predicting the product code may include multiple machine learning techniques, such as: logistic regression, random forests, gradient boosting, as well as modern deep learning techniques, such as convolutional neural networks (CNNs), bi-directional long-short term memory (LSTM) networks and transformer networks. The Predictor adds the predicted product code data to the enriched product data record (Act A226).

Figure 11C:
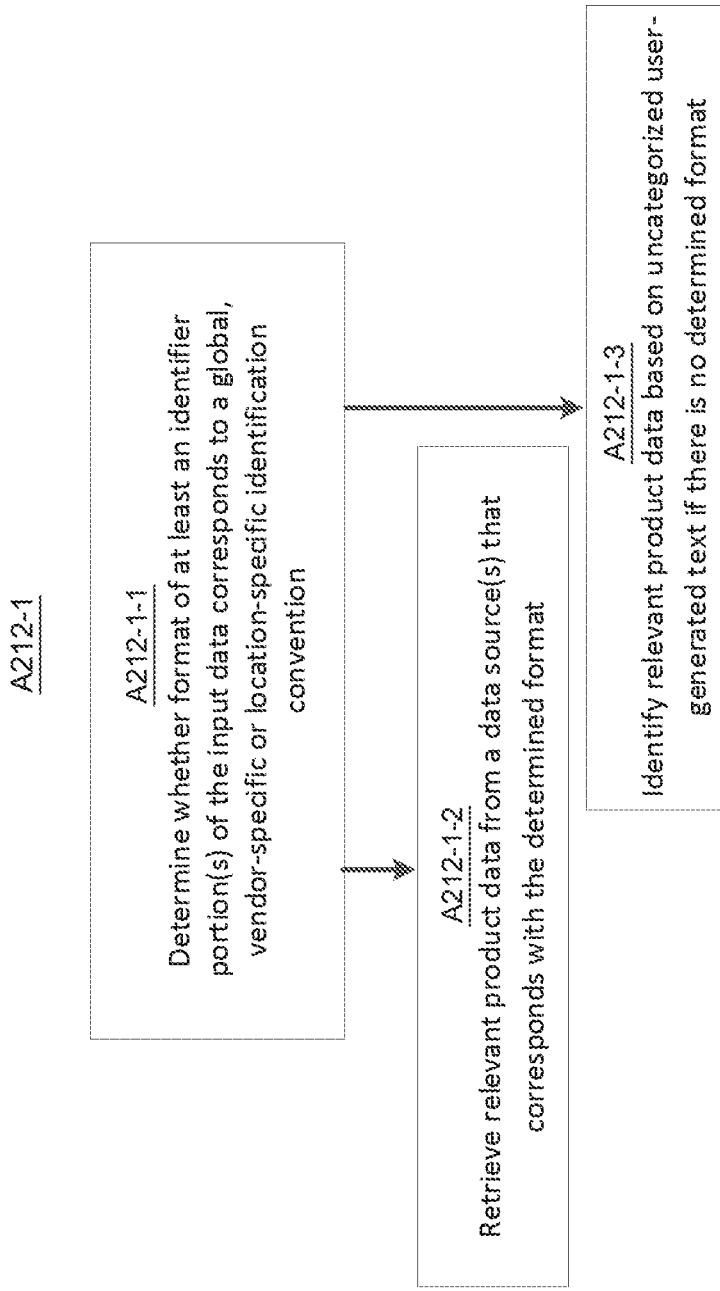

An example method A212-1 for retrieving product data attribute(s) based on a formatting convention of input data in shown in FIG. 11C. The Predictor determines whether the format of an identifier portion of the input data corresponds to a global, vendor-specific or location-specification identification convention (Act A212-1-1). For example, the Predictor determines whether the input data, or part of the input data, is formatted according to a known product identification system that is commonly known. A global convention may be Universal Product Codes (UPCs), European Article Numbers (EANs), International Standard Book Number or Global Trade Item Numbers (GTINs). A vendor-specific convention may be Manufacturer Part Numbers (MPN), Stock-Keeping Units (SKUs) or Amazon Standard Identification Number (ASIN). A location-specific convention may be a Uniform Resource Locator (URL).

The Predictor retrieves relevant product data from a data source(s) that corresponds with the determined format (Act A212-1-2). If a global convention has been detected in the input data, the Predictor accesses various types of databases to perform searches with the input data since search query that is a product's UPC, for example, is likely to return search results that provide relevant product data that can be added to the product data record. If a vendor-specific convention has been detected in the input data, the Predictor accesses various types of databases (external, local, proprietary) to perform searches with the input data since search query that is a product's SKU, for example, is likely to return search results that provide relevant product data that can be added to the product data record. If a location-specific convention has been detected in the input data, the Predictor accesses the URL to crawl, parse, identify, extract and format product information from a webpage(s).

The Predictor may determine that the input data does not conform to any type of formatting convention. In such a case, the Predictor identifies relevant product data based on uncategorized user-generated text if there is not determine format (Act A212-1-3). For example, when the input data is user-generated text input, it usually contains some information to directly describe the product being shipped. Depending on the availability and specificity of the text input provided, the user-generated text input may be sufficient to completely describe the product and thereby can be used to populate the product data record. In another example, if the user-generated text input may include the words " . . . mobile phone . . . " and part of a product barcode. The Predictor can use "mobile phone" and the incomplete barcode to find information online or data values from historical shipment records of mobile phones.

Figure 11D:
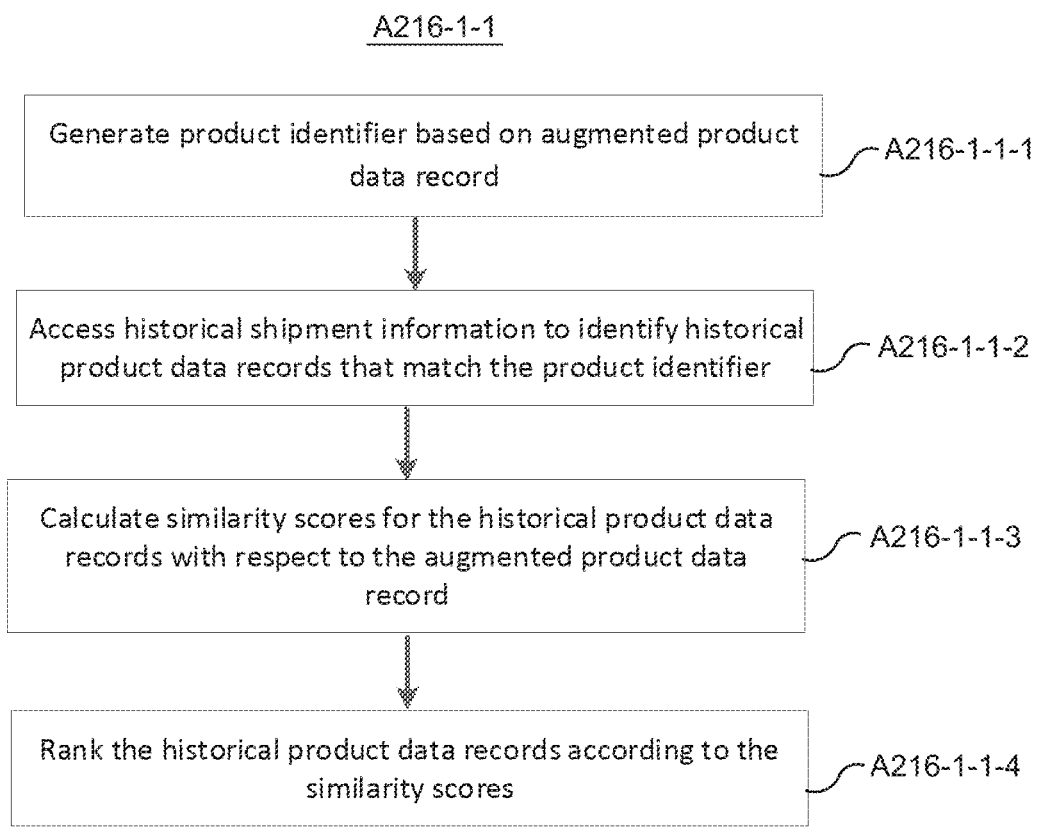

An example method A216-1-1 for ranking historical product data records is shown in FIG. 11D, generating at least one product identifier based on the augmented product data record (Act A216-1-1-1). A variety of techniques may be employed by one or more embodiments to isolate product identifiers from the augment product record. An embodiment may store a table of common identifier paradigms and their associated patterns and then compare pieces of text from the augmented product data record against each pattern. For example, one or more A13-digit numeric strings in the product record are possible EANs (international article number), which can be confirmed by verifying the checksum digit coded in the EAN standard. Similarly, UPCs, GTINs (global trade identification number) and ASINs (amazon standard identification number) may also be formulated as specific regular expressions (regexes) which can be pattern matched against strings from the augmented product data record. To begin estimation of additional product data for shipment of the product, the Predictor accesses historical shipment information to identify historical product data records that include one or more fields that match the product identifier (Act A216-1-1-2). For example, the Predictor compares data fields in historical product data records ("historical records") in historical shipment information to identify historical records with data that is similar to the augmented product data record. The Predictor calculates a respective similarity score for each identify historical product data record with respect to the augmented product data record (Act A216-1-1-3). The Predictor ranked the identified historical product data records according to the respective similarity scores. (Act A216-1-1-4). The Predictor may also feed the augmented product data record into an ML model trained for named entity recognition (NER) to identify a predictive attribute(s) that corresponds with identifying accurate product information.

Figure 11E:
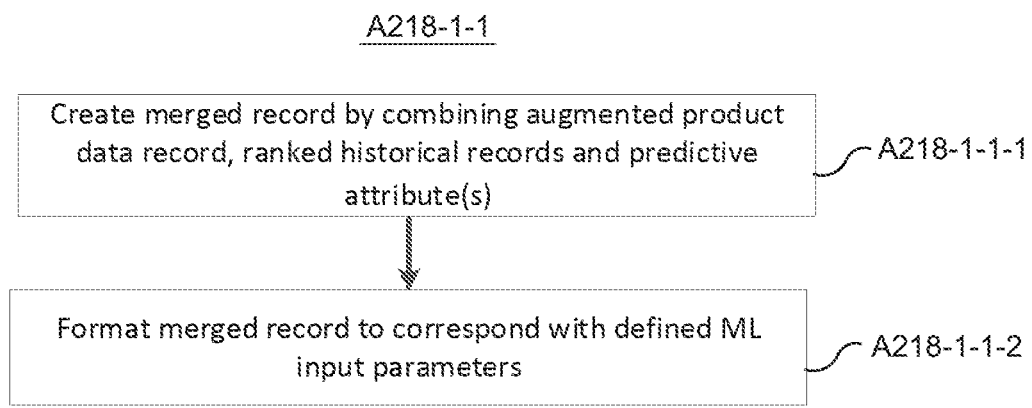

An example method A218-1 for merging a product data record, ranked historical product data records and a predictive attribute(s) is shown in FIG. 11E. The Predictor generates a merged record according to a meaningful and usable format for various ML models to estimate additional product data. The Predictor creates the merged record by combining the augmented product data record, the ranked historical product data records and the predictive attribute (Act A218-1-1). The Predictor formats the merged record to correspond with one or more defined ML input parameters (Act A218-1-2). An example of an ML input parameter may be a respective source metadata for the data in one or more fields (field data) of the merged record. The source metadata indicates the source of a corresponding data value (e.g., input data, historical data, online data, database data, etc.). An example of an ML input parameter may be a respective confidence score corresponding to an accuracy of a data value in the merged record. Another ML input parameter may be a record similarity score based on a comparison of the merged record and the input data. The Predictor feeds the formatted merged record into various ML models, which may return output that includes one or more ML parameters identified as being required for compliance as well as estimated product data for those ML parameters. In one embodiment, the ML parameters and estimated product data may replace null data fields in the product data record.

Figure 12:
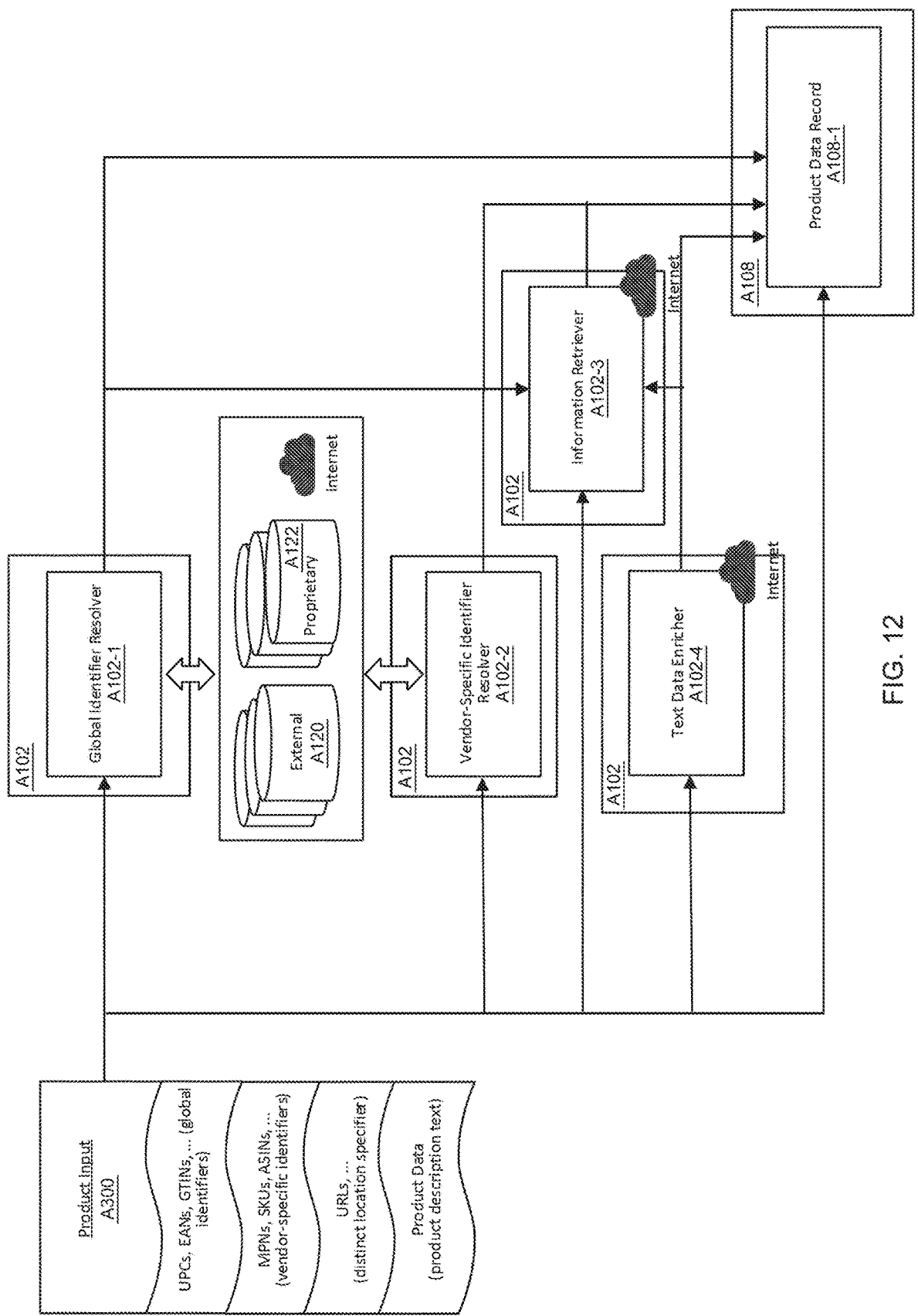
FIG. 12 is an example diagram of one or more embodiments.

As shown in FIG. 12, the global identifier resolver module A102-1 identifies and disambiguates a list of global identifiers in the product input data A300 and associates the identifiers with a corresponding formatting convention. If a formatting convention is not identified for an identifier, the global identifier resolver module A102-1 may indicate that identifier to be invalid (e.g., spam) or the product input data A300 may be handled by the vendor-specific identifier resolver module ("vendor module") A102-2, the information retriever module ("retriever module") A102-3, and/or the text data enricher module ("enricher module") A102-4.

The global identifier resolver module ("global module") A102-1 uses the detected formatting convention and the identifier to access locally maintained proprietary databases. If matching information is found in the databases, the global module A102-1 determines whether the matching information is itself available product data. If so, the global module A102-1 augments the product data record A108-1 with the available product data. If the matching information is, instead, an indication of a data source (such as a URL), the global identifier resolver module A102 may then send the matching information to the information retriever module A102-3.

If no matching information is found by the global module A102-1 in the locally maintained proprietary databases, the global module A102-1 may trigger a failover lookup by accessing one or more third party databases that store information in relation to data similar to the identifier. If matching information is found, it will be sent to the product data record A108-1 (along with the product input data A300) if it is directly available product data, it will be sent to the information retriever module A102-3 if it also is an indication of a data source. If no matching information is found by the failover lookup of the third-party databases, the global module A102-1 may send the product input data A300, the identifier and the determined formatting convention to the enricher module A102-4.

The vendor module A102-2 identifies and disambiguates a list of vendor specific identifiers in the product input data A300 and associates the identifiers with one or more corresponding sources, such as a manufacturer, online marketplace or a seller website. If a source is not identified for an identifier, the vendor module A102-2 may discard that identifier. If a source is identified, the vendor module A102-2 accesses the online location described by the identified source. If the online location is accessible, the vendor module A102-2 mines and queries the online location based on the identifier. If product data is directly available as a result of the mining and querying, the vendor module A102-2 sends the product data and the product input data A300 to the product data record A108-1.

If the source is not accessible, the vendor module A102-2 may query one or more web search engines based on the source and the identifier. If matching information is returned in search result and is directly available product data, then the vendor module A102-2 sends the product data to the product data record A108-1. If no product data is available by way of the search results, the vendor module A102-2 sends the source and the identifier to the retriever module A102-3. If no matching information is returned by the search, the vendor module A102-2 may discard the identifier and the identified source.

The retriever module A102-3 may receive information, either from the product input data A300 or other modules A102-1, A102-2, that indicates a data source of information where additional product information may be available. The retriever module A102-3 accesses the data source and performs context extraction as described by U.S. patent application Ser. No. 16/288,059. For example, the retriever module A102-3 may crawl a website to identify product pages. The product pages may be scraped by the retriever module A102-3 to obtain product data. Moreover, one or more interactive elements on the product pages may be automatically activated to be able to identify the various attribute variations available for the product, such as size and color. The products, attributes, and attribute values may be extracted and normalized and stored. Such extraction by the retriever module A102-3 may be based, for example, on meta-tags, DOM structure, computer vision. If the extraction returns product data, the retriever module A102-3 sends the extracted product data to the product data record A108-1 along with the product input data A300.

The enricher module A102-4 may determine that the product input data A300 is uncategorized, user-generate text, and thereby was not handled by the other modules A102-1, A102-2, A102-3. For example, the product input data A300 may be partial, unstructured or an incomplete text description of the product. The enricher module A102-4 may send the product input data's A300 text as-is to the machine learning network A130 to train one or more machine learning models or to receive machine learning output that estimates and predicts product information. In addition, the enricher module A102-4 may parse the product input data A300 and identify tags (i.e. text portions that represent product information). If the tags describe a data source, the enricher module A102-4 sends the tags to the retriever module A102-3. If the tags describe product identifiers, the enricher module A102-4 sends the tags to the global module A102-1 and the vendor module A102-2.

Figure 13:
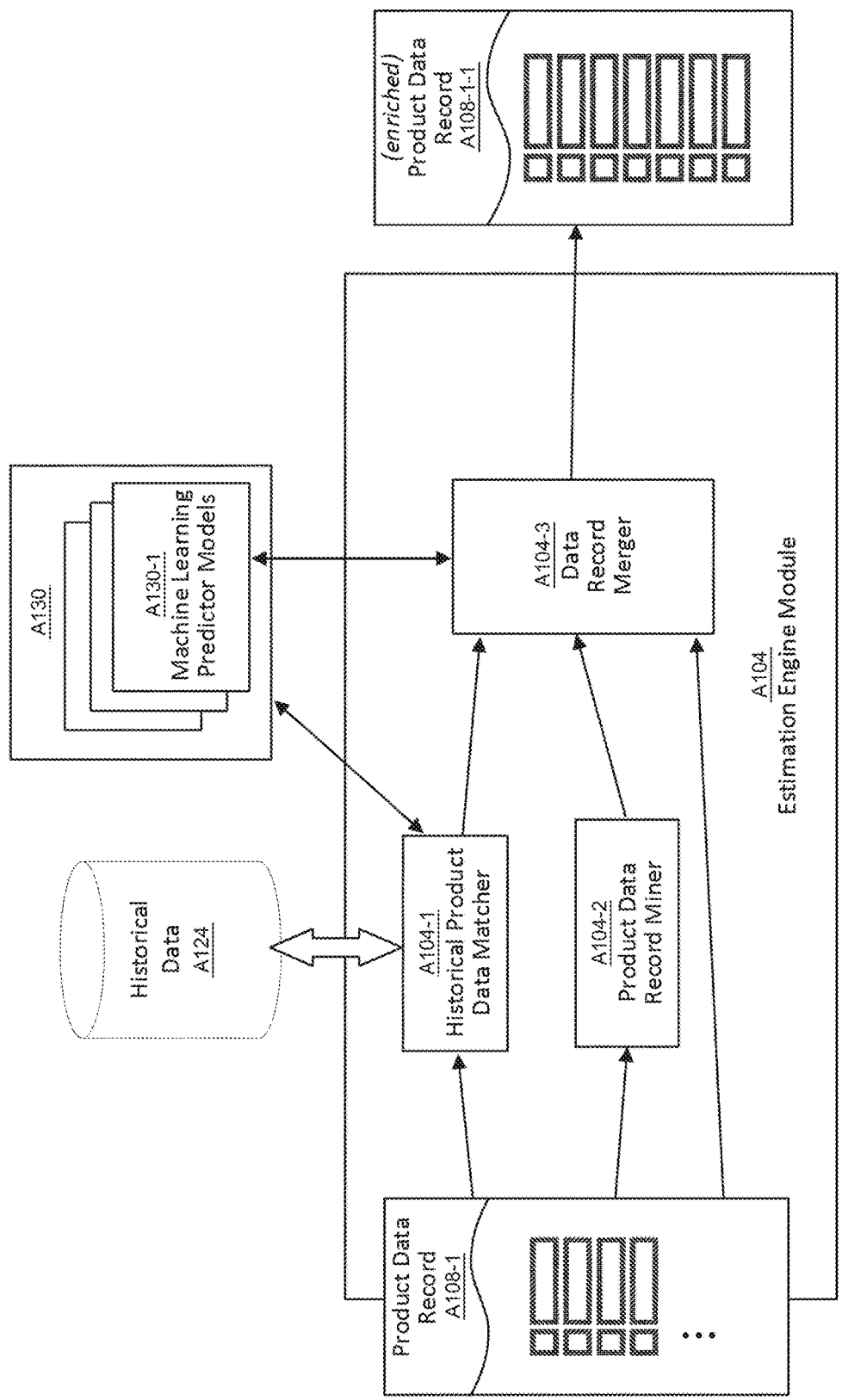
FIG. 13 is an example diagram of one or more embodiments.

As shown in FIG. 13, the estimation engine module A104 receives the product data record A108-1, which may be an augmented product data record based on the input product data A300 and output of the augmentation/enrichment module A102. The output of the augmentation/enrichment module A102 that populates the augmented product data record may be one or more product attributes based on product data returned from the global module A102-1, the vendor module A102-2, the retriever module A102-3 and the enricher module A102-4.

The historical product data matcher module ("historical module") A104-1 isolates product identifiers present in the product data record A108-1. The historical module A104-1 then accesses a database A124 of historical product data to identify previous shipment records. The historical module A104-1 searches through the identified shipment records to extract one or more historical product data records that include a threshold amount of product information that matches the product data record A108-1. The historical module A104-1 calculates a similarity score for each extracted historical product data records and generates a list of the historical product data records ranked according to the respective similarity scores. The historical module A104-1 sends the ranked historical product data records to the data record merger module ("merger module") A104-3.

The product data miner module ("miner module") A104-2 may execute in parallel with the historical module A104-1. The miner module A104-2 mines the product data record A108-1 for one or more predictive attributes that correspond with identifying accurate product information. To do so, the miner module A104-2 sends at least a portion of the product data record A108-1 to one or more machine learning models in the machine learning network A130. The machine learning models return a predictive attribute(s) and the miner module A104-2 sends the predictive attribute(s) to the merger module A104-3.

The merger module A104-3 receives the product data record A108-1, the ranked historical product data records and the predictive attribute(s). A comparison of data fields across the ranked historical product data records and the product data record A108-1 is performed to based on a merger of the historical product records with the actual input product data record. For data fields common between the product data record A108-1 and each respective historical product data records, the merger module A104-3 prioritizes use of the data fields from the input product data record. For data fields present only in the historical product data records, the merger module A104-3 compares the values available across the various historical product data records and picks a value available from the highest ranked historical product data record. Picking the available value from the highest ranked historical product data record ensures that one value is prioritized when conflicting data field values might be amongst different historical product data records. The merger module A104-3 generates a merged record based on the product data record A108-1, the ranked historical product data records and the predictive attribute(s), such that the merged record is formatted according to machine learning parameters so that the merged record can be used as input to one or more ML models. Such formatting may include adding metadata about each field in the product data record A108-1, such as data indicating the data source of the value in the corresponding field. The formatting may include a confidence score for data in one or more fields.

The merger module A104-3 feeds the formatted merged record into one or more ML predictor models A130-1 in the machine learning network A130. Output from the ML predictor models A130-1 may include one or more required ML parameters and estimated data values for the output ML parameters. The ML parameters may map to null data fields in the data product record A108-1 which must be populated in order to form compliant shipping information for the product. The merger module A104-3 adds the one or more required ML parameters and estimated data values to the product data record A108-1 to create an enriched product data record A108-1-1.

Figure 14:
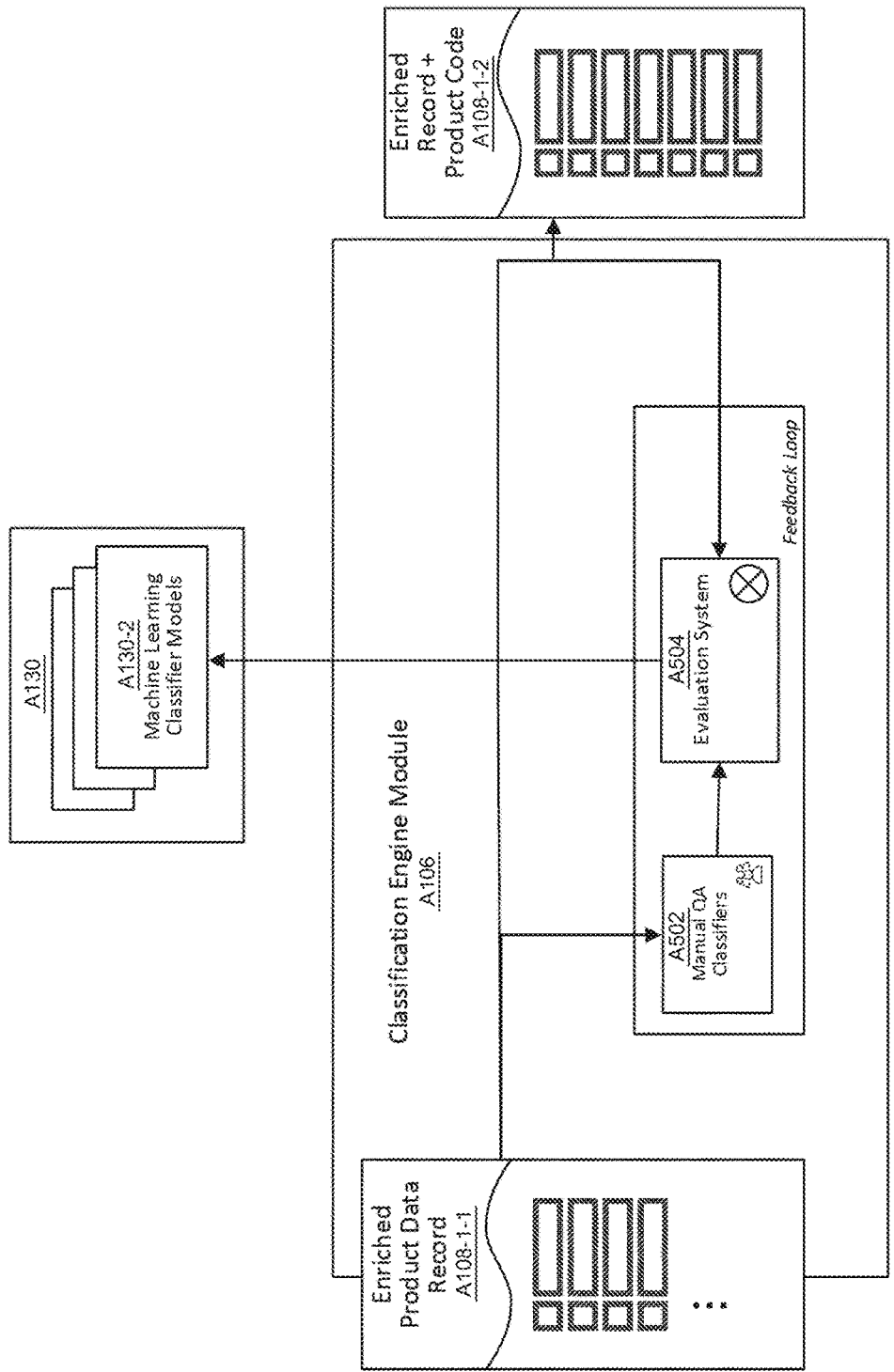
FIG. 14 is an example diagram of one or more embodiments.

As shown in FIG. 14, the classification engine module A106 takes the enriched product data record A108-1-1 as input. The role of the classification engine module A106 is to augment the enriched product data record A108-1-1 with specific classification information that may be required for a compliant transaction. The classification information may be a product code that is on a classification taxonomy, including those such as the Harmonized System (HS) code, Harmonized Tariff System (HTS) code, Export Control Classification Number (ECCN) code, Schedule B code, or United Nations Standard Products and Services Code (UNSPSC). Each of these classification taxonomies are developed and maintained by various governments and international agencies as per their regulatory requirements.

Each of these classification taxonomies are dependent on various pieces of product information, such as material, composition, form, utility, function, as well as a number of other parameters. These parameters may be in the enriched product data record A108-1-1, which is sent to an ensemble A130-2 of ML classifier models which deploy a number of artificial intelligence techniques and algorithms. These include traditional machine learning techniques such as logistic regression, random forests, gradient boosting, as well as modern deep learning techniques, such as convolutional neural networks (CNNs), bi-directional long-short term memory (LSTM) networks and transformer networks. An ensemble model consisting of various individual techniques can also be used to achieve better performance and trade-offs against precision and recall of assigned codes. The ensemble returns a predicted product code and the Predictor updates the enriched product data record A108-1-2.

An addition, the classification engine module A106 may include feedback loop. Selectively sampled input product data records, received by the classification engine module A106, are forwarded for human manual QA classification while also being sent to the ML ensemble A130-2. A human QA classifier thereby provides an independent result by attempting to predict the product code based on a given sampled product data records. This allows for a fair evaluation system to be put in place. By comparing the results of the human classifier and the ML ensemble A130-2, any detected errors by the ML ensemble A130-2 can be quantified and used to iteratively improve ML ensemble A130-2 performance through methods such as reinforcement learning. The whole feedback loop ensures that the ML ensemble A130-2 can be kept relevant over time and responsive to variations in classification performance.

Embodiments may be used on a wide variety of computing devices in accordance with the definition of computer and computer system earlier in this patent. Mobile devices such as cellular phones, smart phones, PDAs, and tablets may implement the functionality described in this patent.

Figure 15:
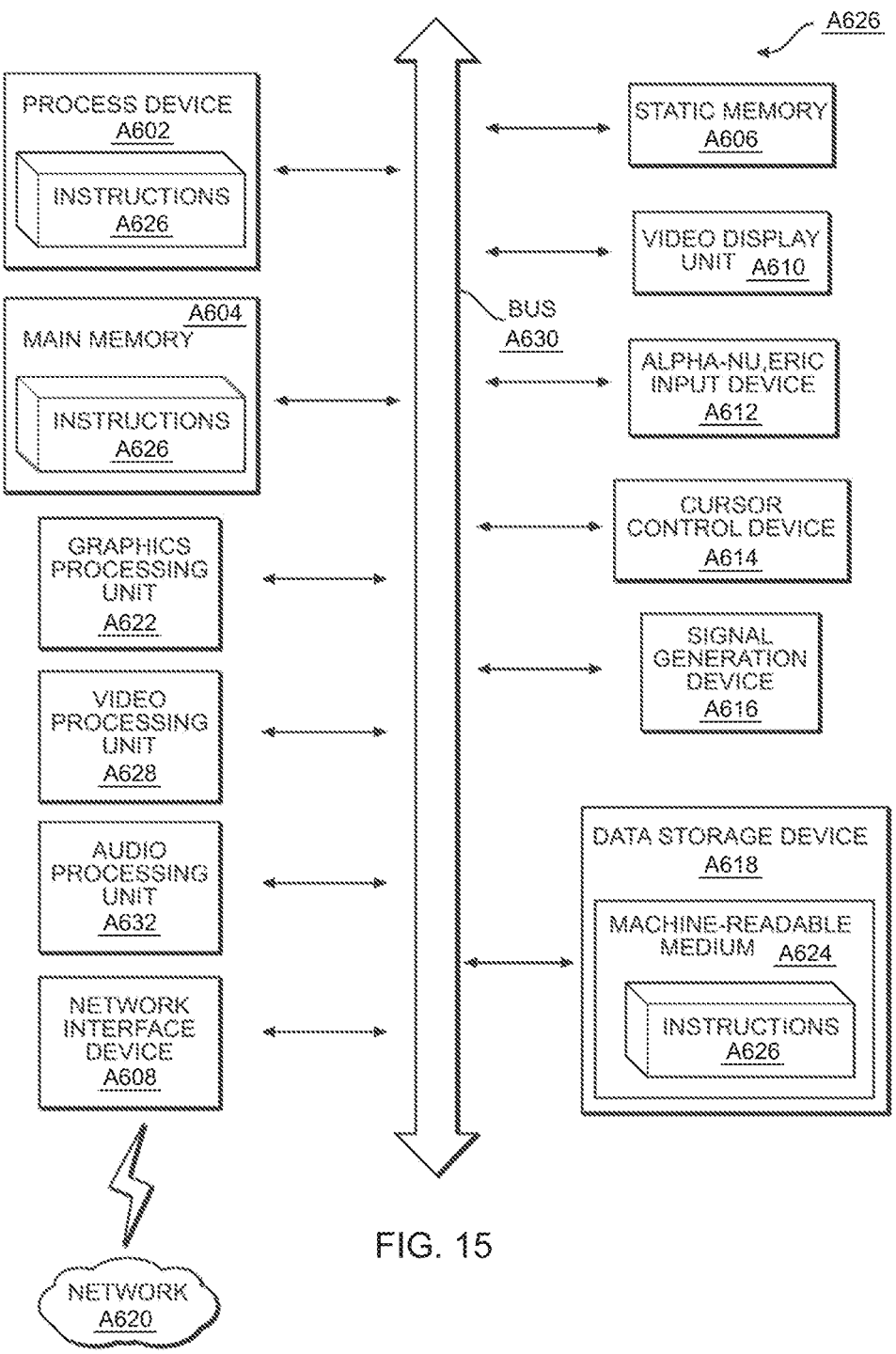
FIG. 15 is an example diagram of one environment in which some embodiments may operate.

FIG. 15 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) or an input touch device, a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 16A:
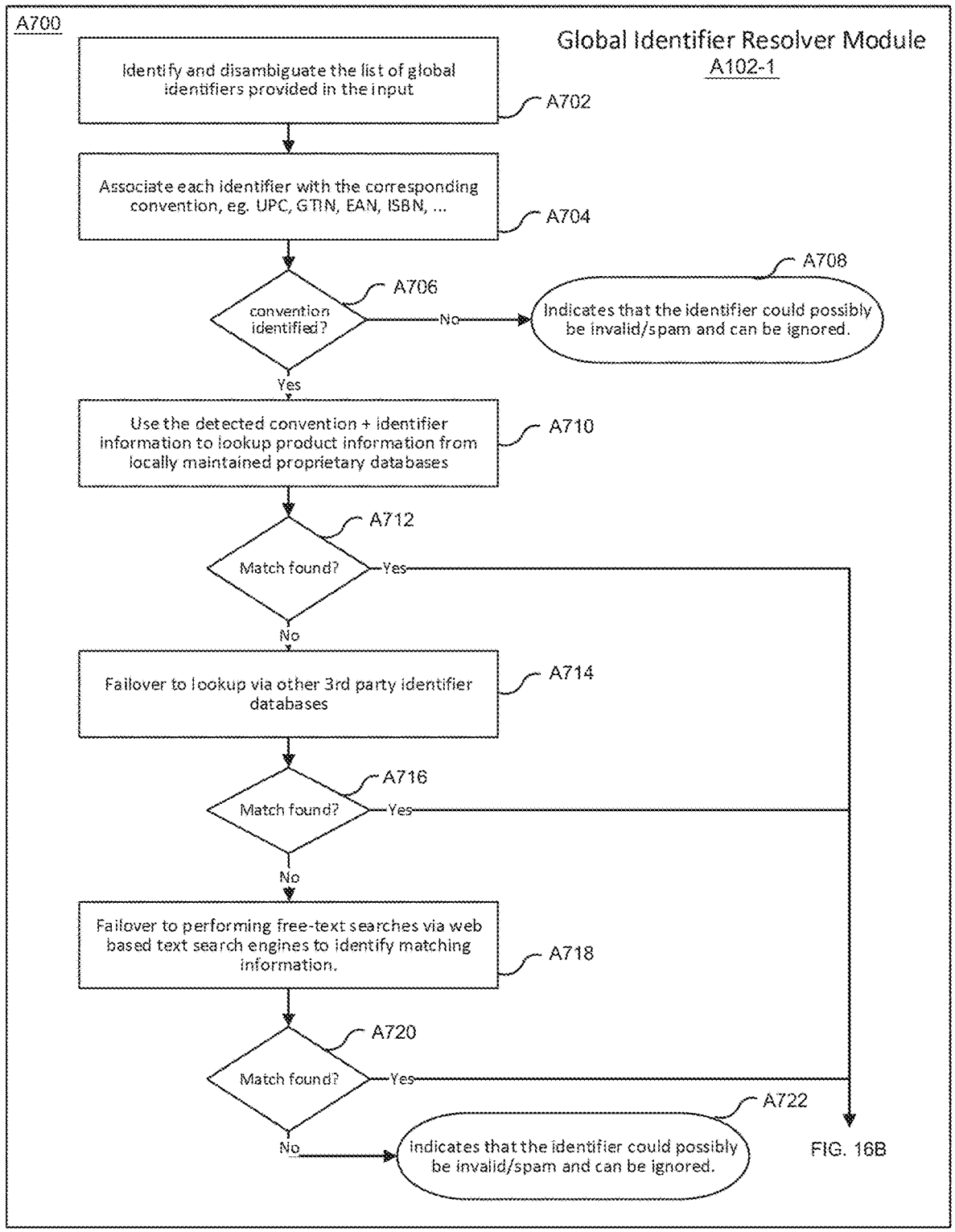
FIGS. 16A and 16B illustrate example methods of one or more embodiments.
Figure 16B:
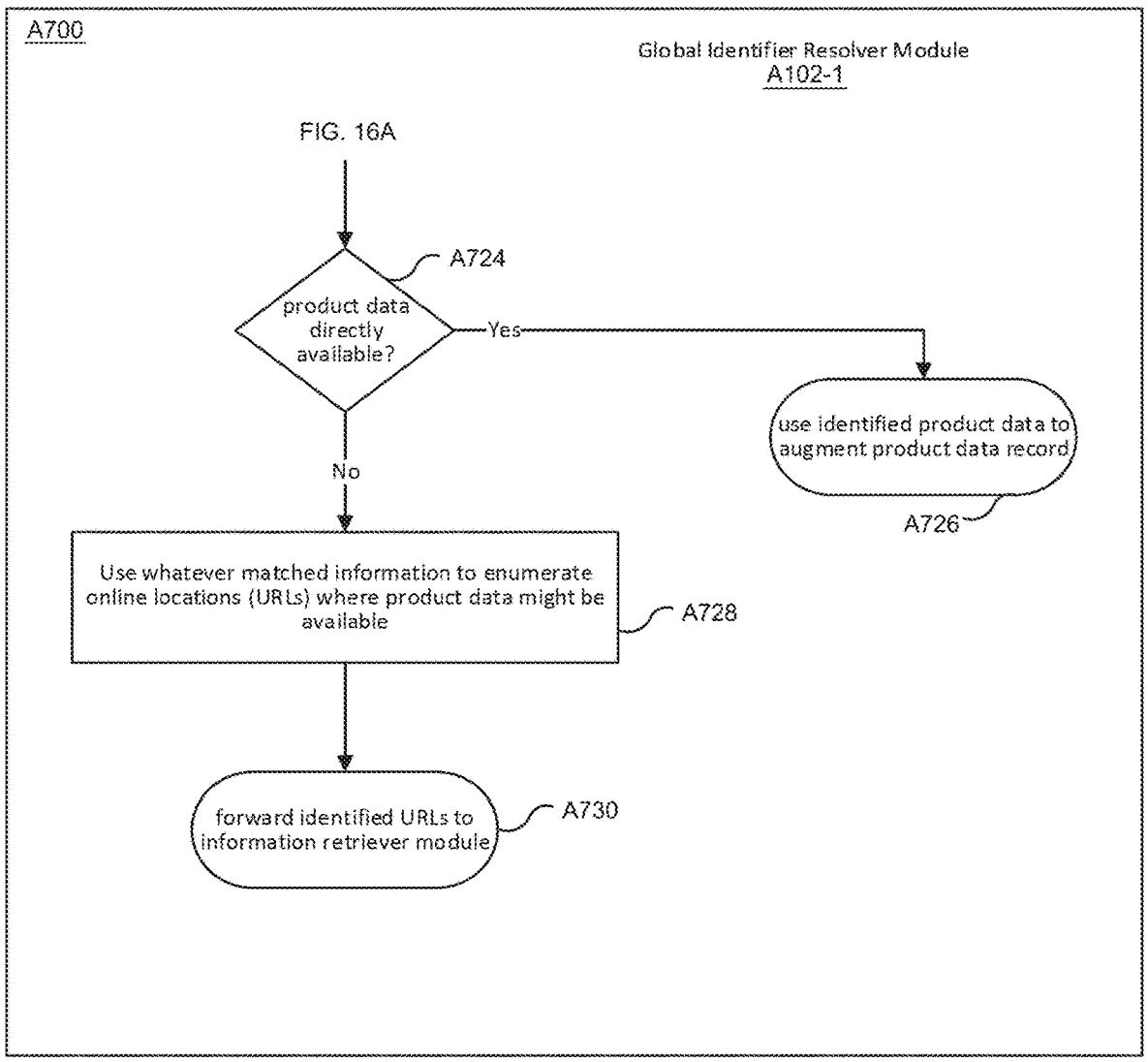

An example method 700, as shown in FIG. 16A, the global identifier resolver module A102-1 identifies and disambiguates a list of global identifiers in the product input data A300 (Act 702). The global identifier resolver module A102-1 associates each respective identifier with a corresponding formatting convention (Act 704). The global identifier resolver module A102-1 determines whether a convention(s) has been identified (Act 706). If a convention(s) has not been identified, the global identifier resolver module A102-1 indicates that the respective identifier is spam and, for example, can be discarded or ignored (Act 708). If a convention(s) has been identified, the global identifier resolver module A102-1 uses the detected formatting convention and the respective identifier to lookup product information in one or more locally maintained proprietary databases (Act 710). The global identifier resolver module A102-1 determines whether there is product information that matches with the detected formatting convention and the respective identifier (Act 712). If a match has been found, the global identifier resolver module A102-1 performs additional steps as shown in FIG. 16B. However, if a match has not been found, the global identifier resolver module A102-1 performs one or more free-text online searches in order to obtain one or more search results with returned product information that matches with the detected convention and the respective identifier (Act 714). The global identifier resolver module A102-1 determines whether there is product information returned in the search results that matches with the detected formatting convention and the respective identifier (Act 716). If no match is found in the search results, then the global identifier resolver module A102-1 indicates that the respective identifier is spam and, for example, can be discarded or ignored (Act 722). However, if a match has been found in the search results, the global identifier resolver module A102-1 performs additional steps as shown in FIG. 16B.

Continuing from FIG. 16A, as shown in FIG. 16B, the global identifier resolver module A102-1 determines whether product data is directly available in the matching product information in proprietary databases or in the received search results (Act 724). If product data is available, the global identifier resolver module A102-1 augments the product data record A108-1 with the product data (Act 726). However, if product data is not available in the matching product information, the global identifier resolver module A102-1 identifies one or more online locations (URLs) based on the matching product information and forwards the identified online location(s) to the information retriever module A102-3.

Figure 17:
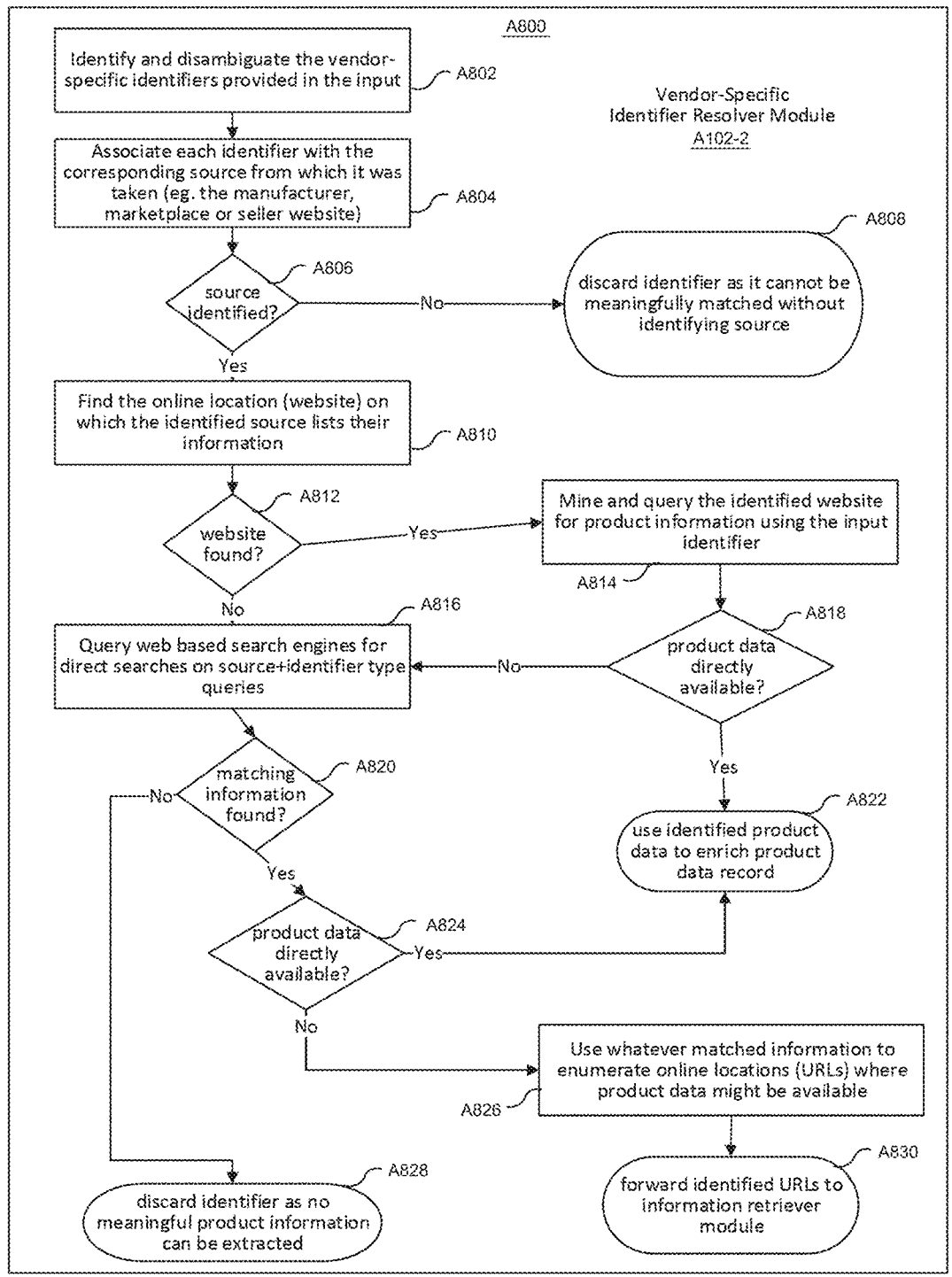
FIG. 17 illustrate an example method of one or more embodiments.

An example method 800, as shown in FIG. 17, the vendor-specific identifier resolver module A102-2 identifies and disambiguates vendor-specific identifiers provided in the product input data A300 (Act 802). The vendor-specific identifier resolver module A102-2 associates each vendor-specific identifier with a corresponding source, such as, for example, a manufacture, marketplace or seller website (Act 804). If a source cannot be identified for a respective vendor-specific identifier (Act 806), the vendor-specific identifier resolver module A102-2 discards the respective vendor-specific identifier. (Act 808). However, if a source can be identified for a respective vendor-specific identifier (Act 806), the vendor-specific identifier resolver module A102-2 finds an online location(s) (such as a website) to obtain additional information from the identified source (Act 810). If a website is found (Act 812), the vendor-specific identifier resolver module A102-2 accesses, mines and queries the website for additional product information using the respective vendor-specific identifier (Act 814). If product data is available from the website (Act 818), the vendor-specific identifier resolver module A102-2 augments the product data record A108-1 with the available product data (Act 822).

If a website is not found (Act 812) or if product data is not available from an identified website (Act 818), the vendor-specific identifier resolver module A102-2 submits queries based on the identified source and the respective vendor-specific identifier to one or more online search engines (Act 816). The vendor-specific identifier resolver module A102-2 determines whether there is product information returned in the search results that matches the identified source and the respective vendor-specific identifier (Act 820). If there is no match, the vendor-specific identifier resolver module A102-2 discards the respective vendor-specific identifier (Act 828). However, if product data is available in a matching search result(s) (Act 824), the vendor-specific identifier resolver module A102-2 enriches (or augments) the product data record A108-1 with the available product data (Act 822). However, if product data is not available in the matching search results (Act 824), the vendor-specific identifier resolver module A102-2 identifies one or more online locations (URLs) based on the matching search results (Act 826) and forwards the identified online location(s) to the information retriever module A102-3 (Act 830).

Figure 18:
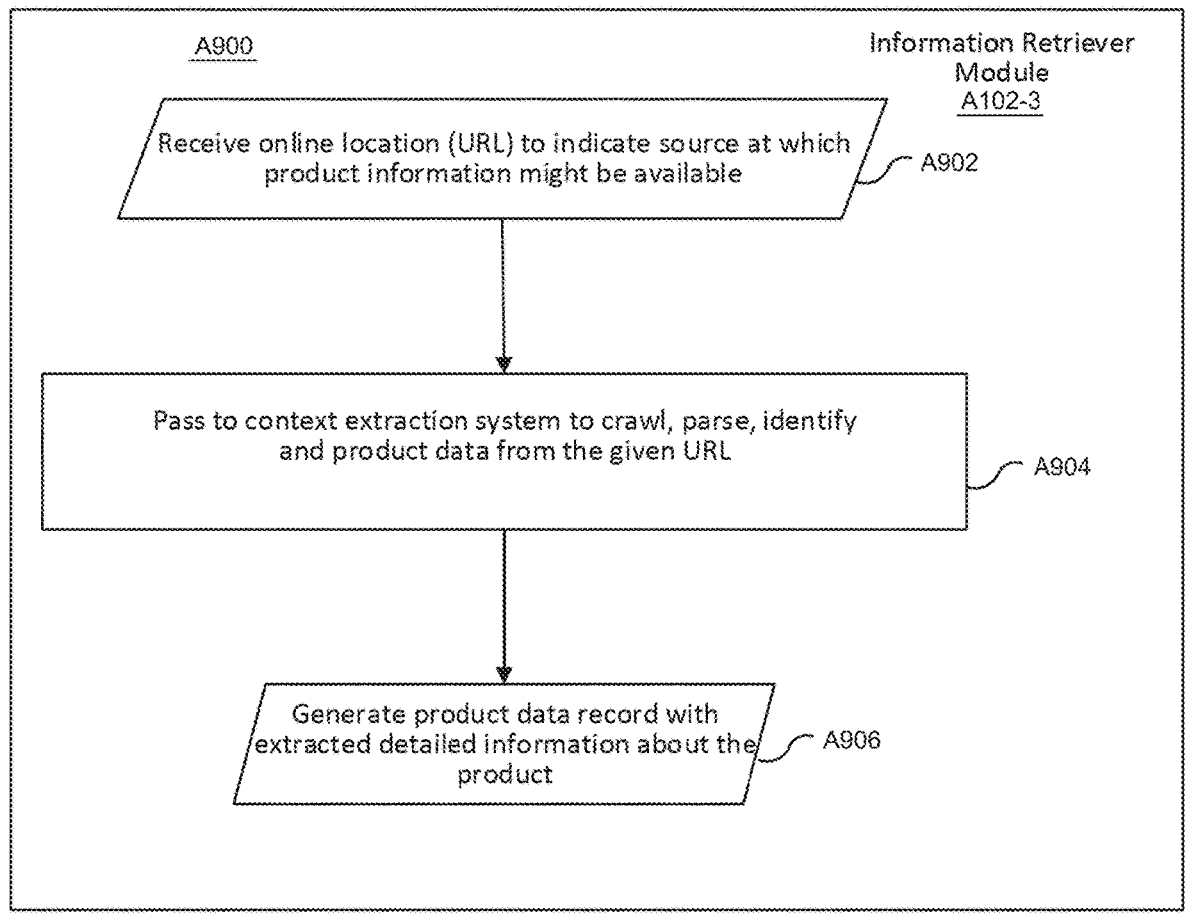
FIG. 18 illustrate an example method of one or more embodiments.

An example method 900, as shown in FIG. 18, the information retriever module A102-3 receives one or more identified online locations (Act 902) which are passed to a content extraction system as described by U.S. patent application Ser. No. A16/288,059 (Act 904). The information retriever module A102-3 receives formatted, extracted product data from the content extraction system and generates a product data record A108-1 with the received formatted, extracted product data (Act 906).

Figure 19:
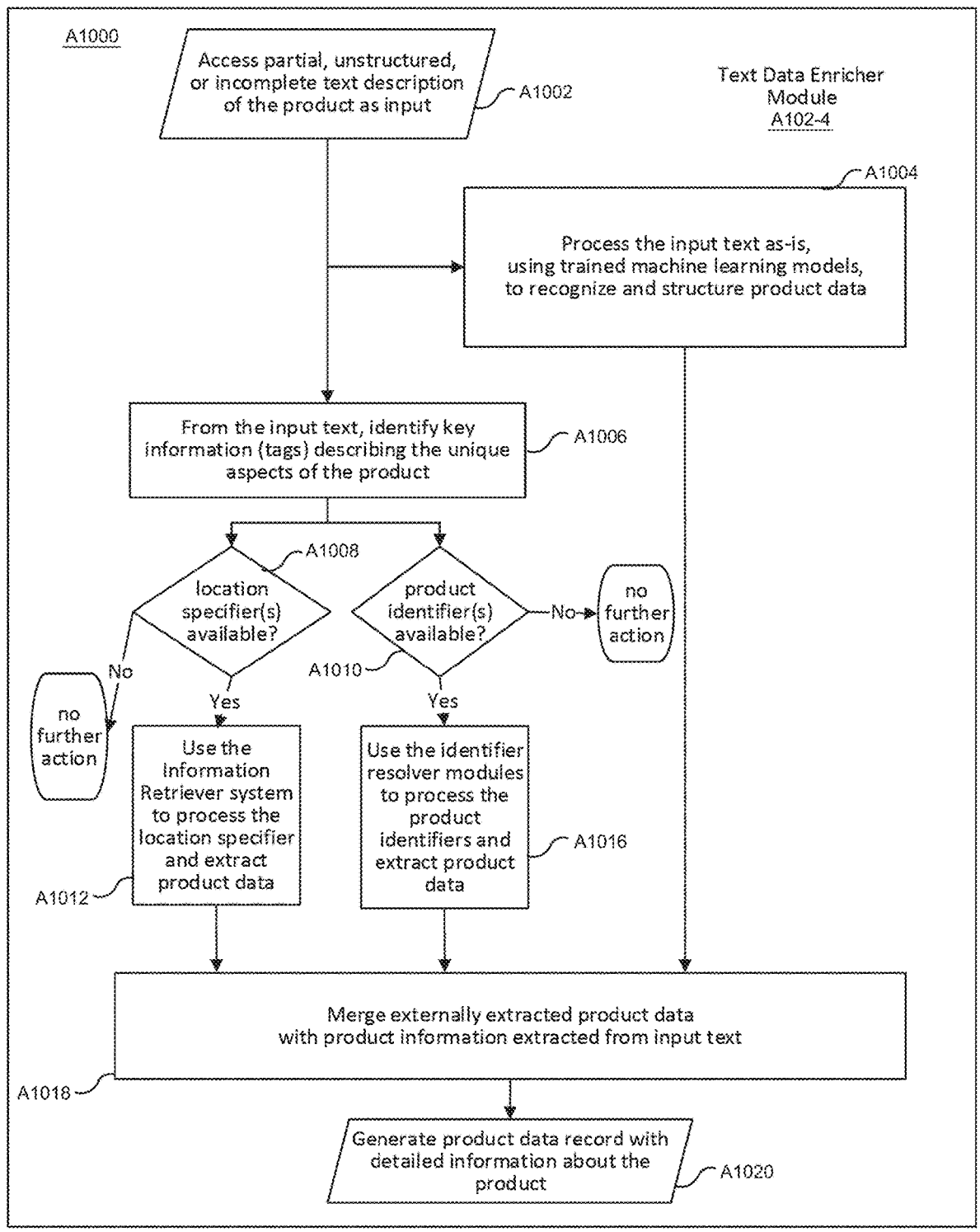
FIG. 19 illustrate an example method of one or more embodiments.

An example method A1000, as shown in FIG. 19, the text data enricher module A102-4 accesses partial, unstructured text (or incomplete textual product description) in the product input data A300 (Act A1002). The text data enricher module A102-4 sends the unstructured text to the machine learning network A130 in order to receive machine learning output that includes estimated/predicted product information (Act A1004). The text data enricher module A102-4 also identifies one or more tags in the unstructured text of the product input data A300 that describe various product aspects (Act A1006). If one or more location specifiers are available in an identified tag (Act A1008), the text data enricher module A102-4 passes the locations specifiers to the information retriever module A102-3 which returns extracted product data (Act A1012). If location specifiers are not available in the identified tags (Act A1008), no further steps are performed by the text data enricher module A102-4 with respect to the particular, identified tag(s). If one or more product identifiers are available in an identified tag(s) (Act A1010), the text data enricher module A102-4 passes the identifiers to the resolver modules A102-1, A102-2 which return extracted product data (Act A1016). If identifiers are not available in the identified tags (Act A1010), no further steps are performed by the text data enricher module A102-4 with respect to the particular, identified tag(s). The text data enricher module A102-4 merges received extracted product data with predicted product information from the machine learning network A130 (Act A1018) and generates a product data record with merged data (Act A1020).

Figure 20:
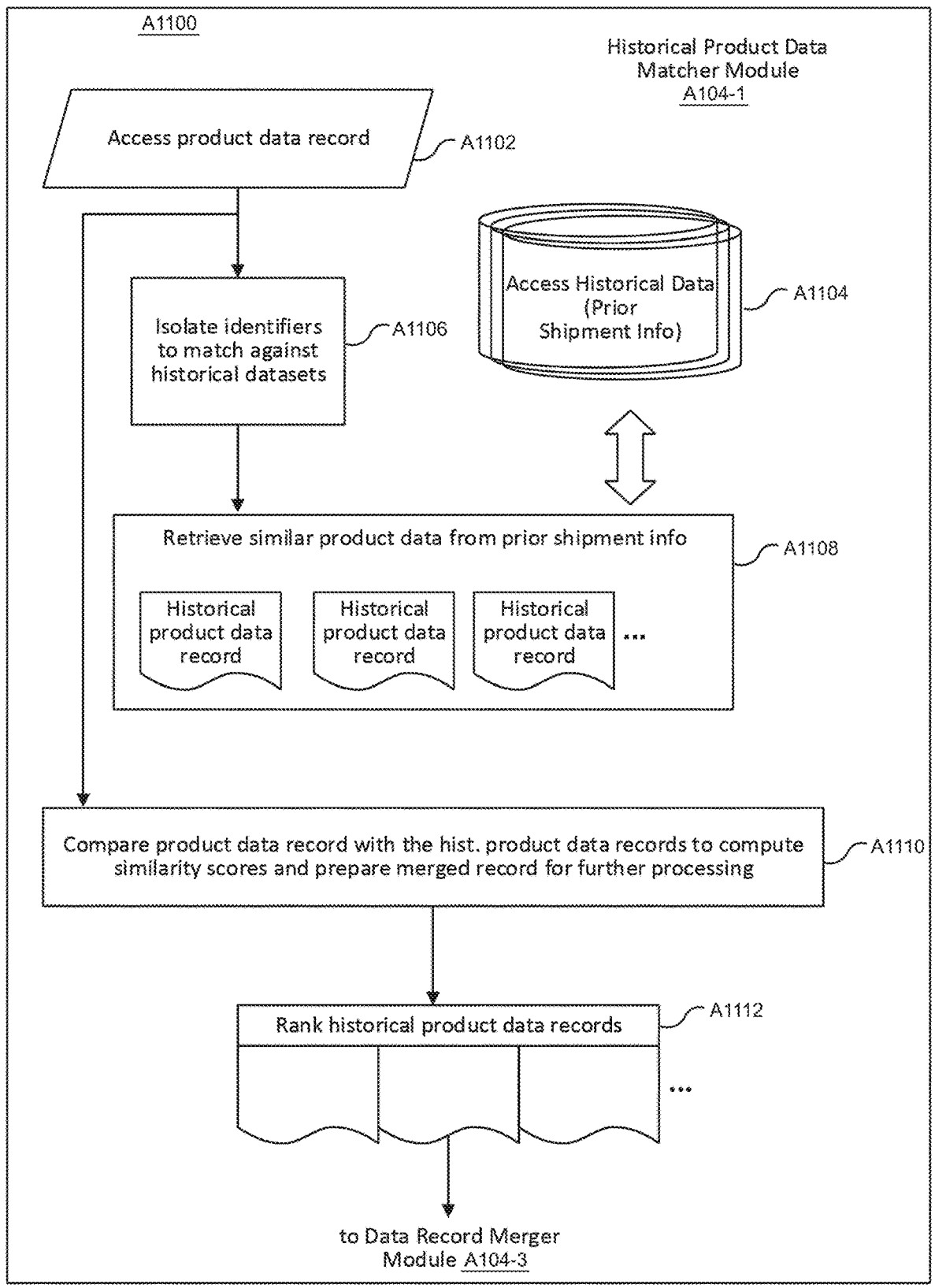
FIG. 20 illustrate an example method of one or more embodiments.

An example method A1100, as shown in FIG. 20, the historical product data matcher module A104-1 accesses the product data record A108-1 (Act A1102) and prior shipment information (Act A1104) in the historical data A124. The historical product data matcher module A104-1 isolates one or more identifiers from the product data record for use in retrieving similar product data in the prior shipment information, as described in one or more historical product data records in the historical data A124 (Act A1108). The historical product data matcher module A104-1 compares the product data record A108-1 with the historical product data records in order to calculate corresponding similarity scores (Act A1110). The historical product data matcher module A104-1 ranks the historical product data records according to the similarity scores (Act A1112) and passes the ranking to the data record merger module A104-3.

Figure 21:
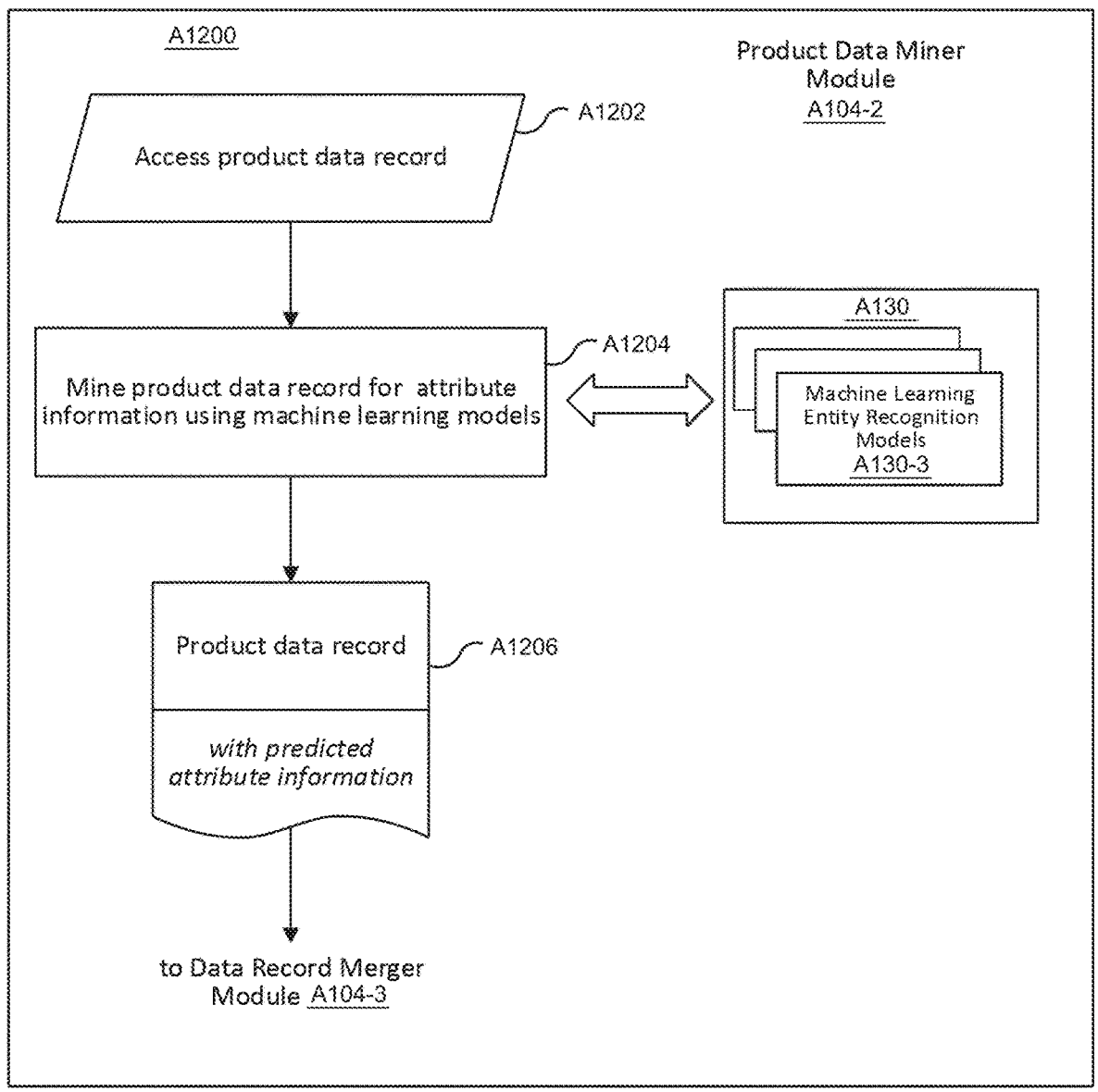
FIG. 21 illustrate an example method of one or more embodiments.

An example method A1200, as shown in FIG. 21, the product data miner module A104-2 accesses the product data record A108-1 (Act A1202), and mines the product data record A108-1 for attribute information via execution of one or more machine learning entity recognition models A130-3 provided by the machine learning network A130 (Act A1204). The product data miner module A104-2 sends the attribute information predicted in output from the machine learning entity recognition models A130-3 to the data record merger module A104-3 (Act A1206).

Figure 22:
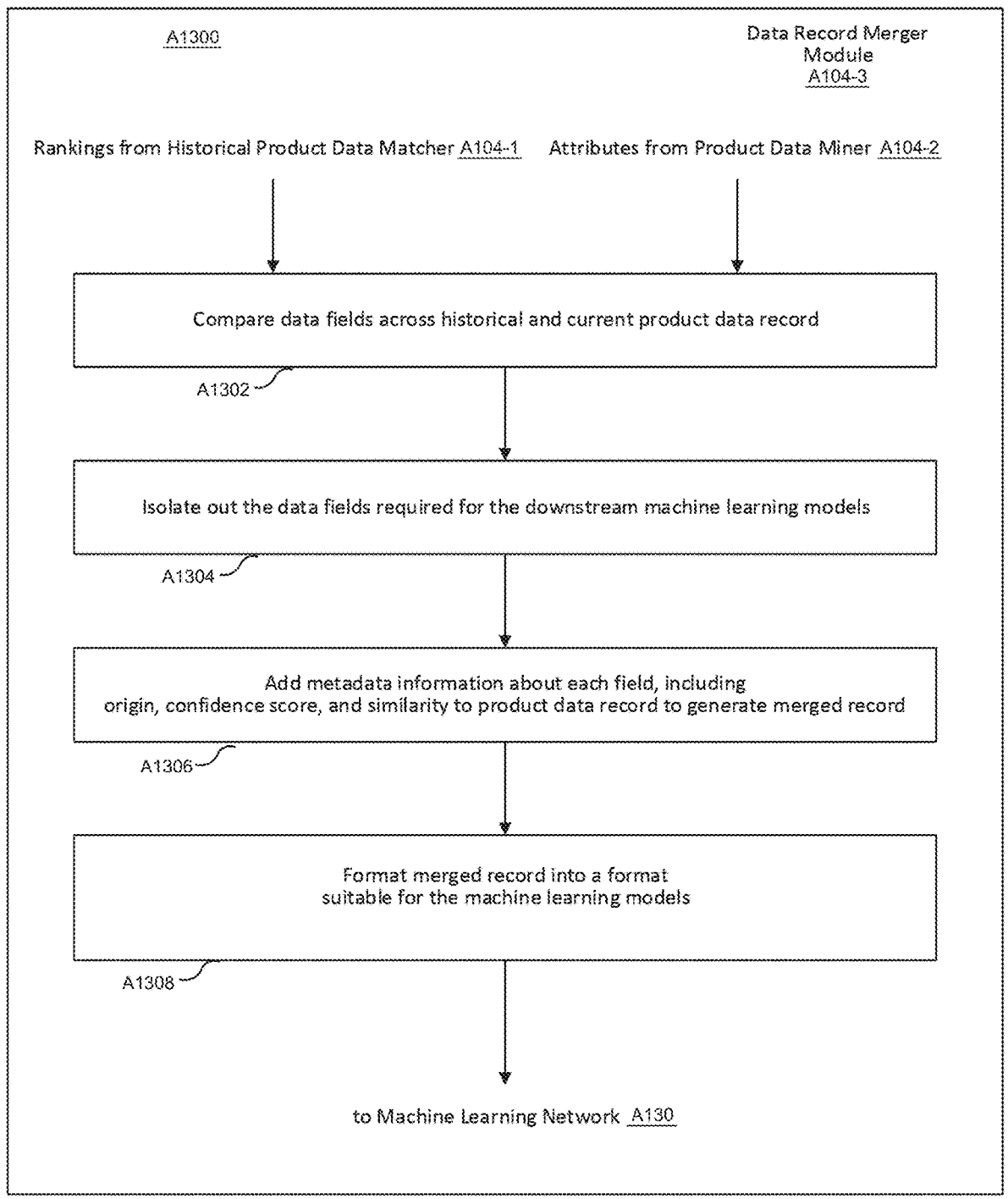
FIG. 22 illustrate an example method of one or more embodiments.

An example method A1300, as shown in FIG. 22, the data record merger module A104-3 receives the ranking of historical product data records from the historical product data matcher module A104-1 and the predicted attribute information from the product data miner module A104-2. The data record merger module A104-3 compares one or more data fields across the ranked historical product data records and the product data record A108-1 (Act A1302). The product data miner module A104-2 isolates one or more data fields required for downstream machine learning models (Act A1304) and adds metadata information about each isolated field into the product data record A108-1 to generate a merged record (Act A1306). The product data miner module A104-2 formats the merged record into a format suitable for processing by one or more machine learning models (Act A1308). Output from machine learning processing of the merged record may further include one or more required ML parameters and estimated data values to be added to the product data record A108-1 in order to generate an enriched product data record A108-1-1 to input for the classification engine module A106.

An aspect of the present disclosure relates to a computer-implemented method for inferring information about a product, comprising: retrieving at least one product data attribute based on a formatting convention of input data; augmenting the input data with the retrieved product data attribute for a product data record; ranking historical product data records in historical shipment information that satisfy a similarity threshold with the product data record; feeding the product data record into one or more machine learning (ML) models to identify at least one predictive attribute that corresponds with identifying accurate product information; merging the product data record, the ranked historical product data records and the predictive attribute to generate predictor data; feeding the predictor data into the one or more ML models to estimate additional data for one or more null fields in the product data record; updating the product data record with the predicted additional data to generate an enriched product data record; feeding the enriched product data record into an ensemble of the one or more ML models to predict product code data based on one or more commerce classification code taxonomies; and adding the predicted product code data to the enriched product data record.

Retrieving at least one product data attribute based on a formatting convention of the input data optionally comprises: determining that a format of at least an identifier portion of the input data corresponds to a global product identification convention; searching one or more data sources that includes relevant product data stored in relation to at least one of the identifier portion and the global product identification convention; and retrieving the relevant product data. Retrieving at least one product data attribute based on a formatting convention of the input data optionally comprises: determining that a format of at least an identifier portion of the input data corresponds to a vendor-specific product identification convention; searching one or more data sources that identifies an origin of the vendor-specific product identification convention; accessing a data location associated with the origin; and retrieving relevant product data from at least a portion of the data location that refers to the identifier portion of the input data. Retrieving at least one product data attribute based on a formatting convention of the input data optionally comprises: determining that a format of at least an identifier portion of the input data identifies a data location; accessing the data location; and extracting product data from the data location. Retrieving at least one product data attribute based on a formatting convention of the input data optionally comprises: determining that a format of at least a portion of the input data corresponds to uncategorized user-generated text describing the product; and performing a search to identify relevant product data in one or more data sources that includes one or more text instances that matches the user-generated text; and retrieving the relevant product data. Ranking historical product data records in historical shipment optionally comprises: generating at least one product identifier based on the augmented product data record; accessing historical shipment information to identify historical product data records that include one or more fields that match the product identifier; calculating a respective similarity score for each identify historical product data record with respect to the augmented product data record; and ranking the identified historical product data records according to the respective similarity scores. Feeding the product data record into one or more ML models to identify at least one predictive attribute optionally comprises: feeding the augmented product data record into an ML model trained for named entity recognition (NER) to identify the predictive attribute. Merging the product data record, the ranked historical product data records and the predictive attribute to generate predictor data optionally comprises: creating a merged record by combining the augmented product data record, the ranked historical product data records and the predictive attribute; and formatting the merged record to correspond with one or more defined ML input parameters, wherein the ML input parameters comprise at least: i) a respective source metadata for the data in one or more fields (field data) of the merged record; ii) a respective confidence score corresponding to an accuracy of the field data; and iii) a record similarity score based on a comparison of the merged record and the input data. Feeding the predictor data into the one or more ML models to estimate additional data for one or more null fields in the product data record optionally comprises: feeding the formatted, merged record into the one or more ML models, the one or more ML models trained for one or more of: NER, classification, and regression. The ensemble of the one or more ML models optionally includes at least one model based on: logistic regression, random forests, gradient boosting, convolutional neural networks, bi-directional long-short term memory networks and transformer networks.

An aspect of the present disclosure relates to a computer-implemented method for inferring information about a product, comprising: feeding a product data record into one or more machine learning (ML) models to identify at least one predictive attribute that corresponds with identifying accurate product information; feeding the product data record and the predictive attribute into the one or more machine learning models to estimate additional data for one or more null fields in the product data record; updating the product data record with the estimated additional data; and predicting product code data by feeding the updated product data record into an ensemble of one or more ML models, the product code data based on one or more commerce classification code taxonomies.

Feeding a product data record into one or more ML models optionally comprises: feeding the product data record into an ML model trained for named entity recognition (NER) to identify the predictive attribute; wherein the one or more machine learning models to estimate additional data comprise: one or more ML models trained for one or more of: NER, classification, and regression; and wherein the ensemble of the one or more ML models includes at least one model based on: logistic regression, random forests, gradient boosting, convolutional neural networks, bi-directional long-short term memory networks and transformer networks. The product code data is optionally based on one or more commerce classification code taxonomies. Feeding the product data record and the predictive attribute into the one or more machine learning models to estimate additional data for one or more null fields in the product data record optionally comprises: creating a merged record based on the product data record, ranked historical product data records with fields similar to the product and the predictive attribute; and formatting the merged record to correspond with one or more defined ML input parameters, wherein the ML input parameters comprise at least: i) a respective source metadata for the data in one or more fields (field data) of the merged record; ii) a respective confidence score corresponding to an accuracy of the field data; and iii) a record similarity score based on a comparison of the merged record and the input data. Prior to creating the merged record: optionally the method generates at least one product identifier based on the product data record; and accessing historical shipment information to identify the historical product data records that include one or more fields that match the product identifier. The method optionally further comprises receiving initial input data about the product; retrieving at least one product data attribute based on a formatting convention of the input data; and augmenting the input data with the retrieved product data attribute for the product data record that is to be fed into the one or more ML models to identify at least one predictive attribute.

An aspect of the present disclosure relates to a system comprising: one or more processors; and a non-transitory computer readable medium storing a plurality of instructions, which when executed, cause the one or more processors to: feed a product data record into one or more machine learning (ML) models to identify at least one predictive attribute that corresponds with identifying accurate product information; feed the product data record and the predictive attribute into the one or more machine learning models to estimate additional data for one or more null fields in the product data record; update the product data record with the estimated additional data; and predict product code data by feeding the updated product data record into an ensemble of one or more ML models, the product code data based on one or more commerce classification code taxonomies.

Optionally, feeding a product data record into one or more ML models comprises: feed the product data record into an ML model trained for named entity recognition (NER) to identify the predictive attribute; wherein the one or more machine learning models to estimate additional data comprise: one or more ML models trained for one or more of: NER, classification, and regression; and wherein the ensemble of the one or more ML models includes at least one model based on: logistic regression, random forests, gradient boosting, convolutional neural networks, bi-directional long-short term memory networks and transformer networks. Optionally, the product code data is based on one or more commerce classification code taxonomies. Optionally, feeding the product data record and the predictive attribute into the one or more machine learning models to estimate additional data for one or more null fields in the product data record comprises: create a merged record based on the product data record, ranked historical product data records with fields similar to the product and the predictive attribute; and format the merged record to correspond with one or more defined ML input parameters, wherein the ML input parameters comprise at least: i) a respective source metadata for the data in one or more fields (field data) of the merged record; ii) a respective confidence score corresponding to an accuracy of the field data; and iii) a record similarity score based on a comparison of the merged record and the input data. Optionally, the system is configured to, prior to creating the merged record: generate at least one product identifier based on the product data record; and access historical shipment information to identify the historical product data records that include one or more fields that match the product identifier. Optionally, the system is configured to receive initial input data about the product; retrieve at least one product data attribute based on a formatting convention of the input data; and augment the input data with the retrieved product data attribute for the product data record that is to be fed into the one or more ML models to identify at least one predictive attribute.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other implementations are within the scope of the following claims.

What is claimed is:

1. An artificial intelligence system comprising:
one or more processors; and
a non-transitory computer readable medium storing a plurality of instructions, which when executed, cause the one or more processors to:
crawl a website to identify and parse one or more product pages, the one or more product pages comprising data, including one or more images, about a respective product;
extract product attributes from at least a first product page;
create a first product data record using the extracted product attributes, wherein the first product record is missing a first attribute that corresponds to a code from a first taxonomy;
provide the first product data record to a machine learning model;
use the machine learning model to predict:
the first attribute that corresponds to a code from a first taxonomy; and
use the first predicted attribute with respect to cross-border shipping of the first product,
wherein the first taxonomy utilizes Harmonized System (HS) code, Harmonized Tariff System (HTS) code, Export Control Classification Number (ECCN) code, Schedule B code, and/or United Nations Standard Products and Services Code (UNSPSC).

2. The artificial intelligence system as defined in claim 1, wherein the extracted product attributes include one or more images.

3. The artificial intelligence system as defined in claim 1, wherein extracting product attributes from at least the first product page comprises extracting product attributes from at least text of the first product page, and wherein the extracted product attributes include a product material, a product composition, a product form, a product utility, and/or function.

4. The artificial intelligence system as defined in claim 1, wherein:
the system is configured to select historical shipping information, and
augment the first product data record with the selected historical shipping information prior to using the machine learning model to predict, based at least in part on a destination associated with the first product, that corresponds to a code from a first taxonomy;
the machine learning model comprises an ensemble of machine learning models including one or more convolutional neural networks (CNNs), bi-directional long-short term memory (LSTM) networks and/or transformer networks;
the first product data record is incomplete with respect to enabling a compliant shipment;
the first attribute that corresponds to a code from a first taxonomy comprises a product code;
the machine learning model is configured to predict the product code data based on the Harmonized Tariff System (HTS) code; and
the system is configured to populate the first product data record with the predicted product code to enable a compliant shipment.

5. The artificial intelligence system as defined in claim 1, wherein the system is configured to:
select historical shipping information;
augment the first product data record with the selected historical shipping information prior to using the machine learning model to predict, based at least in part on a destination associated with the first product the first attribute that corresponds to a code from a first taxonomy.

6. The artificial intelligence system as defined in claim 1, wherein the first attribute comprises a product code, and the machine learning model is configured to predict product codes based on one or more commerce classification code taxonomies, comprising the Harmonized Tariff System (HTS) code.

7. The artificial intelligence system as defined in claim 1, wherein the first attribute comprises a product code, and the machine learning model is configured to predict product codes data based on one or more commerce classification code taxonomies, comprising a tariff code.

8. The artificial intelligence system as defined in claim 1, wherein the machine learning model comprises one or more convolutional neural networks (CNNs), bi-directional long-short term memory (LSTM) networks and/or transformer networks.

9. The artificial intelligence system as defined in claim 1, wherein the system is configured to:
retrieve at least one product data attribute based on a formatting convention of input data;
augment the input data with the retrieved product data attributes for the first product data record that corresponds with a product described by the input data.

10. The artificial intelligence system as defined in claim 1, wherein the system is configured to:
identify and disambiguate global identifiers in the first product data record, and
associate the identifiers with a corresponding formatting convention.

11. A computer-implemented method, the method comprising:
obtaining product data from a first source, the product data comprising data about a respective product;
extracting product attributes from the product data;
creating a first product data set using the extracted product attributes;
providing the first product data set to a machine learning model;
using the machine learning model to predict:
a first attribute based on one or more classification code taxonomies; and
using the first attribute, predicted based on one or more classification code taxonomies, with respect to cross-border shipping of the first product,
wherein the one or more classification code taxonomies utilize Harmonized System (HS) code, Harmonized Tariff System (HTS) code, Export Control Classification Number (ECCN) code, Schedule B code, and/or United Nations Standard Products and Services Code (UNSPSC).

12. The computer-implemented as defined in claim 11, wherein the extracted product attributes include one or more images.

13. The computer-implemented as defined in claim 11, wherein extracting product attributes from the product data comprises extracting product attributes from at least text of the product data, and wherein the extracted product attributes include a product material, a product composition, a product form, a product utility, and/or function.

14. The computer-implemented as defined in claim 11, the method further comprising:
selecting historical shipping information;
augmenting the first product data set with the selected historical shipping information prior to using the machine learning model to predict, based at least in part on a destination associated with the first product, the first attribute predicted based on one or more classification code taxonomies; and populating the first product data set with the predicted first attribute to enable a compliant cross-border shipment;
wherein the machine learning model comprises an ensemble of machine learning models including one or more convolutional neural networks (CNNs), bi-directional long-short term memory (LSTM) networks and/or transformer networks; and wherein the machine learning model is configured to predict the first attribute based on one or more commerce classification code taxonomies, comprising the Harmonized Tariff System (HTS) code.

15. The computer-implemented as defined in claim 11, the method further comprising:
selecting historical shipping information;
augmenting the first product data set with the selected historical shipping information prior to using the machine learning model to predict, based at least in part on a destination associated with the first product, the first attribute.

16. The computer-implemented as defined in claim 11, wherein the machine learning model is configured to predict the first attribute using a tariff code.

17. The computer-implemented as defined in claim 11, wherein the machine learning model comprises one or more convolutional neural networks (CNNs), bi-directional long-short term memory (LSTM) networks and/or transformer networks.

18. The computer-implemented method as defined in claim 11, the method further comprising:
identifying and disambiguating global identifiers in the first product data set; and
associating the global identifiers with a corresponding formatting convention.

19. A non-transitory computer-readable medium comprising instructions that when executed by a computer system, cause the computer system to perform operations comprising:
obtaining product data from a first source, the product data comprising data about a respective product;
extracting product attributes from the product data obtained from the first source;
creating a first product data set using the extracted product attributes;
providing the first product data set to a machine learning model;
using the machine learning model to predict:
a first attribute based on one or more classification code taxonomies; and
using the first attribute, predicted based on one or more classification code taxonomies, with respect to cross-border shipping of the first product,
wherein the one or more classification code taxonomies utilize Harmonized System (HS) code, Harmonized Tariff System (HTS) code, Export Control Classification Number (ECCN) code, Schedule B code, and/or United Nations Standard Products and Services Code (UNSPSC).

20. The non-transitory computer-readable medium as defined in claim 19, the operations further comprising:
selecting historical shipping information;
augmenting the first product data set with the selected historical shipping information prior to using the machine learning model to predict, based at least in part on a destination associated with the first product, the first attribute predicted based on one or more classification code taxonomies; and populating the first product data set with the predicted first attribute to enable a compliant cross-border shipment;

wherein the machine learning model comprises an ensemble of machine learning models including one or more convolutional neural networks (CNNs), bi-directional long-short term memory (LSTM) networks and/or transformer networks; and wherein the machine learning model is configured to predict the first attribute based on one or more commerce classification code taxonomies, comprising the Harmonized Tariff System (HTS) code.

21. The non-transitory computer-readable medium as defined in claim 19, the operations further comprising:
selecting historical shipping information;
augmenting the first product data set with the selected historical shipping information prior to using the machine learning model to predict, based at least in part on a destination associated with the first product, the first attribute.

22. The non-transitory computer-readable medium as defined in claim 19, wherein the machine learning model is configured to predict the first attribute using a tariff code.

23. The non-transitory computer-readable medium as defined in claim 19, wherein the machine learning model comprises one or more convolutional neural networks (CNNs), bi-directional long-short term memory (LSTM) networks and/or transformer networks.

24. The non-transitory computer-readable medium as defined in claim 19, the operations further comprising:
retrieving at least one product data attribute based on a formatting convention of input data;
augmenting the input data with the retrieved product data attributes for the first product data set that corresponds with a product described by the input data.

25. The non-transitory computer-readable medium as defined in claim 19, the operations further comprising:
identifying and disambiguating global identifiers in the first product data set; and
associating the global identifiers with a corresponding formatting convention.

26. The non-transitory computer-readable medium as defined in claim 19, wherein the data about a respective product comprises an image and/or the extracted product attributes comprise an image.

27. The non-transitory computer-readable medium as defined in claim 19, wherein extracting product attributes from the product data comprises extracting product attributes from at least text of the product data, and wherein the extracted product attributes include a product material, a product composition, a product form, a product utility, and/or function.

* * * * *